(12) United States Patent
Salman et al.

(10) Patent No.: US 12,283,197 B2
(45) Date of Patent: Apr. 22, 2025

(54) ACTIVE LEARNING FOR INSPECTION TOOL

(71) Applicant: Schlumberger Technology Corporation, Sugar Land, TX (US)

(72) Inventors: Nader Salman, Houston, TX (US); Victor Amblard, Paris (FR); Vahagn Hakopian, Vienne (FR)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 522 days.

(21) Appl. No.: 17/597,520

(22) PCT Filed: Jul. 10, 2020

(86) PCT No.: PCT/US2020/041597
§ 371 (c)(1),
(2) Date: Jan. 10, 2022

(87) PCT Pub. No.: WO2021/007514
PCT Pub. Date: Jan. 14, 2021

(65) Prior Publication Data
US 2022/0262104 A1   Aug. 18, 2022

Related U.S. Application Data

(60) Provisional application No. 62/872,609, filed on Jul. 1, 2019, provisional application No. 62/966,156, filed on Jan. 27, 2020.

(51) Int. Cl.
*G06F 17/00*    (2019.01)
*G06V 10/774*   (2022.01)
(Continued)

(52) U.S. Cl.
CPC ......... *G09B 23/40* (2013.01); *G06V 10/7753* (2022.01); *G06V 10/778* (2022.01);
(Continued)

(58) Field of Classification Search
CPC ...... G09B 23/40; G06V 20/05; G06V 10/778; G06V 10/82; G06V 10/7753; G01V 1/301
See application file for complete search history.

(56) References Cited

U.S. PATENT DOCUMENTS 6,711,293 B1   3/2004  Lowe
8,379,154 B2   2/2013  Zhang
(Continued)

FOREIGN PATENT DOCUMENTS

EP   2672396 A1   12/2013
EP   3475881 A1    5/2019
(Continued)

OTHER PUBLICATIONS

Office Action issued in U.S. Appl. No. 17/279,431 dated Aug. 3, 2023, 72 pages.
(Continued)

*Primary Examiner* — Mohammed H Zuberi
(74) *Attorney, Agent, or Firm* — Jeffrey D. Frantz

(57) ABSTRACT

A method can include receiving labeled images; acquiring unlabeled images; performing active learning by training an inspection learner using at least a portion of the labeled images to generate a trained inspection learner that outputs information responsive to receipt of one of the unlabeled images by the trained inspection learner; based at least in part on the information, making a decision to call for labeling of the one of the unlabeled images; receiving a label for the one of the unlabeled images; and further training the inspection learner using the label.

22 Claims, 30 Drawing Sheets

(51) Int. Cl.
G06V 10/778 (2022.01)
G06V 10/82 (2022.01)
G06V 20/05 (2022.01)
G09B 23/40 (2006.01)
G01V 1/30 (2006.01)

(52) U.S. Cl.
CPC .............. G06V 10/82 (2022.01); G06V 20/05 (2022.01); G01V 1/301 (2013.01)

(56) References Cited

U.S. PATENT DOCUMENTS

| | | | |
|---|---|---|---|
| 9,858,525 | B2 | 1/2018 | Dai |
| 10,832,046 | B1 | 11/2020 | Al-Gharaibeh |
| 2005/0021290 | A1 | 1/2005 | Velipasaoglu et al. |
| 2009/0238460 | A1 | 9/2009 | Funayama et al. |
| 2012/0269436 | A1* | 10/2012 | Mensink .............. G06V 10/764 382/180 |
| 2013/0346356 | A1 | 12/2013 | Welinder et al. |
| 2014/0040169 | A1 | 2/2014 | Forman |
| 2014/0229407 | A1 | 8/2014 | White |
| 2014/0280238 | A1 | 9/2014 | Cormack et al. |
| 2016/0162802 | A1 | 6/2016 | Chickering et al. |
| 2016/0371601 | A1 | 12/2016 | Grove |
| 2017/0116544 | A1 | 4/2017 | Johnson et al. |
| 2017/0262635 | A1* | 9/2017 | Strauss .............. G06Q 30/0275 |
| 2018/0189610 | A1 | 7/2018 | Kandemir et al. |
| 2018/0240031 | A1 | 8/2018 | Huszar et al. |
| 2019/0019266 | A1* | 1/2019 | Boyle ..................... G06V 20/52 |
| 2019/0065908 | A1* | 2/2019 | Lee ..................... G06F 18/2155 |
| 2019/0169962 | A1* | 6/2019 | Aqrawi .................. G01V 1/302 |
| 2019/0261566 | A1 | 8/2019 | Robertson |
| 2019/0325275 | A1* | 10/2019 | Lee .................. G06V 30/19167 |
| 2019/0391295 | A1* | 12/2019 | Salman .................. G01V 20/00 |
| 2021/0295104 | A1 | 9/2021 | Squires |
| 2021/0311221 | A1* | 10/2021 | Roy ......................... G01V 1/48 |
| 2021/0406644 | A1 | 12/2021 | Salman et al. |
| 2022/0136344 | A1 | 5/2022 | Mora |

FOREIGN PATENT DOCUMENTS

| | | |
|---|---|---|
| WO | 2018082790 A1 | 5/2018 |
| WO | 2018150812 A1 | 8/2018 |
| WO | 199928767 | 5/2019 |

OTHER PUBLICATIONS

Exam Report issued in United Kingdom Patent Application No. GB2200243.0 dated Mar. 13, 2023, 8 pages.
Settles. Active Learning Literature Survey. University of Wisconsin-Madison Department of Computer Sciences, 2010. (67 pages).
Shannon. A Mathematical Theory of Communication. The Bell System Technical Journal, 1948. (55 pages).
Houlsby et al. Bayesian Active Learning for Classification and Preference Learning. arXiv preprint, 2011. (17 pages).
Tong. Active Learning: Theory and Applications. Stanford University, 2001. (201 pages).
Gal et al. Deep Bayesian Active Learning with Image Data. International Conference on Machine Learning, 2017. (10 pages).
Beluch et al. The Power of Ensembles for Active Learning in Image Classification. Conference on Computer Vision and Pattern Recognition, 2018. (10 pages).
Mazzoni et al. Active Learning with Irrelevant Examples. Proceedings of the Seventeenth European Conference on Machine Learning, 2006. (8 pages).
Bappy et al. The Impact of Typicality for Informative Representative Selection. Conference on Computer Vision and Pattern Recognition, 2017. (10 pages).
Kao et al. Localization-Aware Active Learning for Object Detection. arXiv preprint, 2017. (21 pages).
Rhee et al. Active and Semi-Supervised Learning for Object Detection with Imperfect Data. Cognitive Systems Research, 2017. (15 pages).
Xu et al. Representative Sampling for Text Classification Using Support Vector Machines. Proceedings of ECIR-03, 25th European conference on information retrieval, 2003 (15 pages).
Wang et al. Towards Human-Machine Cooperation: Self-supervised Sample Mining for Object Detection. Conference on Computer Vision and Pattern Recognition, 2018. (9 pages).
Konyushkova et al. Learning Intelligent Dialogs for Bounding Box Annotation. Conference on Computer Vision and Pattern Recognition, 2018. (10 pages).
Papadopoulos et al. We don't need no Bounding-Boxes: Training Object Class Detectors using only Human Verification. Conference on Computer Vision and Pattern Recognition, 2016. (10 pages).
Perera et al. Learning Deep Features for One-Class Classification. arXiv preprint, 2018. (15 pages).
Lin et al. Focal Loss for Dense Object Detection. International Conference on Computer Vision, 2017. (9 pages).
Liu et al. SSD: Single Shot MultiBox Detector. Proceedings of the European Conference on Computer Vision, 2016. (15 pages).
Redmon et al. You Only Look Once: Unified, Real-Time Object Detection. Proceedings of the IEEE conference on computer vision and pattern recognition, 2016. (10 pages).
International Search Report and Written Opinion of the equivalent International Application PCT/US2019/052642 emailed Jan. 23, 2020 (9 pages).
International Preliminary Report of the equivalent International Application PCT/US2019/052642 emailed Apr. 1, 2021 (6 pages).
B. Settles and M. Craven. An analysis of active learning strategies for sequence labeling tasks. In Proceedings of the Conference on Empirical Methods in Natural Language Processing (EMNLP), pp. 1070-1079. ACL Press, 2008 (10 pages).
G. Huang, Y. Li, G. Pleiss, Z. Liu, J. E. Hopcroft, and K. Q. Weinberger. Snapshot ensembles: Train 1, get M for free. ICLR submission, 2017. (14pages).
International Search Report and Written Opinion of the International Application PCT/US2020/041597 emailed Oct. 16, 2020 (10 pages).
Ferrier et al. An integrated GIS and knowledge-based system as an aid for the geological analysis of sedimentary basins_International Journal of Geographical Information Science, London vol. 11. No. 3, Apr. 1, 1997 pp. 281-297 XP002098061.
Joint UK Project Developing Basin Geology Modeling Tool, Offshore, Pennwell, Tulsa, OK, US vol. 53 No. 4, Apr. 1, 1993 pp. 86-87 XP000365016.
Zhao et al., Object Detection with Deep Learning: A Review, arXiv preprint, 2019_(21 pages).
Wu et al., Recent Advances in Deep Learning for Object Detection, arXiv preprint, 2019_(40 pages).
Redmon J, Farhadi A. Yolov3: An incremental improvement. arXiv preprint arXiv:1804.02767. Apr. 8, 2018. (6 pages).
A.Holub et al., Entropy-based Active Learning for Object Recognition, IEEE Computer Society Conference on Computer Vision and Pattern Recognition Workshops, 2008_(8 pages).
K.Wang et al., Cost-Effective Active Learning for Deep Image classification, TCSVT, 2016. (10 pages).
Substantive Exam and Search Report issued in Norway Patent Application No. 20220031 dated Oct. 26, 2023, 6 pages.
Brust et al._Active Learning for Deep Object Detection, International Conference on Computer Vision Theory and Applications, 2019. (11 pages).
Lewis et al_A Sequential Algorithm for Training Text Classifiers, SIGIR, 1994. (10 pages).
P.Melville and R.J. Mooney, Diverse Ensembles for Active Learning, ICML, 2004. 8 pages.
Y.Guo and R.Greiner, Optimistic Active Learning using Mutual Information, IJCAI, 2007. (7 pages).
Sener et al., Active Learning for Convolutional Neural Networks: A Core-Set Approach, ICLR 2018_13 Pages.
X.Li and Y.Guo, Adaptive Active Learning for Image Classification, CVPR, 2013. (8 pages).

(56) References Cited

OTHER PUBLICATIONS

B.Demir and L. Bruzzone, A Novel Active Learning Method in Relevance Feedback for Content-Based Remote Sensing Image Retrieval, IEEE Transactions on Geoscience and Remote Sensing, 2015. (12 pages).

C.Vondrick and D.Ramanan, Video Annotation and Tracking with Active learning, NIPS, 2011. (9 pages).

A.Deshpende et al., Review of Keyframe Extraction Techniques for Video Summarization, International Journal of Computer Applications, 2018. (5 pages).

C.Costsaces et al., Video shot detection and condensed representation. a review, Signal Processing Magazine, 2008. (10 pages).

Zhao et al., Hierarchical Recurrent Neural Network for Video Summarization, 2019. (8 pages).

K.Zhang et al., Video Summarization with Long Short-Term Memory, ECCV, 2016. (17 pages).

G.Guan et al., Video Summarization with Global and Local Features, IEEE International Conference on Multimedia and Expo Workshops, 2012_6 pages.

Sheena et al., Key-frame extraction by analysis of histograms of video frames using statistical methods, 2015_5 pages.

Simonyan et al., "Very deep convolutional networks for large-scale image recognition", CoRR, abs/1409.1556, 2014 (14 pages).

Scholkopf et al., "Support vector method for novelty detection," Advances in Neural Information Processing Systems 12, pp. 582-588, 1999.

G.Csurka et al., Visual Categorization with Bags of Keypoints, 2004. (16 pages).

J.Yang et al., Evaluating Bag-of-Visual-Words Representations in Scene Classification, Proceedings of the International workshop on Workshop on multimedia information retrieval, 2007. (10 pages).

H.Bay et al., SURF: Speeded Up Robust Features, EECV 2006. (14 pages).

D. Lowe, Distinctive Image Features from Scale-Invariant Keypoints, International Journal of Computer Vision, 2004 (28 pages).

E.Rublee et al., ORB: An efficient alternative to SIFT or SURF, International Conference on Computer Vision, 2011. (8 pages).

D.Xu and Y.Tian, A Comprehensive Survey of Clustering Algorithms, Annals of Data Science, 2015. (29 pages).

G. Huang, and al. Snapshot ensembles: Train 1, get M for free. ICLR submission, 2017. (14 pages).

International Preliminary Report on patentability of the International Application PCT/US2020/041597 dated Jan. 20, 2022 (8 pages).

Office Action issued in U.S. Appl. No. 17/279,431 dated Dec. 14, 2023, 30 pages.

Notice of Allowance issued in U.S. Appl. No. 18/702,274 dated Sep. 13, 2024, 16 pages.

Office Action issued in U.S. Appl. No. 18/702,274 dated Aug. 16, 2024, 15 pages.

Usmani, U. A. et al., "A Reinforced Active Learning Algorithm for Semantic Segmentation in Complex Imaging", IEEE Access, 2021(9), pp. 168415-168432.

Search Report and Written Opinion of International Patent Application No. PCT/US2022/047968; Dated Feb. 27, 2023; 6 pages.

Casanova, A. et al. "Reinforced Active Learning for Image Segmentation." ArXiv abs/2002.06583, 2020, 17 pages.

Chen, L. C. et al., "Encoder-Decoder with Atrous Separable Convolution for Semantic Image Segmentation", ECV, 2018, 18 pages.

Chen, L. C. et al., "Rethinking Atrous Convolution for Semantic Image Segmentation", arXiv:1706.05587v3, 2017, 14 pages.

Chowdhury, A. et al., "Active Deep Learning Reduces Annotation Burden in Automatic Cell Segmentation", BioRxiv preprint, 2017, 4 pages.

Garcia-Garcia, A. et al., "A Review on Deep Learning Techniques Applied to Semantic Segmentation", arXiv:1704.06857 preprint, 2017, 23 pages.

Gorriz, M. et al. "Cost-Effective Active Learning for Melanoma Segmentation." ArXiv abs/1711.09168, 2017, 5 pages.

He, K. et al., "Deep Residual Learning for Image Recognition", Computer Vision Foundation Version of IEEE Xplore, 2015, 9 pages.

Kim, T. et al., "Active learning for accuracy enhancement of semantic segmentation with CNN-corrected label curations: Evaluation on kidney segmentation in abdominal CT", Scientific Reports, 2020, 10(366), 7 pages.

Kwak, S. et al. "Weakly Supervised Semantic Segmentation Using Superpixel Pooling Network", Proceedings of the Thirty-First Conference on Artificial Intelligence AAAI, 2017, 7 pages.

Lin, T.-Y. et al., "Feature Pyramid Networks for Object Detection", Computer Vision Foundation Version of IEEE Xplore, 2017, 9 pages.

Luc, P. et al. "Semantic Segmentation using Adversarial Networks." ArXiv:1611.08408 (2016), 12 pages.

Ravanbakhsh, M. et al., Uncertainty-Driven Semantic Segmentation through Human-Machine Collaborative Learning, Medical Imaging with Deep Learning, 2019, 4 pages.

Sakaridis, C. et al. "Semantic Nighttime Image Segmentation with Synthetic Stylized Data, Gradual Adaptation and Uncertainty-Aware Evaluation" ArXiv:1901.05946, 2019, 10 pages.

Scandalea, M. et al., "Deep Active Learning for Axon-Myelin Segmentation on Histology Data", arXiv:1907.05143v1, 2019, 8 pages.

Siddiqui, Y. et al., " ViewAL: Active Learning with Viewpoint Entropy for Semantic Segmentation", Computer Vision Foundation Version of IEEE Xplore, 2020, 11 pages.

Smailagic, A. et al., "MedAL: Accurate and Robust Deep Active Learning for Medical Image Analysis", downloaded fromt the internet on Aug. 22, 2024 from [https://arxiv.org/pdf/1809.09287], 2018, 8 pages.

Sorsater, M., "Active Learning for Road Segmentation using Convolutional Neural Networks", Master of Science Thesis, Linkoping University, 2018, 83 pages.

Tan, N. et al., "EfficientNet: Rethinking Model Scaling for Convolutional Neural Networks", 2019, 10 pages.

Vezhnevets, A. et al., "Active Learning for Semantic Segmentation with Expected Change", downloaded from the internet at [https://calvin-vision.net/bigstuff/hp_avezhnev/Pubs/VezhnevetsCVPR2012a.pdf] on Aug. 22, 2024, 2012, , IEEE.

Zhou, Z. et al., "UNet++: A Nested U-Net Architecture for Medical Image Segmentation", downloaded from the Internet on Aug. 22, 2024 at [https://www.ncbi.nlm.nih.gov/pmc/articles/PMC7329239/pdf/nihms-1600717.pdf], 2018, 12 pages.

* cited by examiner

US 12,283,197 B2

ACTIVE LEARNING FOR INSPECTION TOOL

RELATED APPLICATIONS

This application is a national stage entry under 35 U.S.C. 371 of International Application No. PCT/US2020/041597, filed on 10 Jul. 2020, which claims priority to and the benefit of a U.S. Provisional Application having Ser. No. 62/872,609, filed on 10 Jul. 2019, which is incorporated by reference herein, and this application claims priority to and the benefit of a U.S. Provisional Application having Ser. No. 62/966,156, filed on 27 Jan. 2020, which is incorporated by reference herein. This application is related to a U.S. Provisional Application having Ser. No. 62/735,568, filed on 24 Sep. 2018, which is incorporated by reference herein, and is related to an International Application having Serial No. PCT/US2019/052642, filed on 24 Sep. 2019, which is incorporated by reference herein.

BACKGROUND

Active learning can be a process that aims to select data to utilize for machine learning.

SUMMARY

A method can include receiving labeled images; acquiring unlabeled images; performing active learning by training an inspection learner using at least a portion of the labeled images to generate a trained inspection learner that outputs information responsive to receipt of one of the unlabeled images by the trained inspection learner; based at least in part on the information, making a decision to call for labeling of the one of the unlabeled images; receiving a label for the one of the unlabeled images; and further training the inspection learner using the label. A system can include a processor; memory accessible to the processor; instructions stored in the memory and executable by the processor to instruct the system to: receive labeled images; acquire unlabeled images; perform active learning by training an inspection learner using at least a portion of the labeled images to generate a trained inspection learner that outputs information responsive to receipt of one of the unlabeled images by the trained inspection learner; based at least in part on the information, make a decision to call for labeling of the one of the unlabeled images; receive a label for the one of the unlabeled images; and further train the inspection learner using the label. One or more computer-readable storage media can include computer-executable instructions executable to instruct a computing system to: receive labeled images; acquire unlabeled images; perform active learning by training an inspection learner using at least a portion of the labeled images to generate a trained inspection learner that outputs information responsive to receipt of one of the unlabeled images by the trained inspection learner; based at least in part on the information, make a decision to call for labeling of the one of the unlabeled images; receive a label for the one of the unlabeled images; and further train the inspection learner using the label. Various other apparatuses, systems, methods, etc., are also disclosed.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

Features and advantages of the described implementations can be more readily understood by reference to the following description taken in conjunction with the accompanying drawings.

DETAILED DESCRIPTION

Figure 1:
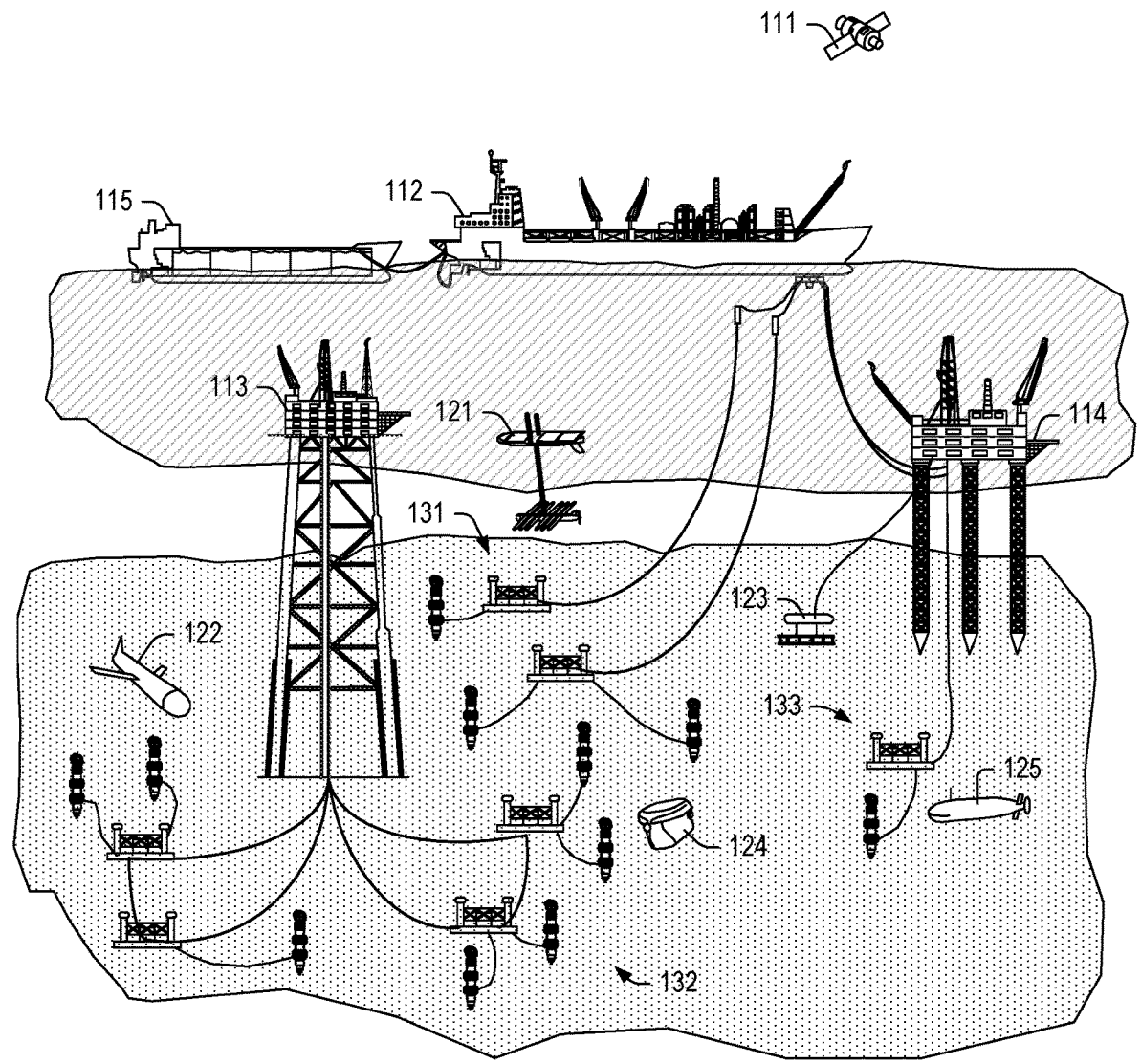
FIG. 1 illustrates examples of equipment in a geologic environment.

The following description includes embodiments of the best mode presently contemplated for practicing the described implementations. This description is not to be taken in a limiting sense, but rather is made merely for the purpose of describing the general principles of the implementations. The scope of the described implementations should be ascertained with reference to the issued claims.

As an example, a method can utilize a framework that can improve machine learning to, for example, generate a trained machine, which may be a trained machine learning tool (e.g., a trained neural network, etc.). In such an example, the trained machine may be trained more accurately, trained in a lesser amount of time, trained using constrained resources, trained at least in part in a real-time manner, etc.

An example of a machine learning model is a neural network (NN) (e.g., a neural network model), which can include neurons and connections where each connection provides the output of one neuron as an input to another neuron. Each connection can be assigned a weight that represents its relative importance. A given neuron can have multiple input and output connections. A NN can include a propagation function that computes the input to a neuron from outputs of its predecessor neurons and their connections as a weighted sum. As an example, a bias term can be added to the result of the propagation.

As an example, neurons can be organized into multiple layers, particularly in deep learning NNs. As an example, the layer that receives external data can be an input layer and the layer that produces a result or results can be an output layer. As an example, a NN may be fully connected where each neuron in one layer connects to each neuron in the next layer. As an example, a NN can utilize pooling, where a group of neurons in one layer connect to a single neuron in the next layer, thereby reducing the number of neurons in that layer. As an example, a NN can include connections that form a directed acyclic graph (DAG), which may define a feedforward network. Alternatively, a NN can allow for connections between neurons in the same or previous layers (e.g., a recurrent network).

As to a machine learning model (ML model), such a model can be a neural network model (NN model). As an example, a trained ML model (e.g., a trained ML tool that includes hardware, etc.) can be utilized for one or more tasks. As an example, various types of data may be acquired and optionally stored, which may provide for training one or more ML models, for retraining one or more ML models, for further training of one or more ML models, and/or for offline analysis, etc.

As an example, the TENSORFLOW framework (Google LLC, Mountain View, CA) may be implemented, which is an open source software library for dataflow programming that includes a symbolic math library, which can be implemented for machine learning applications that can include neural networks. As an example, the CAFFE framework may be implemented, which is a DL framework developed by Berkeley AI Research (BAIR) (University of California, Berkeley, California). As another example, consider the SCIKIT platform (e.g., scikit-learn), which utilizes the PYTHON programming language. As an example, a framework such as the APOLLO AI framework may be utilized (APOLLO.AI GmbH, Germany). As an example, a framework such as the PYTORCH framework may be utilized (Facebook AI Research Lab (FAIR), Facebook, Inc., Menlo Park, California).

As an example, an edge implementation or a stand-alone implementation may utilize a plurality of cores that can be part of equipment such as equipment of a machine vision system. Such cores may be CPU, GPU, etc., which have accessible memory located locally to the cores. As an example, a machine vision system can be an inspection tool.

As an example, a system may utilize NVIDIA TENSORRT as built on a CUDA parallel programming model (NVIDIA, Santa Clara, California). Such an approach may allow for inference using framework libraries, development tools and technologies in CUDA-X AI for artificial intelligence, autonomous machines, high-performance computing, and graphics. TENSORRT provides INT8 and FP16 optimizations for production deployments of deep learning inference applications, which may be for real-time services, automatic and/or embedded applications.

As an example, a workflow can include importing a trained ML component from a framework into TENSORRT. Such a workflow can include applying adjustments for performance of inferencing. For example, TENSORRT can provide for selection of platform specific kernels to maximize performance on TESLA GPUs, JETSON embedded platforms, etc.

As an example, a trained machine may be utilized for one or more tasks to assess data. For example, consider image data that include features where a task can be to classify one or more features in the image data (e.g., determine what features may be included in an image). As an example, a feature may be an object or, for example, an object may be defined using one or more features. As an example, a trained machine can be utilized for object detection in data such as image data, which can be or include video.

As to machine learning, or training of a machine (e.g., a machine learning tool or ML tool), consider a domain where machine learning demands gathering a large amount of data, which may be randomly sampled from an underlying distribution and where the large amount of data (e.g., a large dataset) is used to train a ML tool that can perform some sort of prediction. Such an approach to machine learning may be characterized as a passive learning technique.

In passive learning, one of the more time-consuming tasks generating labeled data. Labeled data can be considered "ground truth" data in that one or more features have been detected with certainty and labeled with an appropriate moniker. For example, where photographic images may include dogs and cats, labeled data can be photographic images that have been examined and annotated by a human operating as an "oracle", where the human visually inspects each image to determine if a dog or a cat is present and then accordingly enters a corresponding label as a moniker representing either "dog" or "cat", which may be represented in a numeric or another form (e.g., "0" no dog or cat, "1" dog and "2" cat). Where a corpus of photographic images is large, the amount of time and/or the number of humans to annotate the photographic images may be large as well. For example, consider 1,000,000 photographic images and a human annotator assessment rate of 1 image per every 10 seconds. In such an example, a single human annotator would spend approximately 2,778 hours (e.g., (1,000,000 images*10 s)/(3600 s/h)) in assessing the corpus to arrive at a labeled dataset. In such an example, the labeled data set may be split into a training portion and a testing portion where the training portion is utilized to train a ML tool and where the testing portion is utilized to test the trained ML tool (e.g., one or more times during a machine learning process). In such an example, if the trained ML tool does not meet acceptable test criteria, further training may be performed, which can demand additional labeled data.

Various factors can confound collecting and/or labeling of data. For example, consider data that may be relatively expensive to acquire and/or data that may be relatively difficult to interpret. As an example, consider radiographs of rare types of brain tumors, which demand a sufficient number of patients and may demand one or more types of medical imaging data such as, for example, one or more of magnetic resonance imaging (MM) data and positron emission tomography (PET) data. Where tumors are poorly delineated, variegated, etc., the amount of time and/or expertise demanded from a human or humans may be substantial. As another example, consider seismic images acquired using seismology where seismic data acquisition can take a substantial amount of time to acquire using substantial resources (e.g., marine vessels, land vehicles, etc.). For labeling, an expert interpreter may be utilized that possesses skill in discerning subterranean geological features in seismic images (e.g., images formed from seismic amplitude traces, etc.). As yet another example, consider acquisition of subsea images, which may be sonic, light and/or of another type. In such an example, subsea features concerning equipment, operations, fluids, etc., may pose challenges to discern, particularly where damage, growth, sea creatures, etc., may exist. For example, a subsea image that includes a seabed and a broken piece of equipment that is sticking out of the seabed where the broken piece of equipment may be encrusted with coral or other creatures may make a visual assessment of the broken piece of equipment image problematic. In such an example, more than one human may be involved and an accurate assessment may take a substantial amount of time (e.g., hours or more).

As to active learning, it can be a machine learning approach that utilizes one or more techniques that aim to achieve greater accuracy with fewer training labels through selection of data from which learning is to be performed. An active learner may pose queries that may be in the form of unlabeled data instances to be labeled by an oracle, which, as mentioned, may be a human annotator. For example, consider an active learner that automatically selects an unlabeled image for labeling by a human. Active learning may be applied within one or more types of frameworks. For example, consider a framework that aims to handle unlabeled data that may be abundant and/or readily obtained where labels may be difficult, time-consuming, and/or expensive to obtain.

Active learning (e.g., query learning or optimal experimental design in the field of statistics) is a subfield of machine learning and, more generally, artificial intelligence (AI). Active learning assumes that, if a learning algorithm is allowed to select data from which it learns, it may perform better in generating a trained ML tool with lesser training demands. For a supervised learning system to perform well, it may demand training on hundreds, thousands, or more of labeled instances. Where labels come at little or no cost (e.g., digitally recognizable features such as words in a digital file, etc.), a learning system may use the labels to train a ML tool that can, for example, better filter junk email. Where one or more factors confound such an approach, active learning may be utilized.

An active learning system may be implemented in attempt to overcome the "labeling bottleneck", for example, by asking queries in the form of unlabeled instances to be labeled by an oracle (e.g., a human annotator). In such an approach, an active learner can aim to achieve a desired level of accuracy using a reduced number of labeled instances, which, for example, may help to minimize one or more costs of obtaining labeled data. In such an example, an active learning system may be able to operate within one or more constraints that may be placed upon data labeling (e.g., time constraints, resource constraints, etc.).

An active learner may utilize one or more techniques, which may be referred to as strategies. For example, consider a technique that utilizes an informativeness measure of unlabeled instances. In such an example, querying of unlabeled instances can involve uncertainty sampling, which can use probabilities. An uncertainty sampling approach can aim to inform a human when there is uncertainty about a task, which may "ask" the human for appropriate feedback. An uncertainty sampling approach may identify unlabeled data that "confuses" a ML tool. As such confusion can be undesirable, the unlabeled data that caused the confusion may be valuable if they are labeled and utilized for training (e.g., added to a training dataset).

Deep learning (e.g., deep structured learning) is part of a broader family of machine learning methods, which can utilize artificial neural networks with representation learning. In deep learning (DL), as in various other types of learning, learning may be characterized as one or more of supervised, semi-supervised or unsupervised.

Deep learning may offer a real-time solution to perform live-detection on an embedded device operating on the field. For example, an inspection technique can utilize a trained deep neural network where the trained deep neural network has been trained using a substantial amount of labeled data. As mentioned, where demand for training data is substantial, a bottleneck can arise. Such a bottleneck can be a barrier when constraints exist, which may confound an ability to establish an adequate ground truth.

As explained, observations can be domain specific, sensitive and therefore demand expert annotators. Moreover, labeling can be both expensive and time consuming. As an example, consider a scenario where data is available in quite a large quantity and an annotation budget is limited. In such a scenario, active learning may be beneficial. For example, consider an approach that includes incrementally selecting samples to be annotated based on their informativeness (e.g., how informative an unlabeled image may be to a ML tool).

As an example, an active learning framework can provide for better accuracy with fewer training samples. For example, consider an active learning framework that can be utilized in the context of object detection based inspection data, which may be from one or more machine vision instruments (e.g., one or more inspection tools, etc.).

As an example, a system may span end-to-end, from a data acquisition platform to deployment on an edge inspection platform. In such an example, the system may aim to be cost-effective and it may utilize sampling metrics and labeling enhancement methods. For example, consider a method that can include filtering out irrelevant data and utilizing one or more sampling metrics. Through such filtering, incoming data may be portioned such that data that are not deemed irrelevant via filtering can be a reduced set of data, which may expedite a selection process, for example, as to data deemed appropriate for oracle annotation. As mentioned, where one or more constraints exist, reducing oracle demands can be beneficial.

As an example, a system may be suitable for real-time implementation, for example, where the system may include one or more cloud-based applications. In such an example, a system can include one or more cloud-based components and one or more non-cloud-based components, which may include one or more edge components. As to an edge component, consider, for example, a machine vision instrument can include one or more processors, memory, a network interface and executable instructions that can provide for edge operability (e.g., communications with one or more cloud-based resources from an "edge" of a network). As an example, an edge component can include embedded circuitry that can perform one or more actions associated with a machine vision task. In such an example, embedded circuitry can include a trained component, which may be, for example, trained using local and/or remote resources. As an example, cloud-based resources may be utilized to generate a trained component that can be deployed to an edge component (e.g., embedding of a trained component at an edge). As an example, an inspection tool can be an edge component that can include an embedded trained machine learning component that is trained at least in part through active learning.

As an example, an active learning framework may be implemented for object detection. As mentioned, such a framework may be part of a system that can be an end-to-end data solution for inspection (e.g., from data acquisition to deployment) based on a combination of multiple types of metrics. For example, consider use of two or more of uncertainty of object classification, relevance filtering metric and localization correctness based on typicality and density metrics.

As an example, a framework can be utilized to build a sampling strategy, for example, by combining two or more of relevance, localization correctness and uncertainty metrics. As mentioned, active learning may aim to reduce demands on a human oracle for annotation (e.g., labeling). As an example, an active learning workflow can include sampling and selecting such that data selected for labeling by an oracle have some assurances as to ability to improve training of a machine learning tool. In such an example, sampling can involve extracting data where the extracted data are then subjected to a selection process.

As an example, a framework can utilize active learning where a trained machine learning model is utilized for one or more purposes in selecting data for labeling. In such an example, a selection process can involve assessing output from the trained machine learning model where less confident inferences (e.g., predictions) on unlabeled data can be utilized as an indicator that such unlabeled data is to be labeled such that, once labeled (e.g., by an oracle) to provide labeled data, the labeled data can be utilized to improve the trained machine learning model through further training. Such a process can be iterative where, for example, once the trained machine learning model achieves an acceptable level of confidence as to detection of features (e.g., objects, etc.), oracle-based labeling may be foregone and the trained machine learning model output, for example, for deployment in one or more machine vision systems (e.g., one or more inspection tools, etc.) for purposes of one or more inspection tasks.

As an example, where data are video data (e.g., video), extraction may optionally utilize one or more procedures of a compression algorithm. For example, consider a compression algorithm that includes processing of video to determine whether a frame can be utilized as an I-frame. Such processing may involve temporal and/or spatial analyses. As an example, an I-frame may be extracted from a stream of compressed video and then subjected to a selection process to determine whether or not the I-frame is to be further processed, for example, by a human annotator, etc. Such an approach may be referred to as a tiered approach as multiple processes are utilized to arrive at a selected frame.

As an example, a framework can include filtering of irrelevant examples (e.g., blurry, off topic or more generally, without labels) based on one or more predictions from an inspection learner (e.g., an object detector).

As an example, a framework can provide for estimating localization errors of one or more object detections, for example, by combining a typicality metric and a density metric.

As an example, a framework can provide for real-time pre-processing (e.g., from an acquisition platform) and real-time post-processing (e.g., to edge deployment).

As an example, a framework may provide for performing pool-based active learning on selected frames of a dataset of videos or a live video stream in a manner that involves incorporating an active learning strategy that combines uncertainty-based methods and diversity-based methods. As an example, such a framework may be coupled with one or more deep learning techniques, where the framework can process numerous and potentially redundant video frames while achieving high performance on object detection tasks with a limited labeling budget.

As an example, a system may provide for end-to-end active learning starting from raw videos (e.g., RGB, HSV, sonic, depth, thermal, multi-spectral, etc.). In such an example, one or more frame processing components can provide for tiered and/or un-tiered frame selection in real-time or near-real-time (e.g., consider a time frame of the order of a compression as performed by a codec, etc.).

As to video and compression, consider an acquisition technique that can include an acquisition codec (e.g., Motion-JPEG as used in DV, DVCPROHD, MPEG-2 as used in the SONY XDCAM HD and HDV, and H.264 as used in AVCHD, and many digital SLR cameras). Such a codec can aim to provide as high a quality as possible while meeting data rate constraints of an on-board storage mechanism. As to streaming, consider one or more of MPEG-2 for DVD, broadcast and satellite, MPEG-2, VC-1 and H.264 for BLU-RAY, and H.264, VP6, WMV, WEBM, etc., formats for streaming delivery. In streaming, a codec may aim to match a data rate of a delivery platform, which in the case of streaming, tends to be below an acquisition rate.

Various codecs utilize different types of frames (e.g., I-frames, B-frames and P-frames), which may form a Group of Pictures (GOP). As an example, intra-frame (I-frame) prediction can exploit spatial redundancy, for example, correlation among pixels within one frame, by calculating prediction values through extrapolation from already coded pixels for effective delta coding. As an example, inter-frame prediction (e.g., B-frames and P-frames) can exploit temporal redundancy. As an example, a workflow can include exploiting one or more of spatial and temporal aspects of a frame or frames. In such an example, such exploiting may be utilized as a round in a multi-round process for frame selection for purposes of active learning.

As an example, a video compression process may perform various actions such as partitioning that partitions a frame into macroblocks, transformation (e.g., using a DCT or wavelet transform), quantization and entropy encoding.

As an example, an active learning strategy can combine uncertainty-based strategies and diversity-based strategies in an effort to identify most informative images at each active learning iteration in an iterative learning process. In such an example, the most informative images may be those for which trained machine learning model-based inferences (e.g., predictions) thereon for at least some desired features (e.g., objects to be detected) are of low confidence (e.g., poor performance). Through further training using such informative images, generation of an acceptably trained machine learning model may be expedited, optionally in a manner that optimizes resource utilization (e.g., use of one or more human annotators, etc.).

FIG. 1 shows an example of a system 100 that includes various types of equipment where one or more of the types of equipment may be in communication using one or more communication technologies (e.g., one or more network technologies, etc.). As shown, the system 100 can include a satellite 111, surface equipment 112, 113, 114 and 115, subsea surveillance equipment 121, 122, 123, 124 and 125 and subsea fluid equipment 131, 132, and 133. The surface equipment can include a floating production, storage and offloading (FPSO) vessel 112, which may be coupled to a tanker 115 and various other equipment. For example, the FPSO vessel 112 may be in fluid communication with the subsea fluid equipment 131 where the FPSO vessel 112 may receive hydrocarbon fluid that may be pumped to the tanker 115. The surface equipment can include an offshore platform 113, which may be in contact with a seafloor (e.g., a seabed) and in fluid communication with the subsea fluid equipment 132. The surface equipment can include an offshore platform 114, which may be a tension leg type of platform and in fluid communication with the subsea fluid equipment 133.

As to the subsea surveillance equipment, it can include a wave glider 121, a glider 122, a remotely operated vehicle (ROV) 123, an autonomous underwater vehicle (AUV) 124, and/or a manned underwater vehicle (MUV) 125. As an example, one or more of the subsea surveillance equipment 121, 122, 123, 124 and 125 may be operatively coupled to one or more other pieces of equipment, for example, for control and/or data transmission. As an example, the subsea surveillance equipment 121, 122, 123, 124 and 125 can include data acquisition equipment, which can include one or more imaging devices that can acquire image data in a subsea environment. Such image data may be visual, sonic, infrared, laser, or another type of image data. As an example, image data may be multi-dimensional point data such as a point cloud (e.g., consider LiDAR, etc.). As an example, image data may be volumetric and amenable to slicing into 2D slices. As an example, a fly-through video may be generated by forming a sequence of 2D slices that can be rendered over time.

As an example, a system may be utilized to assess image data to detect one or more features in a subsea environment. In such an example, the system may be a surveillance system that may include detection capabilities, for example, to detect one or more conditions that may warrant action as to status of one or more pieces of subsea equipment (e.g., a damaged pump, a leaking valve, a shifted piece of equipment, a covered piece of equipment, an uncovered piece of equipment, etc.).

Figure 2:
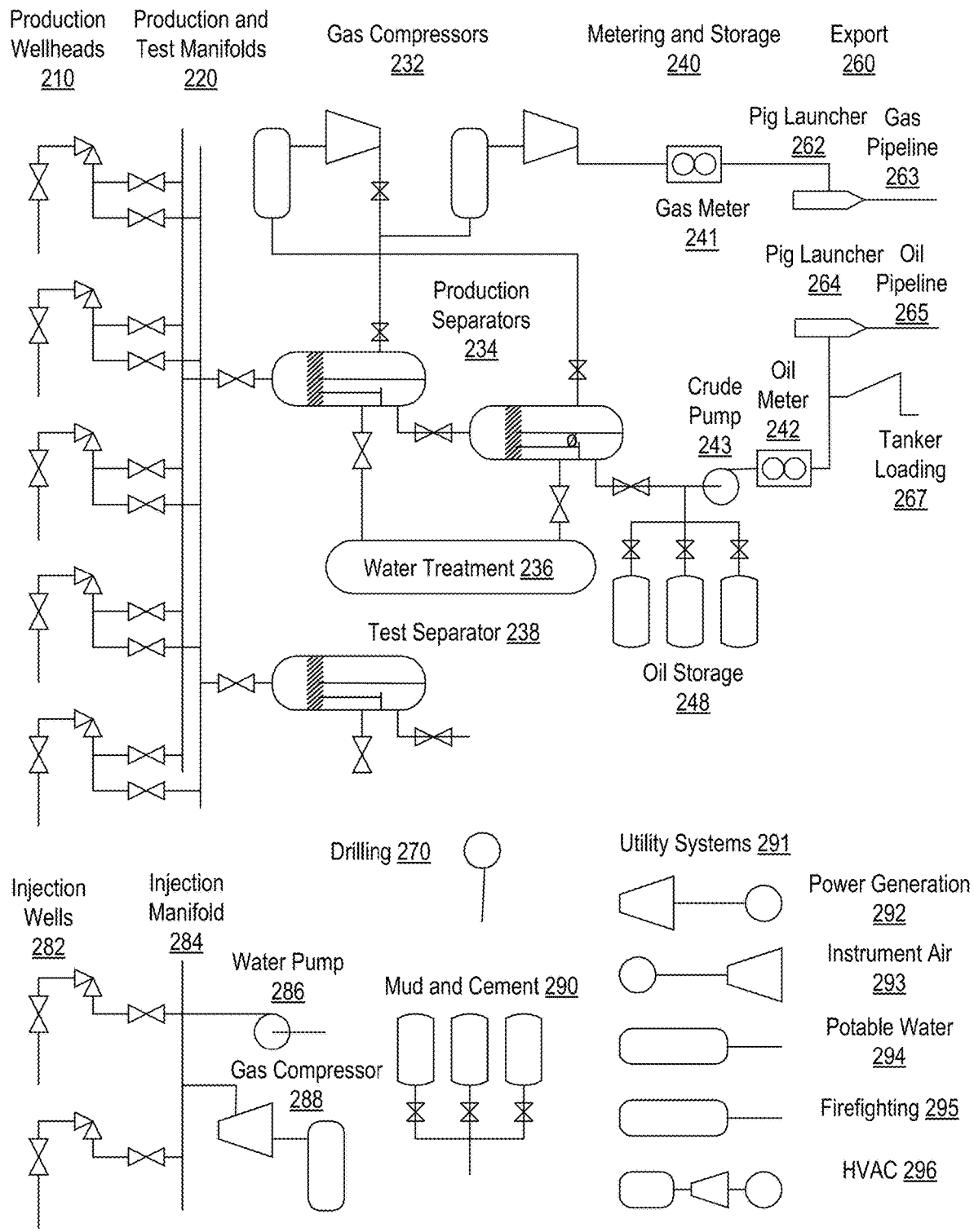
FIG. 2 illustrates examples of equipment.

FIG. 2 shows an example of a schematic 200 that includes various types of equipment that may be utilized in or with a subsea environment. For example, one or more of the schematically illustrated types of equipment of the schematic 200 may be included in the system 100 of FIG. 1.

As shown, a system may include one or more production wellheads 210; one or more production and/or test manifolds 220; one or more gas compressors 232, one or more production separators 234, one or more water treatment units 236, and one or more test separators 238; one or more metering and storage units such as a gas meter 241, a crude oil pump 243, an oil meter 242, and oil storage tanks 248; one or more export units 260 such as one or more pig launchers 262 and 264, one or more gas pipelines 263, one or more oil pipelines 265, and one or more tanker loading conduits 267; one or more pieces of drilling equipment 270; one or more injection wells 282, one or more injection manifolds 284, a water injection pump 286, and a gas compressor 288; one or more pieces of mud and cement equipment 290; and one or more utility systems 291 such as a power generation system 292, an instrument air system 293, a potable water system 294, a firefighting system 295 and an HVAC system 296.

As mentioned, various types of equipment may be in a subsea environment and may demand inspection to determine equipment status and/or operational status. As an example, inspection may be via one or more surveillance systems that can include, for example, one or more imaging-based surveillance systems. As an example, an imaging-based surveillance system can utilize one or more active learning frameworks, which may be utilized for machine learning as to one or more ML tools that can provide for object detection and/or one or more other types of detections. As an example, object detection can include detection of a solid object, a fluid object, or another type of object. As an example, a pipeline can be a solid object (e.g., a pipe) that includes a fluid object (e.g., a liquid and/or a gas). As to object detection, consider detecting a solid object that is partially extending from sand, which may be another type of object. In such an example, object detection may provide for distinguishing a solid object sitting on sand from a solid object partially submerged in sand. As an example, where the solid object is a pipe, object detection may detect a status such as broken or not broken (e.g., intact). Further, object detection may detect a fluid object, upon which an inference may be made that a pipe (or other solid object) is "broken" (e.g. some type of failure has occurred). For example, consider detection of fluid emerging from sand where a solid object may be below a surface of the sand (e.g., a seabed surface). The foregoing examples as to object detection demonstrate complexity in statuses of equipment in a subsea environment. Such statuses, as captured in one or more images, may place substantial demands on labeling where labeled images are to be utilized in machine learning to generate a ML tool.

Figure 3:
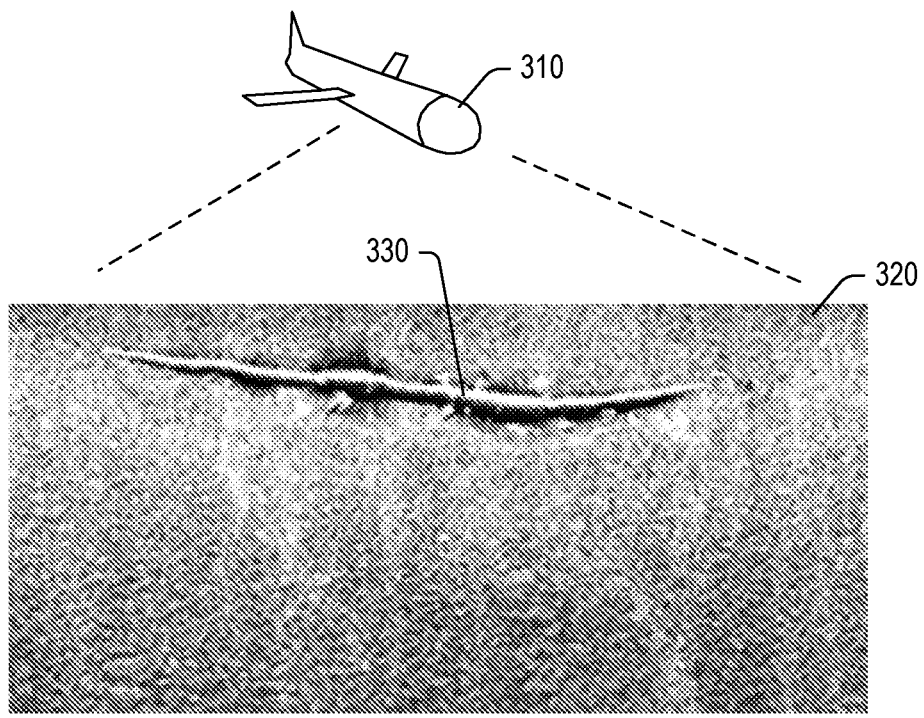
FIG. 3 illustrates an example of surveillance equipment and an image of subsea equipment in a subsea environment.

FIG. 3 shows an example of a surveillance vehicle 310 and an image 320 of a portion of a subsea environment as acquired using the surveillance vehicle 310. In such an example, an inspection tool may desire output of one or more features, what a scene entails, why a scene appears as it does and what action may be suitable given a scene (e.g., control of the surveillance vehicle 310, issuance of an alarm, triggering further training of a machine learning model, etc.). In the example of FIG. 3, the image 320 is a side scan sonar image of an exposed portion of a subsea pipeline 330. A side scan sonar (SSS) instrument can acquire image data where objects that have a high-level backscatter appear bright (e.g., boulders, pipelines, and artificial objects) while object that have a low level of backscatter appear more gray (e.g., sand). Sonar mapping may utilize an AS technique where a transducer generates an acoustic pulse or "ping" and listens for an echo of the pulse due to reflection from one or more objects in a subsea environment where amplitude of the reflection provides a measure of backscatter. As an example, sonar mapping may utilize multibeam bathymetry. As an example, an underwater vehicle may include one or more sonic instruments that can provide image data for surveying one or more pieces of subsea equipment.

In SSS, an underwater vehicle can be towed by a ship that carries sonar transducers on its starboard and port sides, and as the vehicle progresses along a predetermined path, an array of transducers pings the seafloor. By adjusting the ping angle through the use of a line array of transducers, a swath of seafloor can be monitored at once. Since the angle cannot readily be extended to be directly below the vehicle, SSS scans have a darkened blind spot that runs along the middle of the image. From SSS scans, certain problems with pipes can be detected, such as free spanning, which can be determined by analyzing the acoustic shadow cast by the pipeline. Cracks in a concrete coating around a pipeline may appear as anomalous shadows on the pipeline. Furthermore, pipeline movements, or "pipe walking" may be deduced by observing for marks on the seafloor near a pipeline. Anchor scars left by ship anchors dragging along the seafloor may hint at possible damage, especially if the scars cross the pipeline. Various approaches arising from the use of SSS may focus on data processing to integrate multiple sonar scans to form a coherent and accurate picture of the seafloor. SSS may assume that a seafloor is flat and thus may be less accurate for uneven seafloors. As an example, a wide band approach to sonar may be utilized to acquire image data (e.g., WBS). As an example, WBS may be utilized to inspect subsea equipment and may be utilized to provide information on flow assurance (e.g., whether flow is being obstructed by a foreign body, etc.).

Offshore pipeline failures may be categorized, for example, consider the following categories: equipment failure, external forces (e.g. human error), corrosion, weather/natural causes, and vessel/anchor/trawl damage. Where image data are lacking in analysis, cause of failure may be more difficult to determine. Where a system operates with adequate object detection capabilities, a cause of failure may be more readily determined and, for example, provide for a more rapid mitigation effort. For example, corrosion tends to be a more predominant cause of small leaks; whereas, vessel-related accidents tend to be more prevalent in large leaks. Where a ML tool trained at least in part via active learning can be utilized to more accurately analyze image data (e.g., as to equipment, fluid, sand, etc.), earlier detection may be possible as well as cause of failure, which may provide for better intervention and outcomes.

Offshore pipelines can be extensive. For example, in the U.S. Gulf of Mexico, from 1952 to 2017, over 45,000 miles (approximately 72,000 km) of pipeline was installed. Portions of a pipeline may be at substantial depth. For example, consider a portion in the U.S. Gulf of Mexico that is installed at 9,500 ft (approximately 2,900 m). Where a surveillance vehicle travels at a velocity of approximately 10 miles per hour (mph), 1,000 miles of pipeline would take 100 hours. Where video images are acquired at a rate of 24 frames per second (fps), the survey would acquire 8,640,000 frames. If each frame demanded 10 seconds from a human annotator, it would take 24,000 hours to assess the 8,640,000 frames.

As to depth and light, the ocean is divided into three zones. Sunlight entering the water may travel about 1,000 m (3,280 ft) into the ocean under the right conditions, but there is rarely much light beyond 200 m (656 ft). The upper 200 m (656 ft) of the ocean is called the euphotic zone or "sunlight" zone. The zone between 200 m (656 ft) and 1,000 m (3,280 ft) is usually referred to as the "twilight" zone or the dysphotic zone. In this zone, the intensity of light rapidly dissipates as depth increases. Such a minuscule amount of light penetrates beyond a depth of 200 meters that photosynthesis is no longer possible. The aphotic zone or "midnight" zone exists in depths below 1,000 m (3,280 ft). Sunlight does not penetrate to these depths and the zone is bathed in darkness.

As to machine vision instruments, light-based, non-light-based and/or artificial light-based equipment may be utilized, for example, depending on depth of surveillance. As an example, a machine vision instrument may utilize one or more acoustic techniques and/or one or more electromagnetic techniques for performing inspection, which can include acquisition of data such as frame data, image data, video data, etc.

While various surveillance-related examples are given as to pipelines, surveillance as to one or more other types of subsea equipment may be improved through active learning.

As an example, a system may provide for surveillance with an autonomous underwater vehicle (AUV) of one or more subsea assets (e.g., as to integrity, etc.) where an inference (e.g., resulting from active learning of a ML tool) can occur in real-time in an embedded mode (e.g., an edge device) to compress a mission duration whilst maximizing detection likelihood of one or more features of interest. In such an example, a method can include controlling one or more parameters of operation of the AUV (e.g., itself and/or instrument(s) thereof). For example, consider controlling speed of the AUV based on features present in a field of view (FOV) and/or one or more features ahead, which may be further below a path of the AUV (e.g., optionally detected by one or more other sensors).

As to some examples of features, objects and/or classes in subsea inspection consider: strake, fairing, anode, bullseye, orientation level, slide indicator, umbilical buoyancy, marine debris, coating, valve indication, anode measurement, buried flowline, flowline free span, flowline joint, insulation, corrosion, fishing line, choke indicator, cobra head, jumper, etc. As to some examples of features, objects and/or classes in areal inspection consider engine, fuel tank, power end, transmission, fluid end, radiator, etc. As explained one or more features, objects, etc., may be in a state that can be assigned a status, which may be a detectable status through use of an inspection tool or inspection tools.

As mentioned, seismic images may be interpreted using a ML tool. In such an example, considering seismic sections as input unlabeled datasets and manual interpretations performed by one or more expert interpreters for labels, an active learning approach may be utilized to reveal, to one or more users, a more meaningful subset of seismic sections to be labelled; rather than asking for interpretation of a full set of seismic sections. As an example, in an active learning approach, machine learning assisted labeling may be implemented to perform labeling (seismic interpretation) on one or more remainders, which can thereby reduce the fastidious labeling task substantially while improving overall prediction accuracy.

As an example, a system can provide for increased automation of inspection tasks by addressing a labeling bottleneck through active learning. For example, such a system can implement one or more active learning for labeling data, which can include training of one or more inspection learners (e.g., one or more object detectors, etc.).

As explained, inspection systems can generate a great amount of data; however, a substantial portion may be irrelevant for one or more reasons. For example, consider anomalous data (e.g., real world conditions, hardware or communication failures leading to noise, saturations, etc.) or off-topic data (e.g., acquisitions covering more than an inspection scope). The latter observations may be rather confusing even for expert human annotators, which are likely to produce inconsistent labels and ultimately harm inspection learner performance. To reduce demands on annotators, a system may implement one or more filters to filter out such observations ("obs"). As an example, a framework can utilize a relevance metric that detects irrelevant data based on inspection learner operation to build one or more edge applications for performing one or more inspection tasks.

As mentioned, active learning can include an uncertainty-based sampling strategy; however, at times, an inspection learner can be wrongly confident about its predictions (e.g., consider a missed detection). A metric referred to as typicality can be used to gauge how an inspection learner's estimated labels deviate from a distribution of labels produced by one or more annotators and therefore identify questionable estimations. However, use of a typicality metric alone will tend to select outliers of an input space, which can make a training set less representative. To address outlier bias, a framework can combine a typicality metric with a representativeness metric such as density. In such an example, density may be utilized to provide an inlier bias that can counteract an outlier bias. As an example, a framework can include a localization correctness metric that computes a typicality score directly from predicted labels that can be combined with a density estimation in an input space, for example, consider a density estimation pre-computed prior to an active learning phase.

As an example, a framework can provide a valuable sampling strategy by combining relevance, typicality, density and uncertainty metrics, which may thereby provide a highly optimized approach to machine learning aided by a labeling tool that can be multi-user and, for example, operate in real-time.

As explained, to improve efficiency where resources may be constrained (e.g., limited, etc.), a framework may aim to make best use of each available minute of each available annotator. In the case of multi-labeled inspection tasks (e.g., multiple labels for a single observation), a framework can provide for speeding up the labeling task by partially labeling observations with most confident labels so that an annotator can focus on the least confident labels. Additionally, a framework can offer a mechanism for an annotator to review one or more predicted labels, as it may be faster to validate or reject a predicted label than create a label from scratch (e.g., it may be an utterly tedious task for object detection and even more for segmentation).

An aspect of active learning can be that an inspection learner demands training before an acquisition of new observations for labeling such that scores are updated. Such an aspect can be detrimental to real-time implementation. As explained, training takes some amount of time and, for various reasons, it can be suboptimal to make one or more annotators wait for new observations to arrive. As an example, a framework can provide for fine-tuning an inspection learner and sampling observations by batches help mitigate waiting issues. As an example, a framework can generate a queue of observations batches that can be updated when an inspection learner is trained and new scores successfully computed. In such an approach, inspection learner training can be iterative.

As explained, a system can include implementing active learning for object detection where the system can include one or more filters for filtering out irrelevant data during active learning, for example, based on output from an inspection learner. As explained, a system can include one or more estimators for estimating localization errors where, for example, such localization errors may be combined with uncertainty sampling. As an example, a localization-based metric can be composed of multiple metrics such as, for example, typicality that captures outliers in the output space of the object detector and density that captures inliers in the input space. As an example, a system can include a pre-processor and a post-processor where such processors can be utilized to improve active learning.

In various instances, relevance for active learning irrelevant observations filtering can result in some amount of relevance bias where a relevance classifier influences a learner's uncertainty-based rankings so that irrelevant observations are less likely to be selected for annotation. As an example, a framework can provide filtering that can filter irrelevant observations according to one or more criteria such as, for example, anomalous and off-topic. For example, rather than using a classifier that demands training, a framework may provide for estimating relevance directly from outputs of an object detector. In such an approach, an inspection learner can be generated that inherently captures information for estimating relevance such that the framework makes the computation of relevance computationally efficient compared to using a specific relevance classifier.

In various instances, active learning may involve computing an atypical score on a feature vector extracted for each observation. As an example, a framework may provide for computing typicality directly on predicted labels for a given observation. While such an approach can be less generic, as a typicality learner that outputs the typicality score demands some redesign when the form of labels changes, it can allow for use of a custom typicality metric that suits one or more inspection tasks. As an example, a framework may utilize a spatial representation of labels that allow for exploiting spatial arrangements among objects, for example, for identification of what may be considered odd arrangements.

In various instances, use of density in active learning can be prone to querying outliers. Such outliers may be unlikely to improve accuracy on data as they may not be representative of the rest of the data. To address such an effect, an information density approach may be utilized. For example, information density may be computed for a data point as the mean similarity to other data points in a set. The similarity function can be, for example, cosine similarity. As an example, a framework can include a typicality learner that aims to capture outliers in an output space for detection of localization errors, though such an approach may be likely to also capture outliers in an input space. To address such an issue, as an example, a framework may utilize a similar density metric that can be combined with a typicality metric. For example, rather than calculating similarities in the input space, a framework can operate to extract deep features from images with a convolutional neural network (CNN) pre-trained on a large visual database (e.g., consider ImageNet, etc.) and then compute density with a Gaussian kernel similarity function (e.g., rather than a cosine similarity function).

As an example, a framework can provide one or more metrics that consider spatial information to compute uncertainty. In such an example, localization errors can be captured by a combination of density and typicality metrics.

As an example, a framework can provide for typicality learning. In various instances, an approach may compute typicality using deep features extracted during inference with an inspection learner on unlabeled observations. As an example, a framework can include typicality learning using features extracted from labels. As an example, a framework may utilize an enhanced deep learning-based solution for the problem of feature learning in one-class classification.

As to object detection, a framework can include one or more object detectors where an object detector or object detectors may be selected based on one or more aspects of an inspection task or tasks. As an example, the "You Only Look Once" (YOLO) object detector may be utilized (e.g., YOLO version 3, "YOLOv3"). As an example, a framework can provide flexibility and extensibility to switch seamlessly between detectors for an inspection learner.

The YOLO object detector can operate by applying a single neural network to an image input where the neural network divides each input image into an S by S grid where each grid cell predicts a predetermined number of bounding boxes. These boxes can predict the x coordinate, y coordinate, width, and height of an object. The boxes can also include a confidence score of how sure they are the object is of the class identified.

Figure 4:
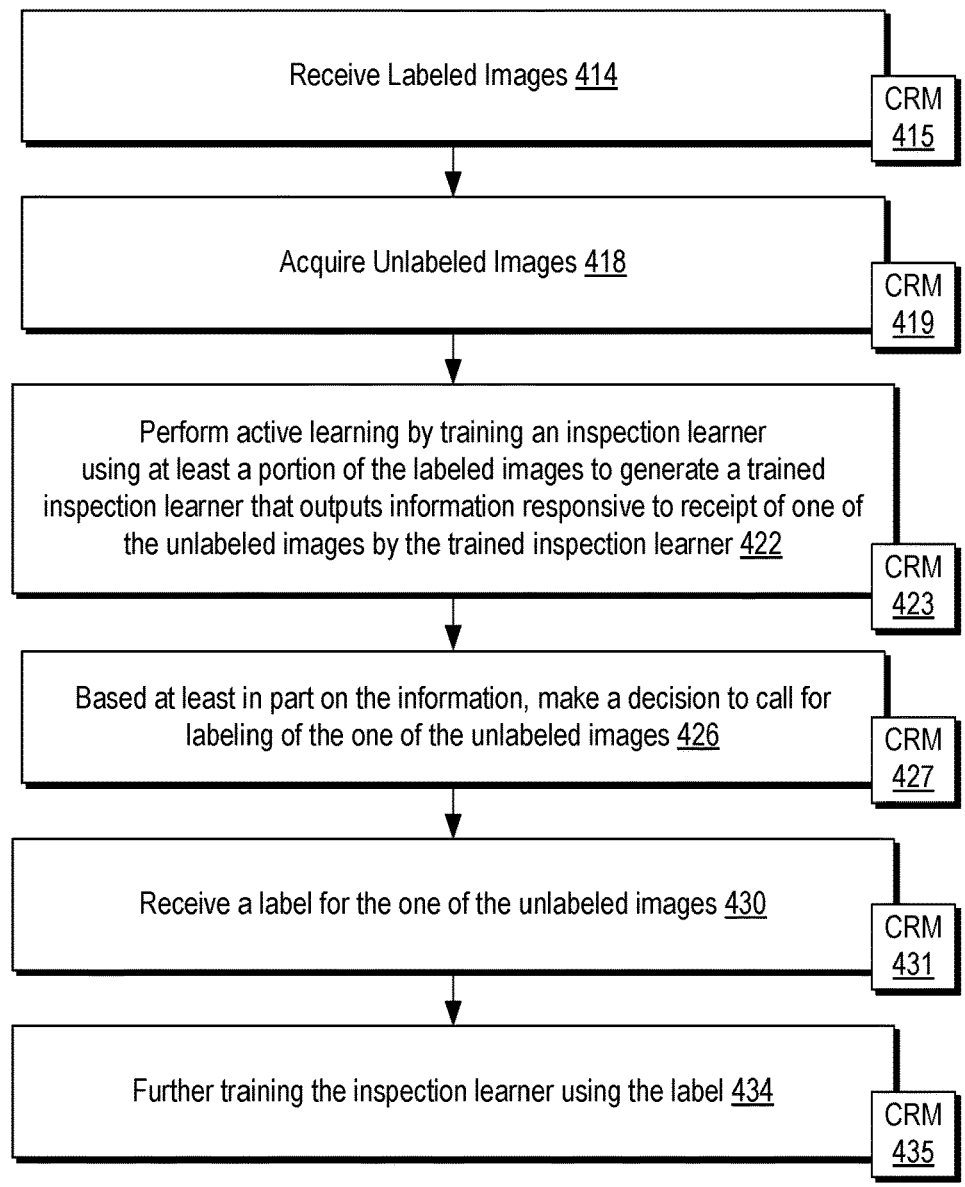
FIG. 4 illustrates an example of a method and a system.
Figure 4:
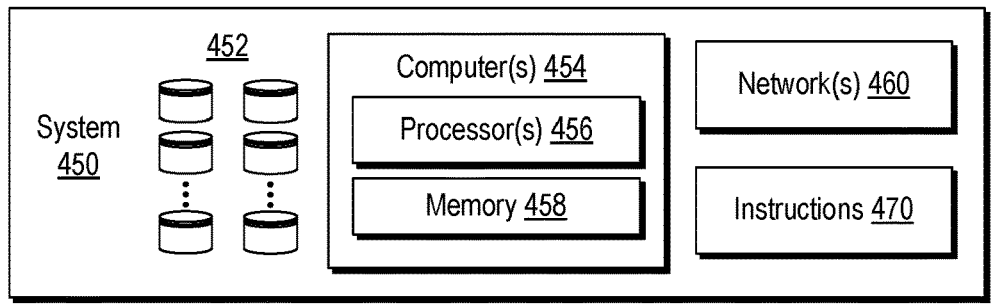

FIG. 4 shows an example of a method 410 that includes a reception block 414 for receiving labeled images; an acquisition block 418 for acquiring unlabeled images; a performance block 422 for performing active learning by training an inspection learner using at least a portion of the labeled images to generate a trained inspection learner that outputs information responsive to receipt of one of the unlabeled images by the trained inspection learner; a decision block 426 for, based at least in part on the information, making a decision to call for labeling of the one of the unlabeled images; a reception block 430 for receiving a label for the one of the unlabeled images; and a further training block 434 for further training the inspection learner using the label.

FIG. 4 also shows an example of a system 450 that includes one or more information storage devices 452, one or more computers 454, one or more networks 460 and one or more sets of instructions 470. As to the one or more computers 454, each computer may include one or more processors (e.g., or processing cores) 456 and memory 458 for storing instructions, for example, executable by at least one of the one or more processors. As an example, a computer may include one or more network interfaces (e.g., wired or wireless), one or more graphics cards, a display interface (e.g., wired or wireless), etc. As an example, imagery such as surface imagery and/or subsurface imagery (e.g., satellite, subsea instrument, geological, geophysical, etc.) may be stored, processed, communicated, etc. As an example, data may include SAR data, GPS data, etc. and may be stored, for example, in one or more of the storage devices 452.

As an example, the one or more sets of instructions 470 may include instructions (e.g., stored in memory) executable by one or more processors to instruct the system 450 to perform various actions. As an example, the system 450 may be configured such that instructions can establish a framework or a portion thereof. As an example, one or more methods, techniques, etc. may be performed using one or more sets of instructions, hardware circuitry, etc.

The method 410 is shown in FIG. 4 in association with various computer-readable media (CRM) 415, 419, 423, 427, 431, and 435. Such blocks generally include instructions suitable for execution by one or more processors (or processor cores) to instruct a computing device or system to perform one or more actions. While various blocks are shown, a single medium may be configured with instructions to allow for, at least in part, performance of various actions of the method 400. As an example, a computer-readable medium (CRM) may be a computer-readable storage medium that is non-transitory and that is not a carrier wave.

Figure 5:
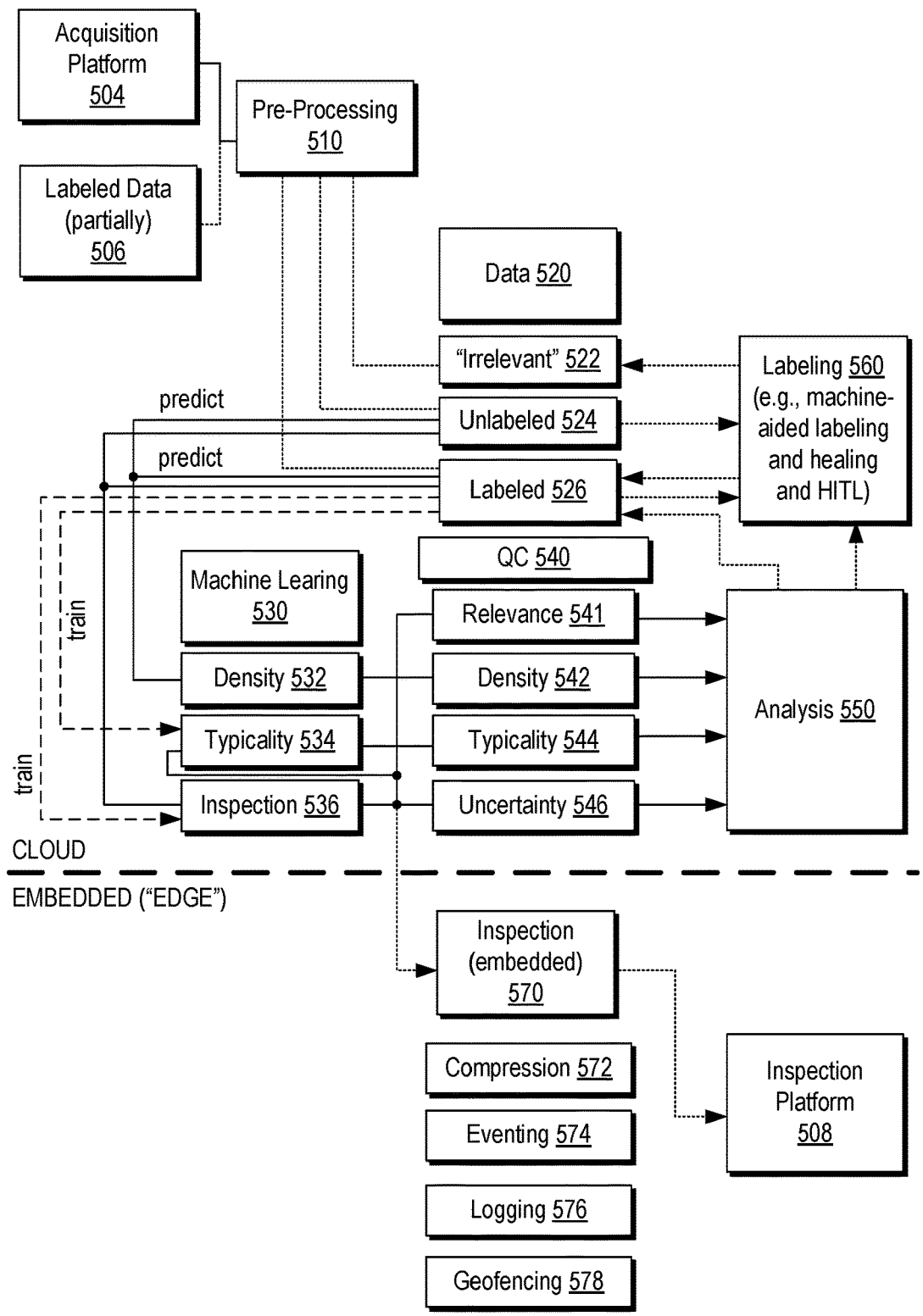
FIG. 5 illustrates an example of a framework.

FIG. 5 shows an example of a framework 500 that includes various components that may be deployed using cloud-based resources and various components that may be deployed using edge-based resources. As an example, an acquisition platform 504 and an inspection platform 508 can be part of an edge-based system. For example, consider a machine vision instrument that can be or include the acquisition platform 504 and the inspection platform 508. As an example, the framework 500 may provide for implementation of one or more actions of the method 410 of FIG. 4. As an example, the framework 500 may utilize one or more components of the system 450 of FIG. 4.

As shown in the example of FIG. 5, the framework 500 can include a source of labeled data 506, which may be partially labeled data. In the example of FIG. 5, a pre-processing component 510 can receive data from the acquisition platform 504 and/or the source of labeled data 506. The pre-processing component 510 can aim to provide for grouping data into appropriate data pools. For example, a data component 520 includes three examples of data pools, including an irrelevant data pool 522, an unlabeled data pool 524 and a labeled data pool 526. The data component 520 is shown as being interactive with various other components, including, for example, a machine learning component 530 and a labeling component 560. As shown, the machine learning component 530 can provide output to a quality control (QC) component 540, which can provide output to an analysis component 550. The analysis component 550 can provide output to the labeling component 560 as well as, for example, the data component 520. As mentioned, various components can be implemented using cloud-based resources, which are demarcated in the example of FIG. 5 with a thick dashed line separating cloud and edge, which may be remote and local.

In the example of FIG. 5, the machine learning component 530 includes various sub-components, which may also be referred to as components. For example, the machine learning component 530 includes a density component 532, a typicality component 534 and an inspection component 536, which can be an inspection learner.

In the example of FIG. 5, the QC component 540 includes various sub-components, which may also be referred to as components. For example, the QC component 540 includes a relevance component 541, a density component 542, a typicality component 544 and an uncertainty component 546.

FIG. 5 shows various lines labeled "predict", which represent a prediction process or prediction processes and shows various lines labeled "train", which represent a training process or training processes. In particular, the unlabeled data pool 524 and the labeled data pool 526 are each operatively coupled to the density component 543 and the inspection component 536 of the machine learning component 530 for purposes of prediction and the labeled data pool 526 is operatively coupled to the typicality component 534 and the inspection component 536 of the machine learning component 530 for purposes of training. In such an approach, training can occur for one or more of the machine learning components 530 using labeled data of the labeled data pool 526, which as shown, can be sourced from one or more sources such as, for example, the labeled data source 506, the labeling component 560 and/or the analysis component 550.

In the example of FIG. 5, the QC component 540 can provide output to one or more of the analysis component 550, the typicality component 534 of the machine learning component 530 and an inspection component 570, which may be an edge component (e.g., implemented using edge resources) that may be embedded in a machine vision instrument or machine vision system (e.g., the inspection platform 508, etc.).

As shown in FIG. 5, the inspection component 570 may provide for interaction with one or more of a compression component 572, an eventing component 574, a logging component 576, a geofencing component 578 and one or more other components. Such components can be part of a machine vision instrument or system. For example, compression can be applied to image acquisition, image storage, image transmission, etc.; eventing can be applied to image acquisition, image storage, image transmission, etc.; logging can be applied to image acquisition, image storage, image transmission, etc.; and geofencing can be applied to image acquisition, image storage, image transmission, etc. As an example, one or more operational parameters of a remote system may be set or controlled using the inspection component 570. Such operational parameters may include navigational parameters, imaging circuitry parameters, image and/or data compression parameters, event-related parameters, log-related parameters, geo-spatial parameters (e.g., as to geofencing, etc.), etc.

As explained, a framework may aim to optimize demands placed on a human annotator or human annotators. For example, the labeling component 560 in the framework 500 can provide for outputting information to a display of a computing system to facilitate human annotation. The labeling component 560 may provide for machine learning-aided labeling and/or healing. Such a component may be considered to be a "human in the loop" (HITL) component. As shown in FIG. 5, the labeling component 560 can receive information output by the analysis component 550 and receive data from the unlabeled data pool 524 and optionally data from the labeled data pool 526. As shown, the labeling component 560 can provide for outputting data deemed irrelevant to the irrelevant data pool 522 and for outputting data that are labeled data to the labeled data pool 526. The framework 500 in the example of FIG. 5 may aim to optimize how and when the labeling component 560 is utilized.

The framework 500 may be utilized in an end-to-end approach that includes acquisition of training data (e.g., acquisition platform 504, which can include an AUV, remotely operated vehicle, drone, etc.) to deployment of a trained inspection learner on one or more edge-based platforms such as the inspection platform 508. In such an approach, an edge-based platform can provide for analyzing and post-processing live observations. As an example, an edge-based platform may include one or more types of resources for performing computations. For example, consider one or more of NVIDIA JETSON, TX2/XAVIER, INTEL MOVIDIUS, etc.

As mentioned, passive learning can involve selecting random observations, labeling them and training an inspection learner using the randomly selected and labeled observations. In contrast, active learning can aim to reduce demands for interactions with a human annotator(s), for example, by iteratively training an inspection learner and by picking informative observations to be labeled in a manner that exploits weaknesses of the inspection learner. Such an iterative process can be referred to as an active learning loop.

Figure 6:
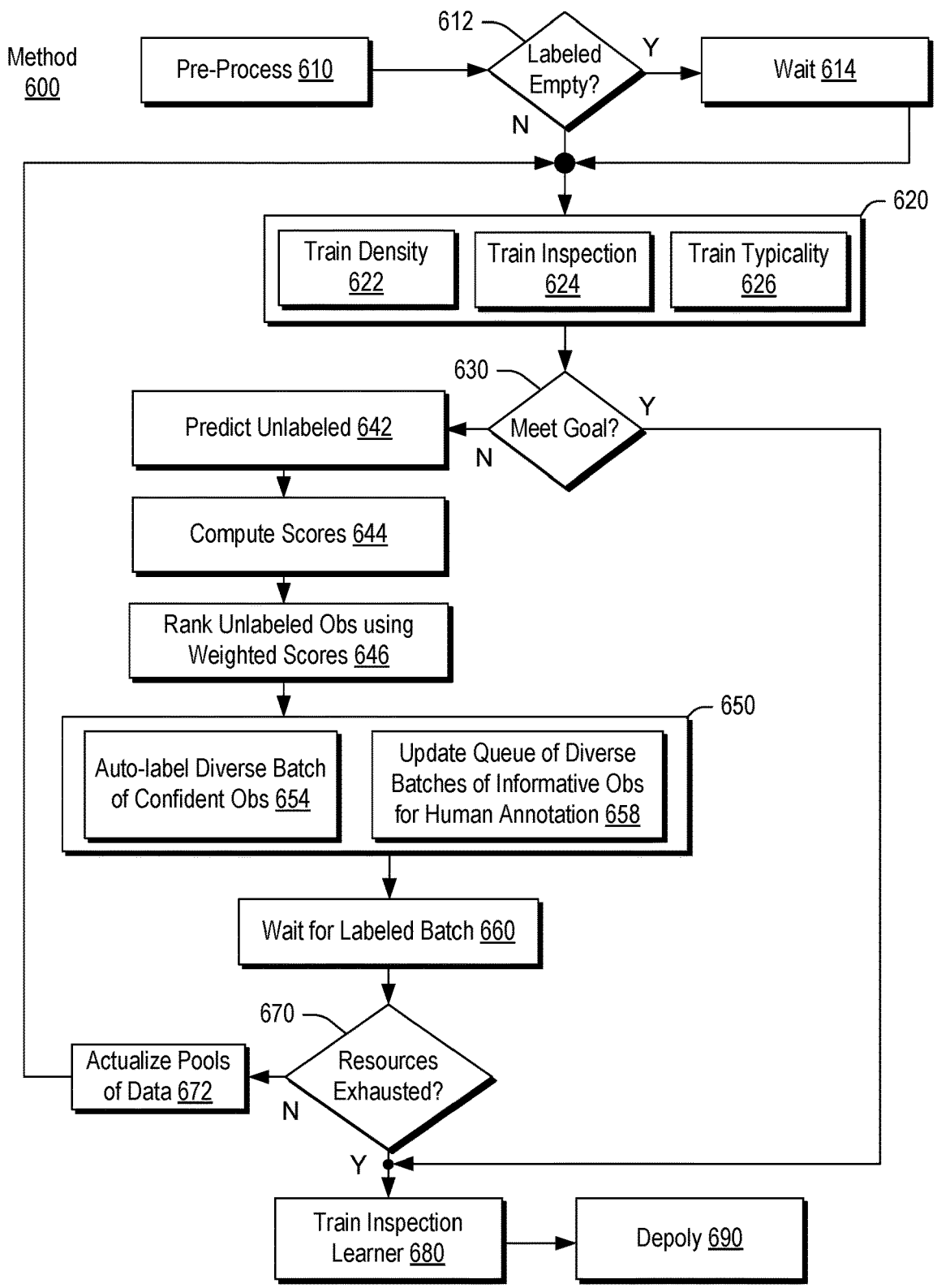
FIG. 6 illustrates an example of a method.

FIG. 6 shows an example of a method 600 that includes an active learning loop. The method 600 may be implemented using one or more components of the framework 500 of FIG. 5. As shown, the method 600 can include a train block 680 for training of an inspection learner through an active learning process where a trained inspection learner can be generated and deployed per a deployment block 690. As explained, an inspection learner can be an object detector, which can be a machine learning tool. As mentioned, an object detector such as the YOLOv3 object detector can utilize a machine learning model that is a neural network where a trained YOLOv3 object detector can be relatively fast, computationally, which can make it suitable for various types of real-time and/or near-real-time inspection tasks.

As shown, the method 600 includes a pre-process block 610 for pre-processing data (see, e.g., the pre-processing component 510 of FIG. 5), a decision block 612 for deciding whether a labeled data pool is empty (see, e.g., the labeled data pool 526 of FIG. 5), a wait block 614 for waiting for a minimum number of labeled observations if the decision block 612 decides that the labeled data pool is empty, and a train block 620 for training one or more machine learning tools where the train block 620 can include a train density block 622, a train inspection block 624 and a train typicality block 626 for machine learning tool training (see, e.g., the machine learning component 530, density component 532, typicality component 534, and inspection component 536 of FIG. 5). As shown, if the decision block 612 decides that the labeled data pool is not empty, the method 600 can continue directly to the train block 620; whereas, if the decision block 612 decides that the labeled data pool is empty, the method 600 can continue to the train block 620 where, upon waiting, a number of minimum labeled observations become available.

As shown in the example of FIG. 6, the method 600 continues from the train block 620 to a decision block 630 for deciding whether one or more targeted goals as to training of the one or more machine learning tools are met. Where the decision block 630 decides that such one or more goals have been met, the method 600 continues to the train block 680 for training an inspection learner (e.g., an object detector, etc.); otherwise, where the decision block 630 decides that such one or more goals have not been met, the method 600 continues to a prediction block 642 for predicting using a pool of unlabeled data (see, e.g., the unlabeled data pool 524 of FIG. 5), which proceeds to a computation block 644 for computing one or more scores as to one or more of typicality, density, uncertainty and relevance (see, e.g., the QC component 540 of FIG. 5) and then a rank block 646 for ranking unlabeled observations using weighted scores.

As shown in the example of FIG. 6, the method 600 can continue to a labeling block 650 that can perform auto-labeling of a diverse batch of confident observations per an auto-label block 654 and/or can perform updating of a queue of one or more diverse batches of informative observations for human annotation(s) per an update block 658. The method 600 can include a wait block 660 for waiting for results from the labeling block 650, for example, to wait until a labeled batch is available or labeled batches are available from auto-labeling and/or human annotation.

The method 600 can include a decision block 670 for deciding whether resources may be exhausted. For example, consider human annotation resources, computational resources, machine vision instrumentation resources, etc., may be constrained and/or limited in one or more manners. Where the decision block 670 decides that resources may be exhausted, the method 600 can continue to the train block 680 for training an inspection learner (e.g., an object detector, etc.), which, for example, per the deployment block 690, may be deployed for utilization in making decisions as to inspection learning. For example, the deployment block 690 can include deploying a trained inspection learner generated by the train block 680 using one or more labeled batches of data from the labeling block 650. Such a deployment may be deployment from a cloud environment to an edge environment, for example, to one or more machine vision instruments, machine vision systems, etc.

As mentioned, a subsea environment can include one or more machine vision instruments that can provide for surveying features of a subsea environment. In such an example, feature detection, which may be or include object detection, can provide for making one or more decisions as to status and/or control of equipment, operations, etc., in a subsea environment.

In the example method 600 of FIG. 6, where the decision block 670 decides that resources are not exhausted, the method 600 can continue to an actualization block 672 for actualizing one or more pools of data where the method 600 can then continue to train block 620, for example, to loop back for another iteration of training to decide, per the decision block 630, whether one or more training related goals have been met.

As an example, a framework can include a pre-processing component that can provide a point of entry. For example, data can come in one or more of various forms, which may be from an acquisition platform, an existing partially labeled database, etc. A pre-processing component can extract and format input data to a common specification, for example, such that an image data frame or selected image data frame can be referred to as an observation. A pre-processing component can provide for filtering where, for example, duplicates and/or near duplicates are filtered out and anomalous observations can be redirected to a pool of irrelevant data. The definition of an anomalous observation may depend on the type of inspection task. A pre-processing component can aim to generate "good" observations that can make up an initial pool of unlabeled data and optionally labeled data, for example, according to whether labels were initially provided or not.

Figure 7:
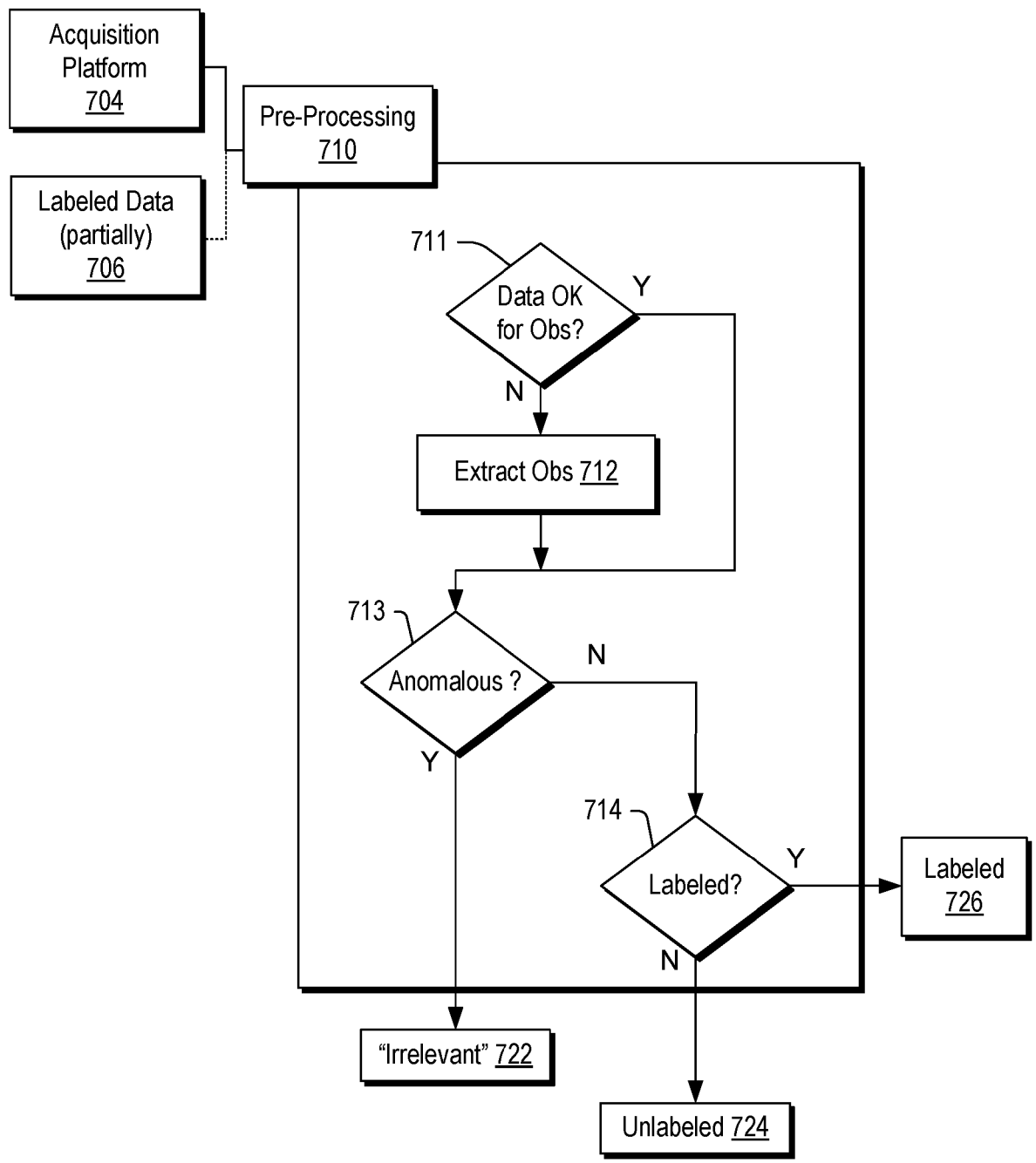
FIG. 7 illustrates an example of a pre-processing component.

FIG. 7 shows an example of a pre-processing block 710 that can receive input from an acquisition platform block 704 and/or a labeled data block 706 that can include at least some labeled data. As shown, the pre-processing block 710 can include a decision block 711 that decides whether data are acceptable for observations where if the decision block 711 decides that data are unacceptable, an extraction block 712 can follow that provides for extracting observations; whereas, if the decision block 711 decides that the data are acceptable for observations, another decision block 713 can be utilized to decide whether the input data include anomalous data, which, if present, can be directed to an irrelevant data pool block 722; otherwise, yet another decision block 714 can be utilized to decide whether input data include labeled data. As shown, depending on a decision made by the decision block 714, input data may be directed to an unlabeled data pool block 724 or a labeled data pool block 726. As explained, the pre-processing block 710 can provide for pooling input data from one or more sources into one or more data pools.

As explained, a framework can operate using one or more types of data pools. For example, consider pools of data composed of observations that can be used to train multiple machine learning components. As an example, where new acquisitions are made regularly, new data can flow into a framework synchronously and/or asynchronously. As explained, a pre-processing component can be responsible for distributing new data into each of a plurality of data components.

As to a pool of irrelevant data, it can be an ensemble that holds observations that are either out of an inspection scope (e.g., observations not relevant for the current inspection task) or anomalous observations (e.g., noise, saturations, etc.), which are likely to confuse a human labeler(s) and/or where annotation thereof can waste annotation resources.

As to a pool of unlabeled data, it can be an ensemble that holds observations that have not yet been labeled. A framework may operate according to a goal to label a predetermined fraction of unlabeled data to improve inspection learner generation, for example, by selecting the most informative unlabeled observation to be sent to a labeling component.

As to a pool of labeled data, it can be an ensemble that holds labeled observations. In such an example, the observations in this pool can be referred to as the "ground truth" information, which are specific to an intended inspection task. Observations in this pool can include observations that have been auto-labeled by a data analysis component. As an example, an auto-labeled observation (e.g., machine labeling, etc.) can include one or more temporary labels where such observations can be used to train an inspection learner once before going back to a pool of unlabeled data.

Figure 8:
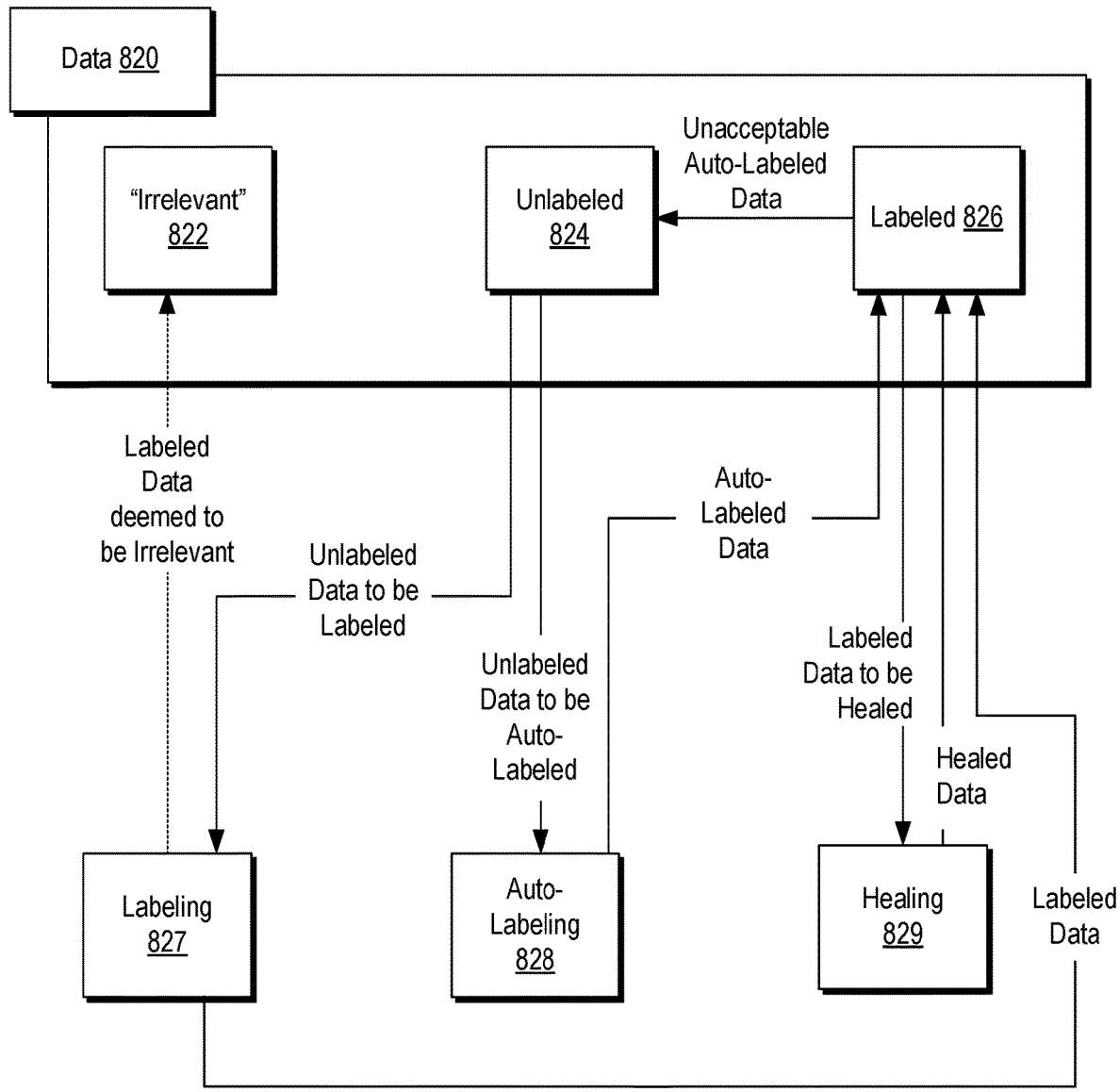
FIG. 8 illustrates an example of a data component.

FIG. 8 shows an example of a data architecture 820 as to three data pool blocks 822, 824 and 826 with respect to three processing blocks 827, 828 and 829. Specifically shown are an irrelevant data pool block 822 that can be generated at least in part by a labeling process block 827 where labeled data are deemed to be irrelevant, an unlabeled data pool block 824 that can be generated from input data, which may include unacceptably auto-labeled data that may be appropriate for relabeling, and where the unlabeled data pool block 824 can feed the labeling process block 827 and/or an auto-labeling process block 828, and a labeled data pool block 826 that can receive data from the labeling process block 827, the auto-labeling process block 828 and the healing process block 829. As shown in FIG. 8, various types of transfers and/or processes can occur with respect to data.

As an example, a framework can include a plurality of machine learning components. For example, a machine learning component can be a learner trained using one or more data components. As an example, a machine learning component can be either trained or used for prediction.

As an example, a typicality learner can be a machine learning component that is trained on labels of observations from a pool of labeled data. Such a learner can be a one-class classifier as there may be, for example, positive samples (e.g., typical labels). As an example, such a learner can identify labels deviating from a given distribution of labels. As to an architecture of such a learner, it can depend on shape of labels and therefore on an inspection task.

As an example, an inspection learner can be a machine learning component that is trained using a pool of labeled images. As mentioned, an inspection learner can be an object detector where an inspection task involves object detection. As explained, in certain environments, inspection may include inspection of equipment, inspection of fluid, inspection of material, etc.

As to an architecture of an inspection learner, it can depend on an inspection task as well as, for example, type of deployment (e.g., destination edge hardware, etc.). Based on metrics chosen for an uncertainty computation (e.g., a quality control component), an inspection learner may be slightly modified to generate better uncertainty measurements (e.g., an ensemble of learners, a Bayesian neural network (BNN) rather than a convolutional neural network (CNN), for example, by introducing a Monte Carlo dropout technique, etc.). As an example, an inspection learner may be used to compute a relevance metric.

As an example, a density learner can be a machine learning component that is trained on one or more pools of available databases of labeled images (e.g., consider one or more publicly available pools such as ImageNet, etc.). As an example, a density learner may be provided as a pre-trained machine learning component that may be utilized as a feature extractor where a similarity function (e.g., Gaussian, cosine, etc.) may be computed to capture outliers in an output space, for example, to detect localization errors.

A density learner is a learner that is trained to discern what images may belong to a common category of various categories (e.g., density regions such as clusters) to help assure diversity of image sampling such that, during an active learning process, images can be from a sufficiently diverse number of categories, for example, to help assure that images are from a diverse number of clusters. As an example, a method can aim to utilize images that are sufficiently diverse, which can include diversity maximization (e.g., as images that are as diverse as possible). For example, consider video that includes frames that can be characterized along a spectrum from similar or different. In such an example, to achieve sufficient diversity through sampling of frames, similar frames may be redundant and picking similar frames may not lead to efficiency; whereas, picking frames that are at or toward the different end of the spectrum can increase diversity, which may lead to efficiency. As to video frames from a machine vision instrument that moves in space over time, for example, to follow a path, time may be a parameter that can help to achieve sufficient diversity. In such an example, consider an approach that involves a sampling frequency that may depend on a video frame acquisition rate (e.g., frames per second, etc.) and a velocity of the machine vision instrument. A diversity learner may be utilized to assess such an approach to determine if it is sampling in a manner that can provide sufficient diversity. As an example, a method can include tuning sampling through use of a diversity learner to arrive at a sufficient level of diversity; noting that an optimal sampling strategy may exist for frequency (e.g., too frequent, less diverse and too infrequent, more diverse but with possible information loss). As an example, during active learning sampling, a diversity learner can help to assure (e.g., via generation of a density metric or density metrics) that not too many images from a common region (e.g., from a high-density cluster) are being picked.

Figure 9:
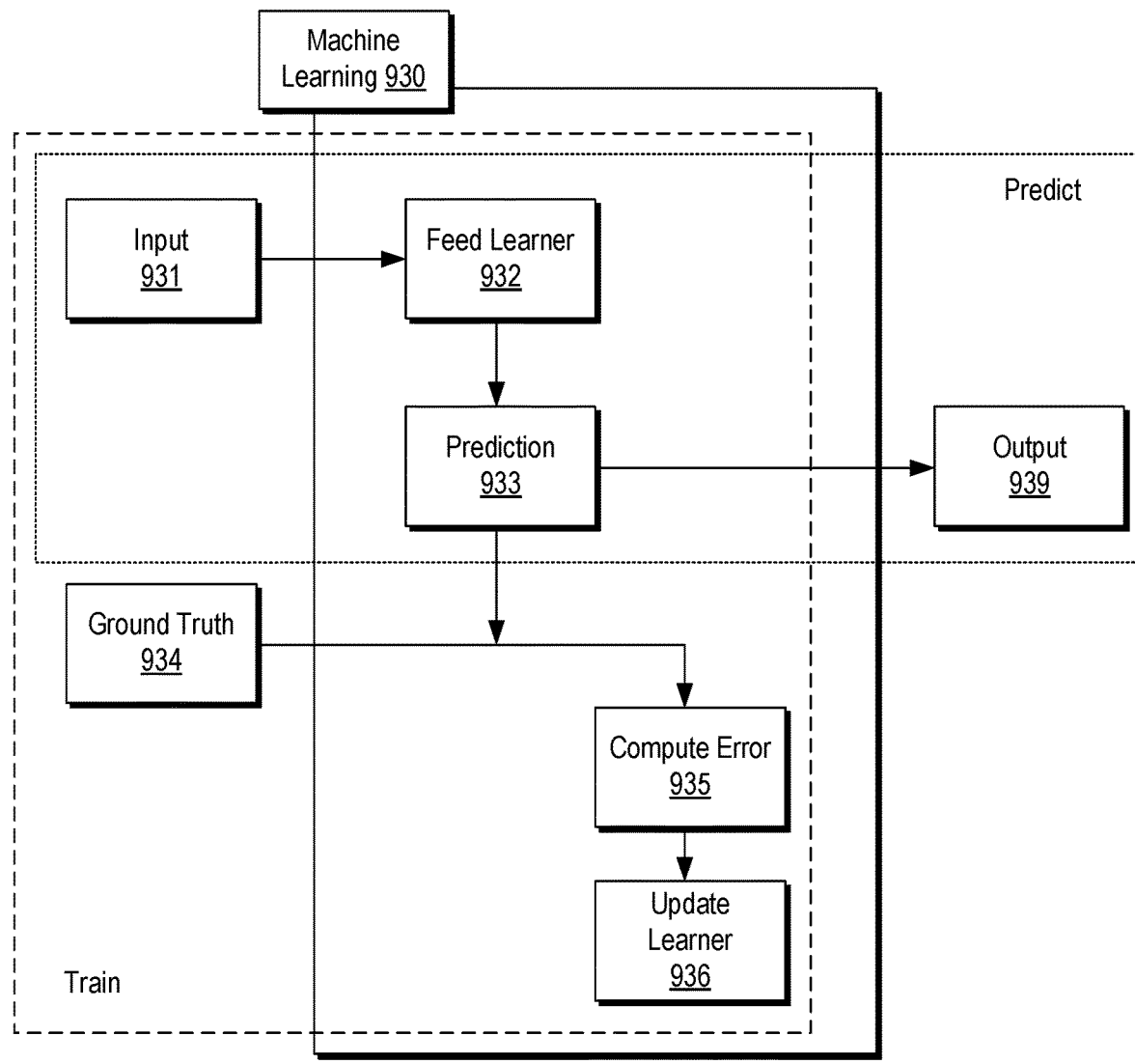
FIG. 9 illustrates an example of a machine learning component.

FIG. 9 shows an example of a machine learning component or machine learning block 930 that can provide for training and prediction. As shown, an input block 931 can provide input to a feed learner block 932 for making a prediction per a prediction block 933, which can provide a predicted output per an output block 939. Such a stream may be a prediction stream. FIG. 9 also shows a ground truth block 934 that includes acceptably labeled observation data that can be utilized for making comparisons to one or more predictions of the prediction block 933. In such an example, a computation block 935 can compute one or more error metrics that can be utilized to guide an update block 936 for updating a learner (e.g., re-training, further training, etc.).

As an example, a framework can include one or more quality control (QC) components. For example, quality control components can provide various metrics to gauge quality of an observation. Such QC components can take as inputs predictions from one or more machine learning components for a given observation or given observations and return one or more scores describing the observation or observations or, for example, quality of an inspection learner prediction for the observation or observations. In such an example, scores can later be fed into a data analysis component to compute overall rankings over data components.

As an example, a QC component can provide for relevance computations. For example, consider computations that catch off-the-point observations because they are not informative for inspection learner training. In such an example, a relevance score may be computed based upon output of the inspection learner.

As an example, a QC component can provide for typicality computations. For example, consider computations that indicate how much predictions of an inspection learner deviate from a distribution of labels from a pool of labeled data by analyzing their inner structure. As an example, a typicality score may be computed based upon output of a typicality learner.

As an example, a QC component can provide for density computations. For example, consider computations that quantify representativeness of an example by estimating the density of data. In such an example, density may be pre-computed once for an entire active learning process.

As an example, a QC component can provide for uncertainty computations. For example, consider computations that a quality control component can perform during active learning where such computations indicate how confident an inspection learner is about its predictions. Depending on an inspection learner architecture, one or more of various uncertainty metrics can be implemented. As an example, one or more uncertainty scores can be computed based upon output of an inspection learner.

Figure 10:
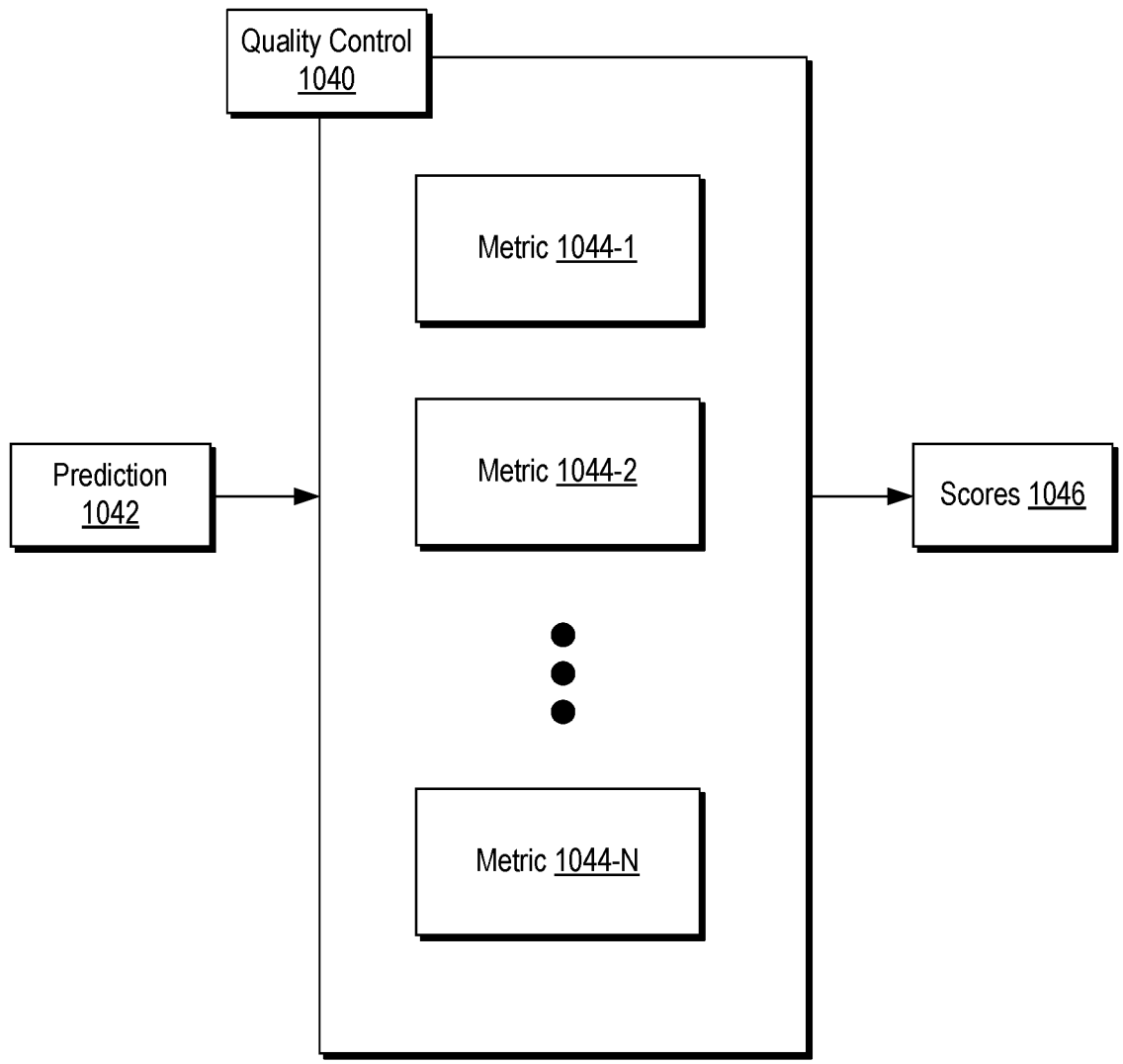
FIG. 10 illustrates an example of a quality control component.

FIG. 10 shows an example of a quality control component or quality control block 1040 that can receive prediction via a prediction block 1042, generate one or more metrics 1044-1, 1044-2, to 1044-N, and determine one or more scores 1046.

As an example, a framework can include a data analysis component (e.g., an analysis component). Such a component may provide for combining various output metrics (e.g., scores, etc.) provided by a quality control component (or quality control components) and establish weighted rankings based on such metrics.

As an example, in the case of unlabeled observations, a data analysis component may sample informative observations to be labeled by one or more human annotator(s). For example, consider an approach that defines the most informative observations as those on which an inspection learner performs poorly (e.g., high uncertainty and low typicality) and with high representativeness (e.g., high density), thus from which there can be an expectation to learn the most when annotated. As a goal may be to reduce annotator waste on irrelevant observations, a framework can operate to select highly relevant observations.

As an example, a data analysis component can select a batch of confident observations to be auto-labeled. For example, the most confident observations may be selected for auto-labeling to help an inspection learner generalize by adding more data to a training set. In such an example, a data analysis component can define confident observations as observations which are relevant, typical and dense, and have a low uncertainty. In such an example, labels provided by an auto-labeler can be deemed to be temporary (e.g., valid for one loop) and may be weighted (e.g., to have less impact on training) so that they do not impose a severe impact if they may be erroneous in one or more manners. As an example, one or more weights may be adjusted as an inspection learner improves.

As an example, a data analysis component can identify (e.g., select) problematic observations that can be subjected to a healing process. For example, consider defining problematic observations as observations which are likely to be poor because they are irrelevant or because there is a labeling issue such as an incorrect label (e.g., not typical or high uncertainty) and not dense (e.g., low representativeness). In the case labeled data sampling metrics are adapted to better serve the purpose of a healing process: uncertainty for an inspection learner's loss, density and relevance can be the same where typicality can be computed on given labels instead of predicted labels.

Figure 11:
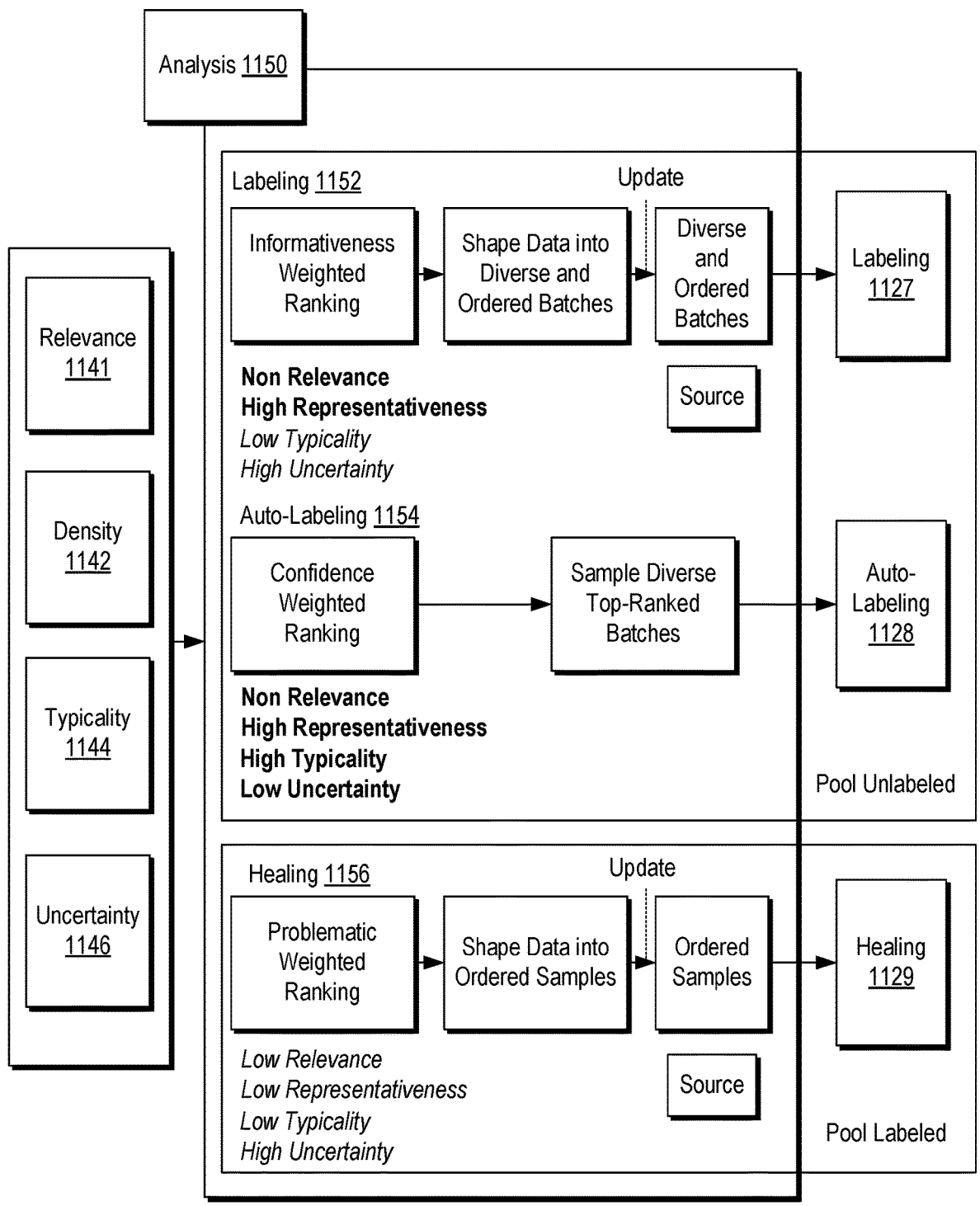
FIG. 11 illustrates an example of an analysis component.

FIG. 11 shows an example of an analysis component or analysis block 1150. As shown, the analysis block 1150 can include performing one or more analyses as to labeling 1152, auto-labeling 1154 and healing 1156, which can provide for triggering one or more processes for labeling 1127, auto-labeling 1128 and healing 1129. For example, the analysis block 1150 can be utilized to trigger one or more actions illustrated via one or more arrows in the example of FIG. 8.

As shown in FIG. 11, the analysis block 1150 can receive input such as relevance input 1141, density input 1142, typicality input 1144 and uncertainty input 1146, one or more of which can be utilized to perform one or more of the processes 1152, 1154 and 1156, which, in turn, can trigger labeling 1127, auto-labeling 1128 and healing 1129, respectively. As shown, labeling 1127 and auto-labeling 1128 may be applied to a pool of unlabeled data while healing 1129 may be applied to a pool of labeled data.

As shown in the example of FIG. 11, the labeling process 1152 can include informativeness weighted ranking, shaping data into diverse and ordered batches, and forming diverse and ordered batches using one or more data sources, where updating may be performed.

As shown in the example of FIG. 11, the auto-labeling process 1154 can include confidence weighted ranking and sampling diverse top-ranked batches.

As shown in the example of FIG. 11, the healing process 1156 can include problematic weighted ranking, shaping data into ordered samples, and forming ordered samples using one or more data sources, where updating may be performed.

As an example, a framework can include a labeling component, which may be part of a healing and labeling component. As an example, an active labeling process can utilize an oracle to establish a so-called "ground truth" for observations. As mentioned, an oracle may be a human annotator or, for example, consider a framework that is adaptable for simulated data where labels may be already available and/or generated via simulation. As to the latter, a framework may provide for selecting out of a very large quantity of observations, particular observations to be utilized for training.

As an example, a human-in-the-loop (HIL or HITL) component can be included in a framework that aims to optimize use of the HIL component (e.g., an oracle component) such that the framework "gets the most" from one or more annotator(s), for example, with the fewest interactions.

As to a labeling task, it can take as input unlabeled observations sampled by a data analysis component if metrics are available and random observations otherwise. Such a task can return labeled observations when they are relevant and irrelevant observations otherwise.

Figure 12:
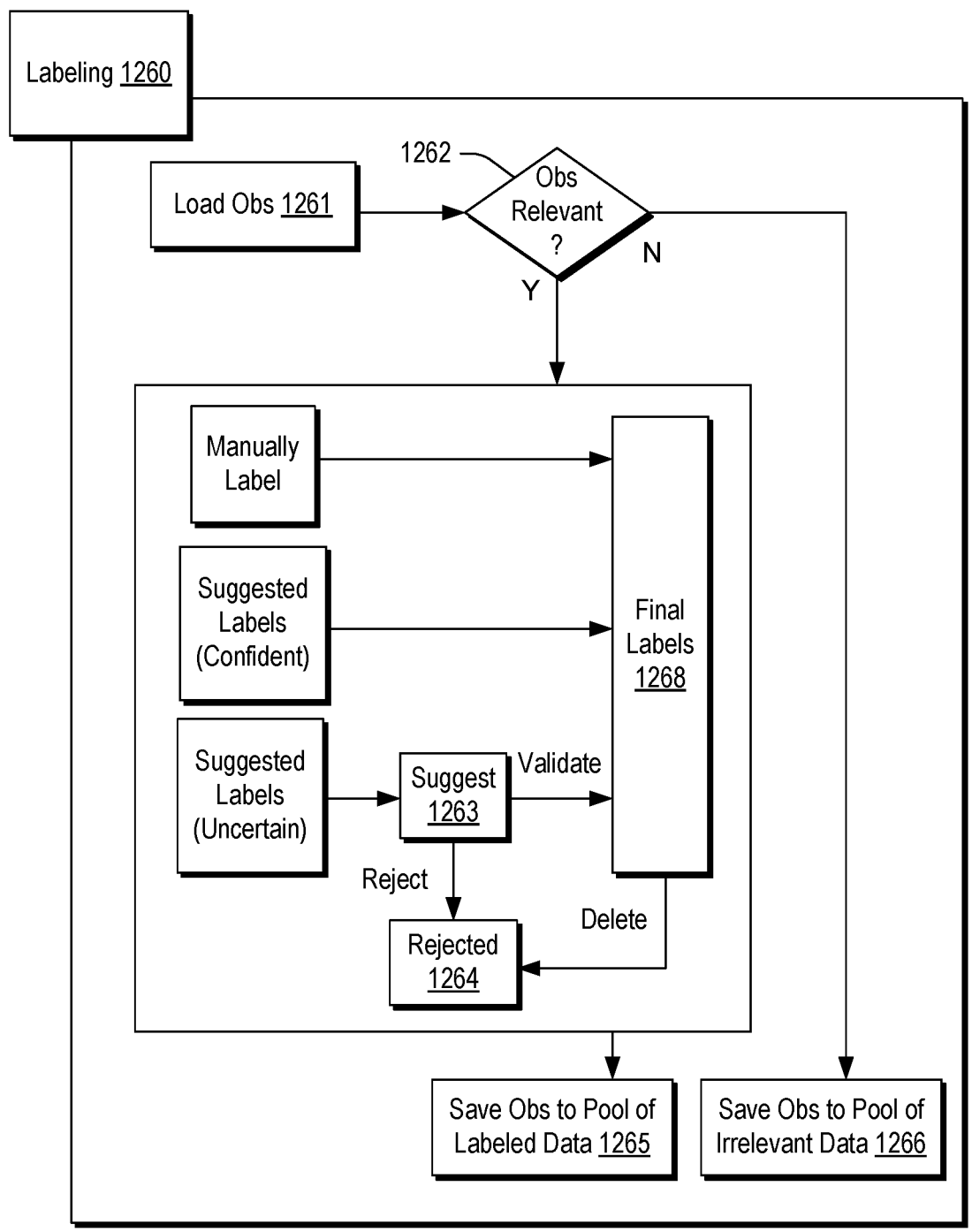
FIG. 12 illustrates an example of a labeling component.

FIG. 12 shows an example of a labeling process 1260, which can be a component of a framework. As shown, the labeling process 1260 includes a load block 1261 for loading observations and a decision block 1262 for deciding whether one or more loaded observations are relevant or not. As shown, if irrelevant, the labeling process 1260 can direct such one or more observations to a pool of irrelevant data 1266; otherwise, the labeling process 1260 can proceed to a block for label rejection per a rejected block 1264 and/or label finality per a final labels block 1268. For example, a manual label can be a final label, a suggested label with high confidence can be a final label, and a suggested label with lesser confidence (e.g., greater uncertainty) can be processed via a suggestion block 1263 to validate as a final label or to reject as a rejected label. As shown, various final labels of the final labels block 1268 can be deleted, which may be directed to the rejected block 1264. As shown, the labeling process 1260 can generate relevant observations that can be saved to a pool of labeled data 1265.

Figure 13:
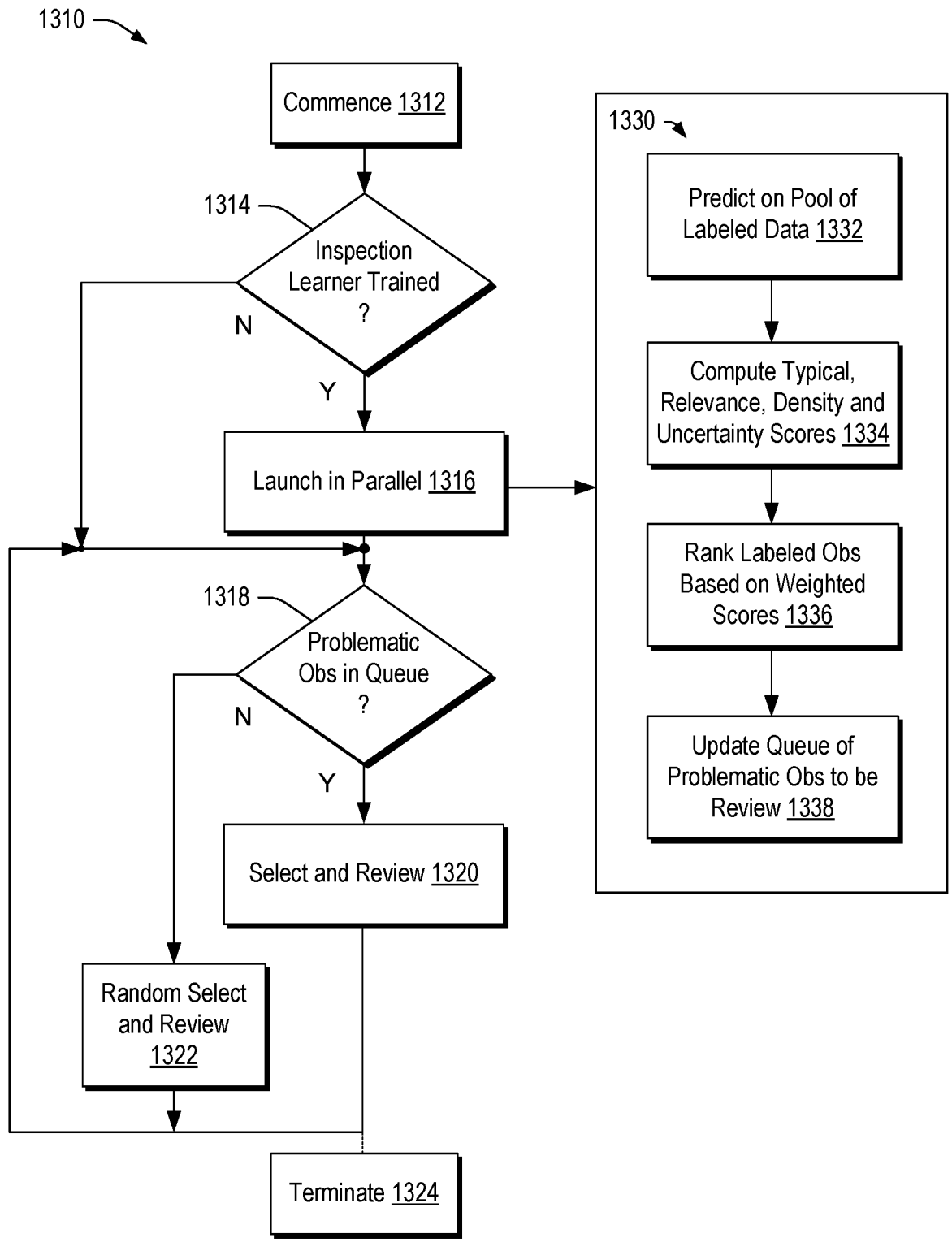
FIG. 13 illustrates an example of a method.

FIG. 13 shows an example of a healing process 1310 that includes a commencement block 1312 for commencing the healing process 1310, a decision block 1314 for deciding whether an inspection learner is trained, where, if trained, the healing process 1310 can proceed to a launch in parallel block 1316 that implements another process 1330 in parallel.

As shown in FIG. 13, the process 1330 includes a prediction block 1332 for performing predicting on a pool of labeled data, a computation block 1334 for computing typical, relevance, density and uncertainty scores, a rank block 1336 for ranking labeled observations based on weighted scores, and an update block 1338 for updating a queue of problematic observations for review.

Referring again to the launch block 1316, it can also proceed to a decision block 1318 for deciding whether there are one or more problematic observations in a queue. As shown, where the decision block 1318 decides that one or more problematic observations exist, the healing process 1310 can continue to a select and review block 1320 for selecting and reviewing at least one of the one or more problematic observations. As shown, the healing process 1310 may then loop back to the decision block 1318 or, for example, it may terminate in a termination block 1324. Where the decision block 1318 decides that problematic observations do not exist in the queue, the healing process 1310 can proceed to a random selection and review block 1322 for randomly selecting one or more observations and reviewing the one or more randomly selected observations.

Referring again to the decision block 1314, as shown, where a decision is made that an inspection learner is not trained, the parallel process 1330 is not launched; rather, the healing process 1310 proceeds to the decision block 1318.

As shown, the healing process 1310 can include a loop or loops, for example, to handle new observations.

Figure 14:
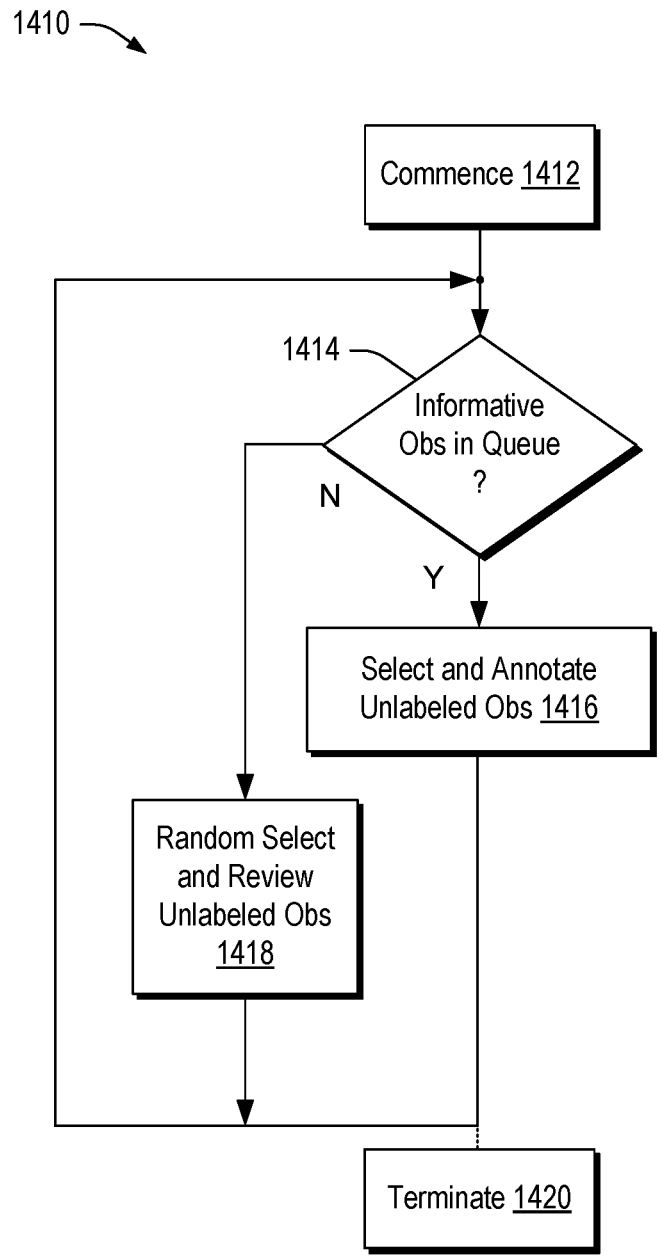
FIG. 14 illustrates an example of a method.

FIG. 14 shows an example of a labeling process 1410 that includes a commencement block 1412 for commencing the labeling process 1410, a decision block 1414 for deciding whether one or more informative observations are in a queue, where, if so, the labeling process 1410 proceeds to a selection and annotation block 1416 for selecting and annotating at least one of the one or more informative observations in the queue; otherwise, the labeling process 1410 proceeds to a random selection and review block 1418 for randomly selecting and reviewing one or more unlabeled observations. As shown, the labeling process 1410 can include a loop or loops, for example, to handle new observations.

As explained, a labeling task can be machine learning aided. For example, most confident labels can be auto-labeled and, for example, an annotator can review individual least confident predicted labels or, for example, eventually draw labels if they were to be wrong or missing. As an example, to satisfy real-time and multi-user demands, a labeling task can be optimized such that there are observations waiting to be labeled.

As to a healing task, it may share some aspects with a labeling task, except that it can take as input labeled observations which are either confusing for an inspection learner or possibly irrelevant.

As an example, a framework can provide labeling and healing tasks that can be asynchronous and, for example, run in parallel as part of an active learning loop.

As an example, a system can include one or more edge inspection components. For example, consider one or more components that utilize an inspection learner (e.g., a trained inspection learner, which may be a trained object detector) to provide real-time solutions (e.g., class prediction, object localization, uncertainty measure, etc.) for one or more given inspection tasks (e.g., compression, eventing, logging, etc.), which may include relevance scoring to provide useful information to build one or more even more sophisticated solutions.

Figure 15:
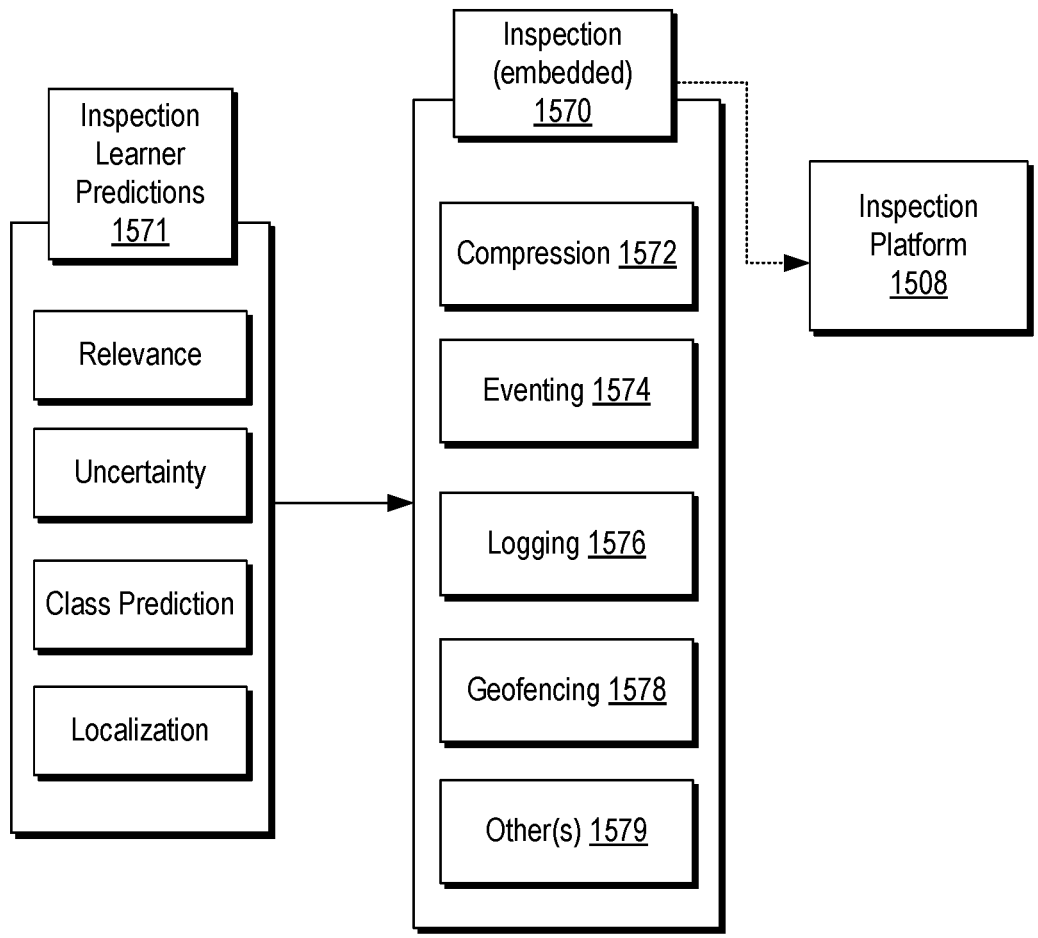
FIG. 15 illustrates an example of an inspection component.

FIG. 15 shows an example of an inspection component 1570 that can receive one or more inspection learner predictions 1571 (e.g., relevance, uncertainty, class prediction, localization, etc.). As shown, the inspection component 1570 can provide for one or more of compression 1572, eventing 1574, logging 1576, geofencing 1578 and/or one or more other tasks 1579. As explained, the inspection component 1570 can be part of a system that may include a cloud-based portion and an edge portion where, for example, an inspection platform 1508 may be part of an edge portion of such a system.

As an example, the framework 500 of FIG. 5 may be utilized for one or more types of inspection tasks, which can include using an oracle such as one or more human annotators (e.g., HITL type of framework). As explained, an annotator may be utilized to establish one or more ground truths for training data (e.g., segmentation, classification, human activity recognition, etc.). As an example, a framework may be suitable for use in one or more domains (e.g., geophysics, medicine, etc.). As an example, in the case of asset integrity inspection one type of inspection task involves detecting objects (e.g., anomalies) in a video stream. As an example, a framework may utilize one or more processes for typicality and uncertainty in the context of object detection.

In the context of object detection, a pre-processing component can process data that may originate in a form of still images and one or more videos. As explained, an image may be a frame. As an example, image data may be compressed and/or uncompressed. As to compression, one or more types of compression techniques may be utilized. For example, consider H.264, which is a video compression technology, or codec, that was jointly developed by the International Telecommunications Union (as H.264) and International Organization for Standardization/International Electrotechnical Commission Moving Picture Experts Group (as MPEG-4 Part 10, Advanced Video Coding, or AVC). Thus, the terms H.264 and AVC are interchangeable.

As a video codec, H.264 can be incorporated into multiple container formats, and is frequently produced in the MPEG-4 container format, which uses the .MP4 extension, as well as QUICKTIME (.MOV), FLASH (.F4V), 3GP for mobile phones (.3GP), and the MPEG transport stream (.ts). H.264 may be video encoded with audio compressed with the AAC (Advanced Audio Coding) codec, which is an ISO/IEC standard (MPEG4 Part 3).

As an example, video can include one or more types of frames. For example, consider: I-frames as the least compressible and do not demand other video frames to decode; P-frames that can use data from previous frames to decompress and are more compressible than I-frames; and B-frames that can use both previous and forward frames for data reference to get the highest amount of data compression. In some instances, I-frames may be referred to as "key frames" or "keyframes". In some instances, machine learning for object detection may utilize the term "key frame" or "keyframe" as a selected frame from video data that includes a string of frames. As an example, a method can include selecting frames such as I-frames, which may be types of frames that can be decompressed without resorting to one or more other frames. As an example, a method can include selecting one or more frames as selected frames from a pool of frames that may be a pool of I-frames.

As an example, a method can include extracting frames from videos using an adaptive extraction rate based on optical flow so that the extracted frames are distinguishable. In such an example, anomalous frames may be filtered out (e.g., due to high blurriness, under/over-exposure, etc.) to make an initial pool of irrelevant data. Frames that are deemed "good", may make an initial pool of unlabeled data and labeled data, for example, according to whether labels were initially provided or not.

As an example, labels may be bounding boxes (e.g., polygonal areas with a class) where each observation (e.g., selected frame) can include one or more labels. As an example, a bounding box may correspond to a box or partition utilized in a compression technique. For example, consider a bounding box as a label that can be composed of one or more partitions of a frame as utilized in a compression technique.

As an example, labels may be derived using a keypoint approach where various types of image data are analyzed to identify keypoints, which may be subjected to clustering (e.g., K-means, etc.) to determine a number of different types of classes (e.g., a number of distinct clusters, etc.) that may exist in a pool of images.

As an example, a framework may utilize data components that are adapted to one or more inspection tasks.

As an example, a framework can include one or more machine learning components where one of the components is a typicality learner. For example, consider a typicality learner that can compute typicality predictions from labels. In such an example, a process can extract a multi-class channel stack, which can be an ensemble of channels where each channel corresponds to one of a plurality of classes. In such an example, each channel may be obtained by summing rectangles of ones in place of each of the bounding box pertaining to the corresponding class. Using stacks to represent bounding boxes can be quite convenient because, like images, stacks can hold spatial information and can be readily fed into a machine learning model (e.g., a neural network, etc.). Further, such an approach can be an efficient way of representing labels where information is preserved, and a learner can identify recurrent spatial arrangements among objects by training on labels from the pool of labeled data.

Figure 16:
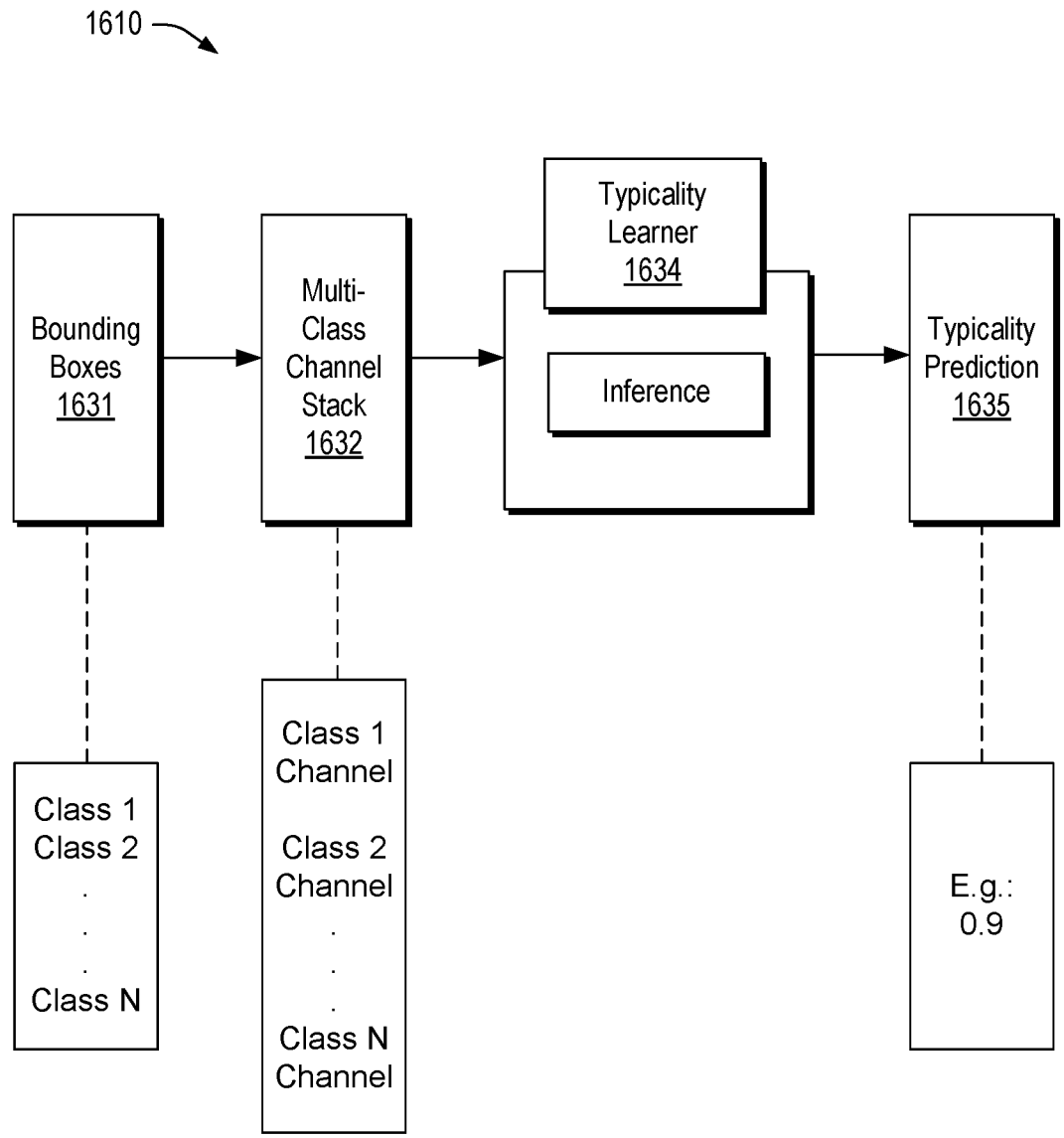
FIG. 16 illustrates an example of a typicality learner.

FIG. 16 shows an example of a process 1610 that can utilize a typicality learner 1634. As shown, processing can provide bounding boxes 1631 for multiple classes where a multi-class channel stack 1632 can be formed for input to the typicality learner 1634, which can make an inference to provide a typicality prediction 1635, which may be scaled along a scale from 0 to 1 (see, e.g., 0.9 as an output).

As an example, an inspection learner can use an ensemble of object detectors. As mentioned, a framework may include one or more object detectors (e.g., YOLO, etc.), from which one or more may be utilized. As an example, an inspection learner may utilize deep snapshots ensembles (e.g., a snapshot ensembles component, etc.) as such an approach may be computationally free compared to training an object detector. In such an example, snapshots of a model can be saved during training and then reused as an ensemble of object detectors. Such an approach can increase uncertainty estimation accuracy, which can improve uncertainty sampling.

Snapshot ensembling can involve producing an ensemble of accurate and diverse models from a single training process. Snapshot ensembling can include performing an optimization process that visits several local minima before converging to a final solution. Model snapshots can be taken at these various minima, and their predictions averaged (e.g., at test time). Snapshot ensembling can obtain ensembles of neural networks without additional training cost.

As an example, a density learner can utilize a convolutional neural network (CNN) pre-trained on a large visual database. For example, consider a publicly available database such as the ImageNet, which may be utilized to compute features from unlabeled images.

As to quality control components, a relevance computation can provide for a relevance score computed from output of an inspection learner. As an example, a relevance score can be defined as the probability of being relevant, which may be computed from an object detection output for each prediction. As an example, a relevance computation may utilize output from the Tiny "You Only Look Once" (YOLO) version 3 (YOLOv3), which can be a chosen object detection network architecture. YOLOv3 outputs bounding boxes coordinates as well as probabilities of classes for each bounding box.

As an example, a relevance metric can be given as follows:

$$p_{relevant}(x) = \max_{b \in B_x}\left(1 - \prod_{i \in C}(1 - p_{b,i})\right)$$

where x an image from the unlabeled set; $B_x$ is the set of bounding boxes of x; C is the set of classes; and $p_{b,i}$ is the probability of bounding box b being class i.

Such an approach can be used to compute a relevance score to perform relevance filtering for active learning. As an example, YOLOv3 can output probabilities from logistic regressions for each class. As such, it is possible to define $p_{relevant}$ as the maximum of probability of relevance; however, with soft-max outputs instead, it may be adapted to also get a max of probability of relevance.

Figure 17:
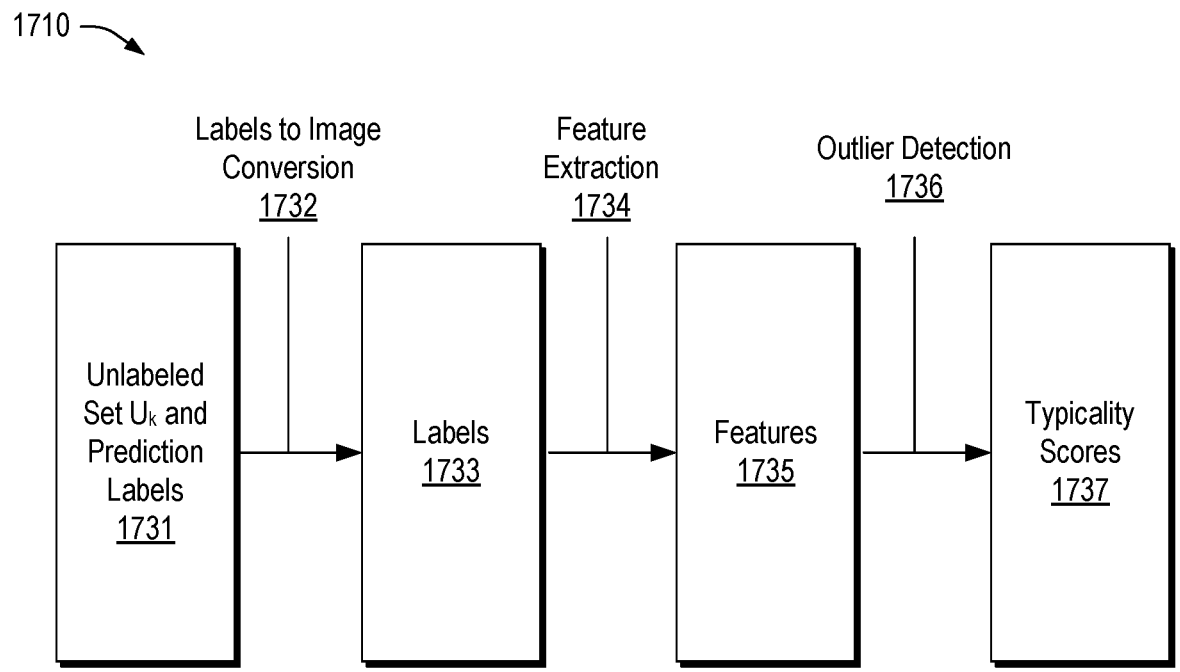
FIG. 17 illustrates an example of a method for computing a typicality score.

FIG. 17 shows an example of a typicality computation process 1710. As shown, an unlabeled set block 1731 provides an unlabeled set $U_k$ and prediction labels that can be subjected to a method 1732 for labels to image conversion to generate labels per a labels block 1733. Given the labels of the labels block 1733, feature extraction 1734 may be performed to generate features per a features block 1735. Given the features of the features block 1735, outlier detection 1736 may be performed to generate typicality scores per the typicality scores block 1737. As shown, a typicality score is a prediction of the typicality learner (see, e.g., the typicality learner 1634 of FIG. 16).

As to a density computation, a density score can be computed by determining an average of similarities in a feature space. As an example, features may be extracted from images using an appropriate trained machine learning tool such as, for example, a convolutional neural network (CNN) pre-trained on a large visual database (e.g., ImageNet, etc.).

Figure 18:
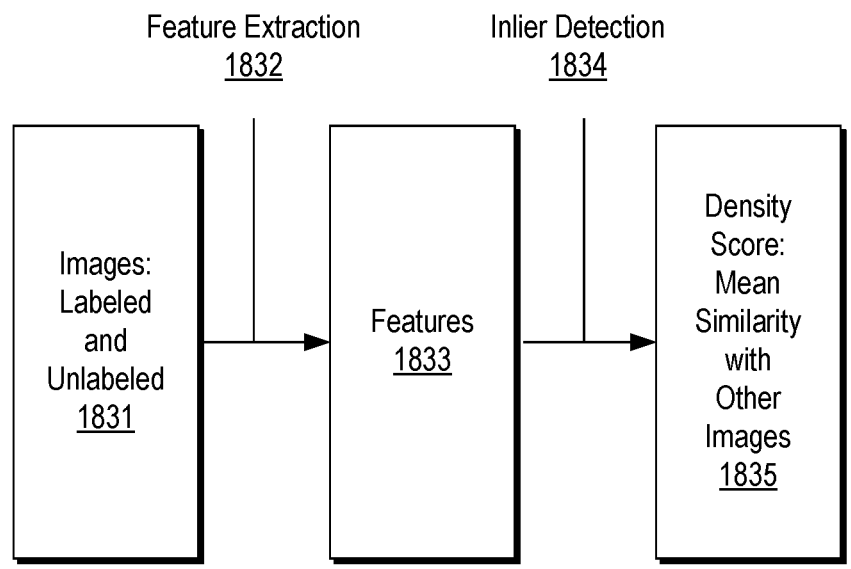
FIG. 18 illustrates an example of a method for computing a density score.

FIG. 18 shows an example of a density computation process 1810. As shown an images block 1831 can provide labeled images and unlabeled images upon which feature extraction 1832 can be performed to generate features per a features block 1833. As shown, inlier detection 1834 can be performed using the features of the features block 1833 to generate a density score, which can be a mean similarity with other images. As shown in FIG. 18, as an example, similarity may be computed as: Similarity(x,y)=exp[-(‖x-y‖)²/2σ²].

As to an uncertainty computation, it may combine entropy sampling (e.g., an uncertainty metric) with one or more other metrics. For example, to combine different entropies from each bounding box predicted on an image, a process can include selecting a maximum of those entropies. As an example, a method can utilize deep snapshots ensembles to improve accuracy of such a metric. For example, rather than averaging the outputs of object detectors, then computing entropy on the average, a method can use merging of multiple object detectors outputs for active learning. In such an example, for each image, a process can compute the maximum of entropies of bounding boxes for each object detector separately and then average these scores to arrive at a more precise metric. For example, consider the following equations for uncertainty and entropy:

$$\text{uncertainty}(x) = \frac{1}{N}\sum_{d \in D}\max_{b \in B_x}(\text{entropy}(b))$$

$$\text{entropy}(b) = \sum_{i \in C} -p_{b,i}\log(p_{b,i}) - (1 - p_{b,i})\log(1 - p_{b,i})$$

where x is an image from the unlabeled set; $B_x$ is the set of bounding boxes of x; C is the set of classes; D is the set of object detectors (e.g., snapshots); and $p_{b,i}$ is the probability of bounding box b being class i.

As mentioned, entropy(b) can be a sum of entropy computed separately for each class as YOLOv3 outputs probabilities from a logistic regression for each class separately.

As to data analysis, consider, as an example, an approach that gives equal weights to typicality, density, uncertainty and relevance.

Figure 19:
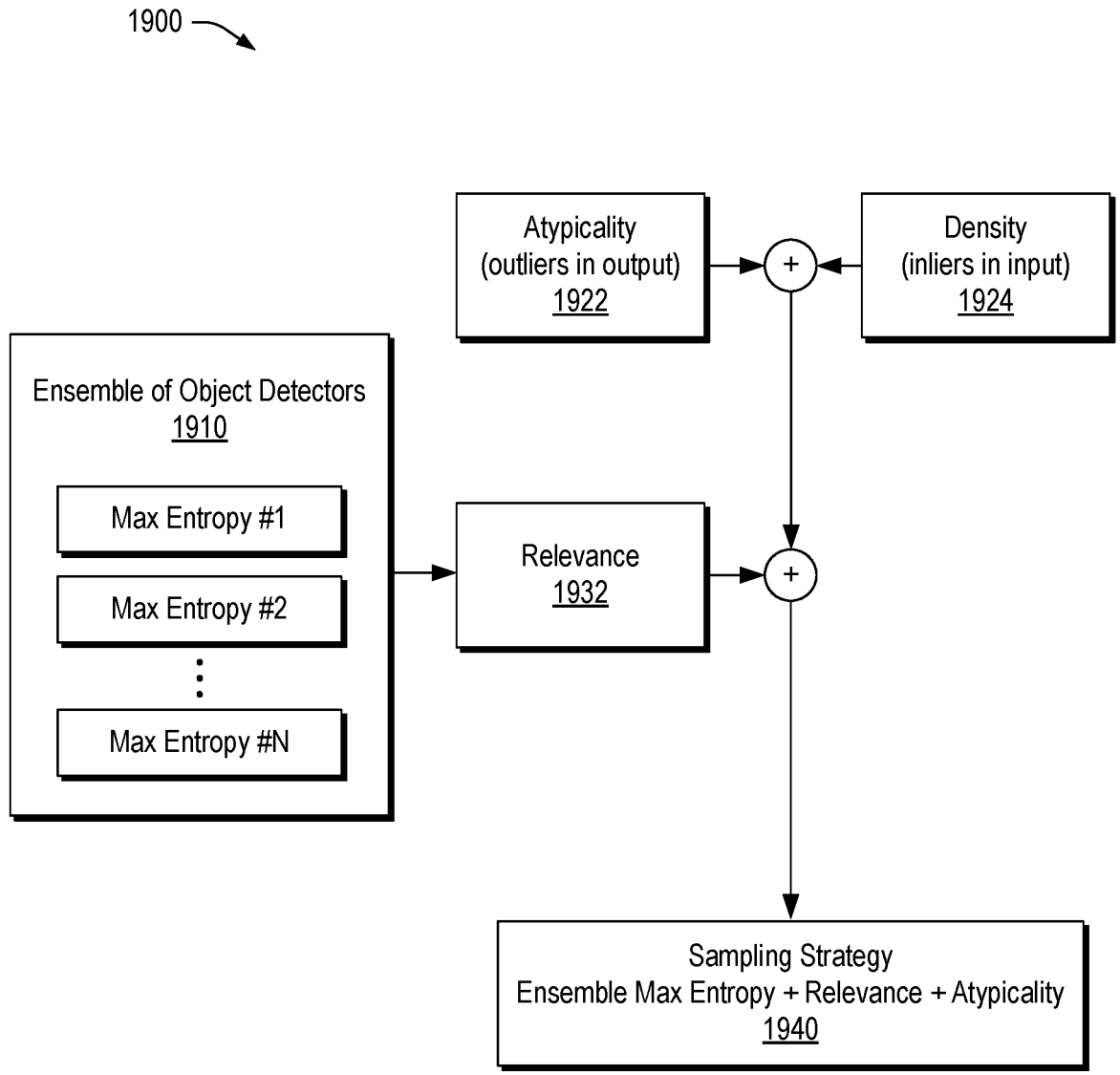
FIG. 19 illustrates an example of a method for computing relevance using an ensemble of object detectors.

FIG. 19 shows an example of a process 1900 that includes providing an ensemble of object detectors 1910 that provide maximum entropies that can be received by a relevance block 1932. As shown, the relevance block 1932 can provide information that can be combined with information from an atypicality block 1922 (e.g., outliers in output) and information from a density block 1924 (e.g., inliers in input). As shown, an output can be a sampling strategy that samples on the basis of at least maximum entropy, relevance and atypicality. The process 1900 can utilize various metrics as computed in a quality control process where they can be combined to sample the most informative images for labeling.

As to labeling, for an object detection problem, it can provide for how bounding boxes are labeled. For example, consider a process that involves choosing a class label and selecting opposite corners of a box. In such an example, horizontal and vertical lines may guide an annotator to tightly adjust the box to an object. As mentioned, where an image may be partitioned (e.g., a video frame partitioned via a compression algorithm), one or more data structures of the partitioned image (e.g., boxes, etc.) may be utilized to define a bounding box. For example, a bounding box may be formed of a plurality of smaller partitions.

As to edge inspection, one or more edge inspection components can be utilized for one or more object detection uses-cases, which may include one or more of compression, eventing, logging, geofencing, etc.

As to compression, consider, as an example, performing adaptive compression where detected objects are considered as foreground and are sent with a higher bit rate, as opposed to background data that may be more highly compressed. As an example, an object detector may be utilized in combination with a compression algorithm. For example, consider an object detector that is utilized in pre-processing a frame to reduce information of the frame in a manner that preserves a detected object or detected objects where the reduced information frame is then subjected to compression. In such an example, where extraneous information may include motion, that motion can be removed from a series of frames such that frame redundancy as to an object or objects may be realized, which can reduce computational cost for a compression algorithm, storage cost, transmission cost, etc.

As to eventing, consider performing feature tracking for path planning of one or more machine vision instruments.

As to logging, rather than manually tracing anomalies occurrences on paper, an edge-based implementation can perform logging automatically, for example, by automatically generating a report.

As to geofencing, given a relevance learner, inspection predictions can be filtered when observations are irrelevant. For example, where real-time observations are deemed to be irrelevant, a machine vision system may be instructed as to course, data capture, etc. For example, consider generating and/or transmitting one or more signals that indicate to a pilot/auto-pilot that it is out of an intended inspection scope.

As an example, where subsea asset integrity inspection is performed using a vehicle, vehicle speed and/or acceleration during inspection of tubular structures (e.g., pipelines, risers, etc.) may be constrained by a human pilot responsiveness and post-job diagnosis comfort, disregarding optimal information gain by an automated framework. As an example, a method can include running an inference tool (e.g., trained using the active learning framework 500, etc.) in real-time, which may be in an embedded mode (e.g., at an edge). Such an approach may be able to compress mission duration whilst maximizing detection likelihood of features of interest. Such an approach can entail controlling the speed and/or acceleration of the vehicle (e.g., in one or more spatial dimensions) based on features present in the field of view (FOV) and/or features ahead and/or further below the path of the vehicle, which may be detected by one or more other sensors.

As explained, an end-to-end active learning framework can perform pool-based active learning on selected frames extracted from a dataset of videos or a live video stream, where the framework includes an active learning strategy that combines uncertainty-based methods and diversity-based methods. In combination with one or more deep learning techniques, such a framework can process numerous and potentially redundant video frames and achieves improved performance on object detection tasks, which may be constrained or otherwise resource limited.

As an example, a method may employ a frame selector that can perform real-time or near-real-time frame selection. As an example, a frame selector may be applied at capture and/or after processing. For example, a captured frame may be uncompressed while an after-processing frame may be compressed using a compression technology (e.g., encoded using H.264, etc.).

As explained, a method may employ a tiered approach where, for example, a frame is extracted by an extraction process and then subjected to a selection process for possible selection. As mentioned, an extraction process may optionally utilize one or more aspects of a codec, a compression algorithm, etc., where, for example, video is to be compressed.

As explained, a task can be a subsea asset integrity inspection task that utilizes an autonomous underwater vehicle (AUV), which may acquire a video feed in real-time.

As an example, a framework can select frames from the video feed, which may be sent to a surface resource (e.g., a surface vessel). Once received on at surface, a framework can carry out active learning experiments enabling automated inspection missions. As there can be sparsity of underwater assets in a vast subsea environment, reducing a video feed to key frames can be of interest and help to achieve better detection results when used along with an active learning framework.

Where asset integrity inspection is performed with an unmanned aerial vehicle (UAV or drone), video footage can be acquired and collected at landing time of the UAV or, for example, transmitted during a mission. Once data are offloaded or otherwise received, a framework can process one or more video sequences to facilitate automation of an inspection process. As there can be a substantial number of duplicates or near-duplicates in UAV video footage, a framework may provide for a reduction of the amount of data going from videos to selected frames with minimal information loss, which may result in better detection results with a lower labeling budget.

As an example, where selected frames are to be transmitted and/or stored, one or more compression techniques may be implemented. In such an example, a selected frame may be uncompressed and then compressed. As an example, a selected frame may be a frame that is an uncompressed frame as determined by a compression algorithm. For example, an extraction process may extract uncompressed frames where a selection process is then applied to the extracted uncompressed frames. In such an example, a codec may be circuitry that is configured to rapidly perform a compression algorithm where a selection process may be triggered by output from the codec (e.g., a codec signal, codec output data, etc.) to know when to assess a frame using a selection process. Such an approach may be referred to as an informed sampling process where output from a codec informs a selection process that an uncompressed frame or "keyframe" (e.g., I-frame) has been identified or generated.

As explained, visual asset inspection can be a tedious and error prone task. Machine learning techniques, particularly supervised deep neural networks can provide for some amount of automation of video analysis and equipment imagery allowing increasing performance while saving time. However, such performance can come at a relatively high cost. For example, deep learning methods can demand relatively large datasets, labeled by experts, which can be very expensive and time-consuming, particularly for custom domains.

Where data are available in quantity, though where annotation through an oracle is constrained or otherwise limited, a framework can be utilized to optimize oracle use, for example, by strategically selecting examples to annotate.

As to deep object detection, an approach may aim to classify and localize objects of predefined classes on an image by drawing and labeling bounding boxes on those objects. As an example, the aforementioned YOLOv3 technology can provide for real-time object detection (e.g., a machine learning tool or inspection learner).

As an example, an active learning framework may utilize one or more different strategies for data selection. For example, consider one or more of uncertainty-based methods, query by committee approaches, expected model change, expected error minimization, and density and diversity-based approaches. Among those methods, uncertainty-based methods tend to be utilized as they can be relatively low demand computationally and effective.

As to frame selection from video, an approach may aim to select frames that "summarize" the video. Various methods can utilize neural networks or global or local features.

As an example, a feature-based approach may be utilized for selecting frames from video, which may include raw frames and/or pre-processed frames. For example, consider a feature histogram extraction approach. Such an approach may utilize a "Bag-of-Visual-Words" technique (BOVW) as adapted from text data to image data. BOVW can use a feature extractor algorithm such as, for example, SURF, SIFT, ORB, etc., which can provide local descriptors of an image.

As to SIFT, it can include stages such as, for example, (1) scale-space peak selection; (2) keypoint localization; (3) orientation assignment; and (4) keypoint descriptor. In the first stage, potential interest points can be identified by scanning an image over location and scale, which may be implemented by constructing a Gaussian pyramid and searching for local peaks (e.g., termed keypoints) in a series of Difference-of-Gaussian (DoG) images. In the second stage, candidate keypoints can be localized, optionally to sub-pixel accuracy and rejected if found to be unstable. The third stage can identify dominant orientations for each keypoint based on its local image patch. Assigned orientation(s), scale and location for each keypoint can allow SIFT to construct a canonical view for a keypoint that is invariant to similarity transforms. The fourth stage builds a local image descriptor for each keypoint, based upon the image gradients in its local neighborhood.

Another type of SIFT is Principal Components Analysis SIFT (PCA-SIFT). In PCA-SIFT, rather than using SIFT's smoothed weighted histograms, PCA is applied to a normalized gradient patch. Such an approach can make local descriptors more distinctive, more robust to image deformations, and more compact than the standard SIFT representation. Additionally, using such descriptors in an image retrieval application may result in increased accuracy and faster matching.

As an example of feature analysis, consider an approach that performs keypoint detection and keypoint clustering in a keypoint feature space. A "vocabulary" may be discerned from clustering where, for example, individual words can be assigned to corresponding individual clusters. In such an example, an image may be characterized using a vector that is a visual-word vector where different images can have different visual-word vectors.

As to keypoint detection, a Difference of Gaussian (DoG) technique may be utilized to automatically detect keypoints from images. As an example, detected keypoints may be depicted using a PCA-SIFT descriptor, which can be represented as a multi-dimensional real-valued feature vector. As to clustering, as an example, vector quantization (VQ) may be utilized along with K-means where a keypoint can be encoded by an index to a cluster to which a keypoint belongs. As mentioned, a vocabulary size may be discerned by number of clusters; noting that as vocabulary size increases, a feature may be more discriminative; however, with less generalizableness and foregiveness to noise (e.g., where relatively similar keypoints may map to different visual words). As an example, an image of a busy street scene may include over 1000 keypoints while an image showing a smooth sky background may have less than 100 keypoints.

As an example, a keypoint approach may include feature selection that can include use of an informativeness metric or metrics. As an example, as to feature selection criteria, consider one or more of document frequency, chi statistics, mutual information and pointwise mutual information. Such approach can be text-based adapted to a BOVW analysis.

As explained, various types of inspection tasks include acquiring and/or otherwise accessing video, which can be a series of frames, which may be pre-processed or not. Active learning on video can be challenging as resources may be constrained, particularly as to one or more human annotators. As an example, a framework can be utilized that can help to optimize resource utilization for training an inspection learner, which may be an object detector suitable for detecting objects (e.g., features, etc.) in video.

Figure 20:
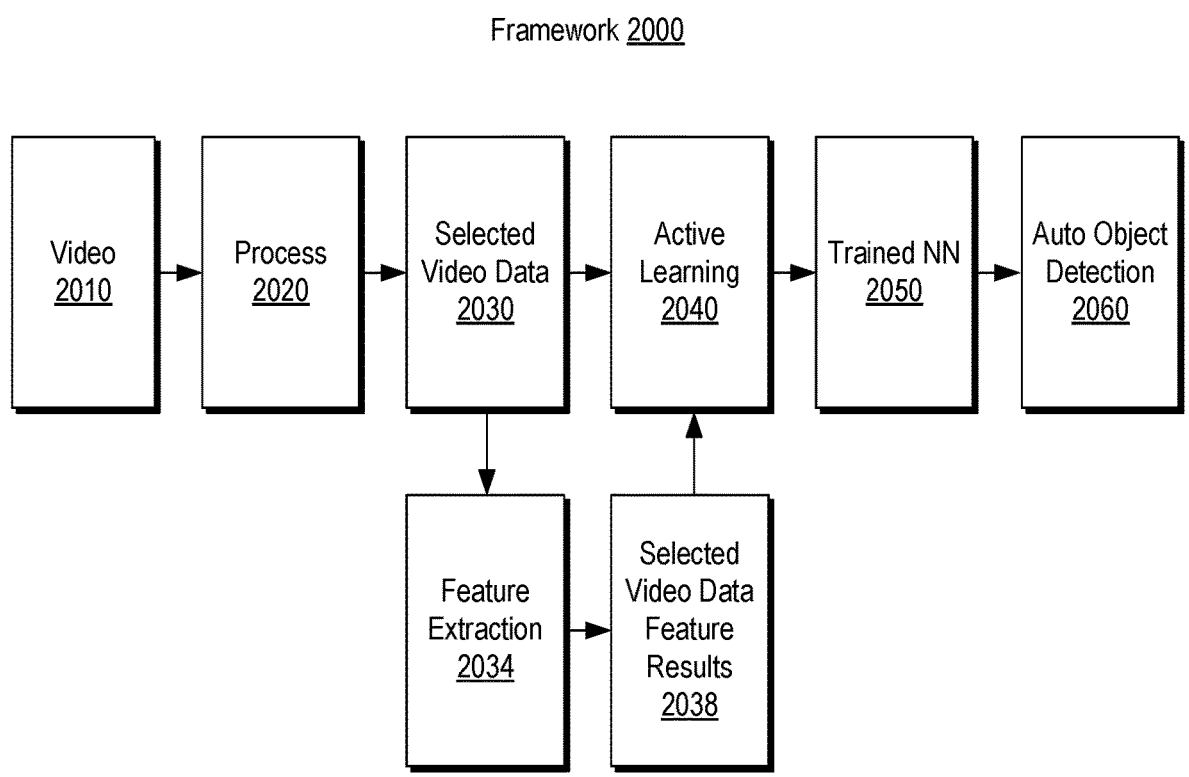
FIG. 20 illustrates an example of a framework.

FIG. 20 shows an example of a framework 2000 that can be utilized for processing video for purposes of machine learning to generate a trained machine learning tool. As shown, the framework 2000 includes a video block 2010, a process block 2020, a selected video data block 2030, a feature extraction block 2034, a selected video data feature results block 2038, an active learning block 2040, a trained neural network block 2050 (e.g., a trained machine learning tool block) and an automated object detection block 2060. As shown, the framework blocks can be organized as a workflow or a process where selected video data feature results can be utilized to improve active learning of a machine learning tool such as a neural network tool.

In the example of FIG. 20, video processing can be performed by the process block 2020, for example, by selecting frames from one or more live video streams and/or one or more video files to generate selected video data per the selected video data block 2030. In such an example, an extraction process may be utilized prior to a selection process (e.g., in a tiered or multiple round approach). As shown, the feature extraction block 2034 can operate using selected video data. As an example, the feature extraction block 2034 may utilize a histogram approach, for example, by generating one or more histogram types of representations of images and/or features therein. As an example, a feature extraction component can take selected frames as input and output feature histograms of those selected frames. Such feature histograms can be, for example, selected video data feature results per the block 2038. As to the active learning block 2040, it can perform active learning using at least a portion of the selected frames and output a trained neural network per the trained neural network block 2050. As to automated object detection, the automated object detection block 2060 can utilize the trained neural network as generated at least in part via active learning of the active learning block 2040 where automated object detection can detect one or more objects, for example, on unseen video feeds or images.

As to a numerical example, consider video acquired at a frame rate of 20 fps for 40 seconds to provide a total of 800 frames. In such an example, an extraction process can be implemented to sample the video, for example, at 1 fps to extract 40 frames from the 40 seconds of video. From those 40 frames, a selection process can be implemented to reduce the number of frames, for example, to 20 frames (e.g., 20 selected frames). As an example, the extraction process and/or sampling process may be supplanted at least in part by information from a compression algorithm and/or may utilize information from a compression algorithm. For example, consider use of an I-frame extraction process that is followed by a selection process. In the foregoing example, the number of frames has been reduced from 800 to 40 to 20 (e.g., over an order of magnitude reduction).

As explained, a feature extraction process may be performed on the selected frames, which, per the example above, involves 20 frames. Such a feature extraction process can generate feature results for each of the 20 frames. For example, consider performing feature extraction that includes clustering to determine "keyfeatures" (e.g., set of feature descriptors), which can be less than a total number of features detected (e.g., keypoint features). Such clustering can provide for a reduction in types of information (e.g., types of features).

Following the numbers in the example above, given 20 selected frames and corresponding feature results for each of the 20 selected frames, those 20 selected frames may be used as input to a trained neural network (e.g., an inspection learner, which can be an object detector). The output from the trained neural network can include inferences as to objects present in the 20 selected frames (e.g., at least some of the 20 selected frames) along with a output class probabilities, which may be utilize to determine an uncertainty score for each of the 20 selected frames (e.g., using maximum entropy, etc.). Where 20 uncertainty scores are determined, these may be ranked and a number of uncertainty scores selected such as, for example, the top 10 uncertainty scores (e.g., the top 10 most uncertain inferences).

Following the numbers utilized for illustration, the 10 selected frames that correspond to the top 10 uncertainty scores can be subjected to clustering, which may, for example, generate a number of clusters that is less than the number of selected frames. For example, consider clustering that generates 5 clusters. In such an example, the number of selected frames can be further reduced, for example, from 10 selected frames to 5 selected frames. Such a reduction can be performed by, for each of the 5 clusters, selecting one of the corresponding 10 selected frames that is the closest to the centroid of a cluster. For example, three of the 10 selected frames may be within a single cluster where one is selected as being the closest to the centroid of that single cluster.

As explained, a framework may be implemented to improve active learning where, in the context of video, frame number reduction occurs. In the foregoing example, the reduction is from 800 frames to 40 frames (extraction) to 20 frames (selection) to 10 frames (e.g., using uncertainty) to 5 frames (e.g., using a number of clusters). In such an example, frame reduction occurs in an intelligent manner using a machine learning model (e.g., an inspection learner, which may be an object detector). Such an approach to frame reduction can be optimized to an inspection task or tasks, for example, to optimize use of one or more resources, which can include, for example, a human annotator or human annotators (e.g., that can perform labeling, assessment of auto-labeling, etc., on a reduced number of frames). Various numbers of frames are provided as examples, noting that depending on particular tasks, data, etc., numbers may be different while still achieving a reduction that can benefit resource utilization.

Figure 21:
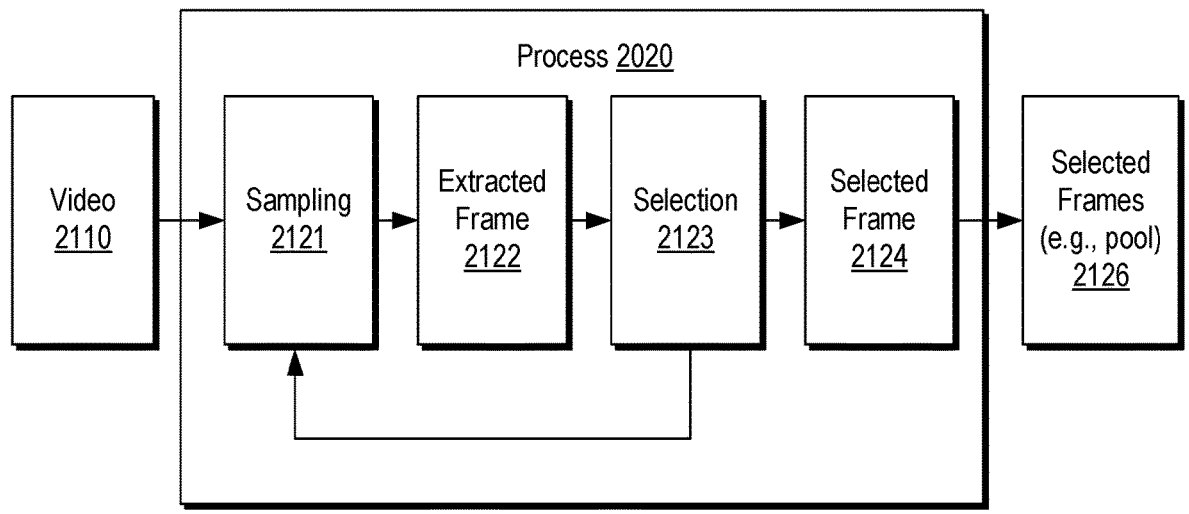
FIG. 21 illustrates an example of a process component.

Various aspects of the framework 2000 are described below in examples presented in FIGS. 21 to 27. In FIG. 21, processing is described where an extraction process, which may be a sampling process, can be utilized to sample video such that each extracted frame can be processed, for example, using a selection process. As example, processing may utilize a color model (e.g., RGB, HSV, etc.). For example, one or more of HSL (hue, saturation, lightness), HSV (hue, saturation, value) or HSB (hue, saturation, brightness) may be utilized alternative to or in addition to another color model (e.g., RGB color model, etc.) to generate a histogram or histograms for each extracted frame where comparisons between histograms can inform a selection process.

As an example, a choice of color model and/or component thereof may depend on type of video. For example, consider subsea video that may be acquired using artificial light, one or more optical filters, etc., which may inform color model histogram analysis. As another example, consider generating a video from a seismic cube of seismic data where the video is a fly-through of 2D slices where the data may be raw or seismic attribute data. As an example, one or more of H, S or V may be utilized as one may be better at distinguishing subsurface geological features than another in such a constructed video.

As an example, for subsea video acquired using a machine vision system, consider sampling a frame at a rate of 0.2 fps (e.g., once each 5 seconds), which may provide for a substantial reduction in a number of frames in a 10 hour long video acquired at a rate of 24 fps. As explained, one or more compression algorithm approaches may be utilized to inform or otherwise select frames.

Figure 22:
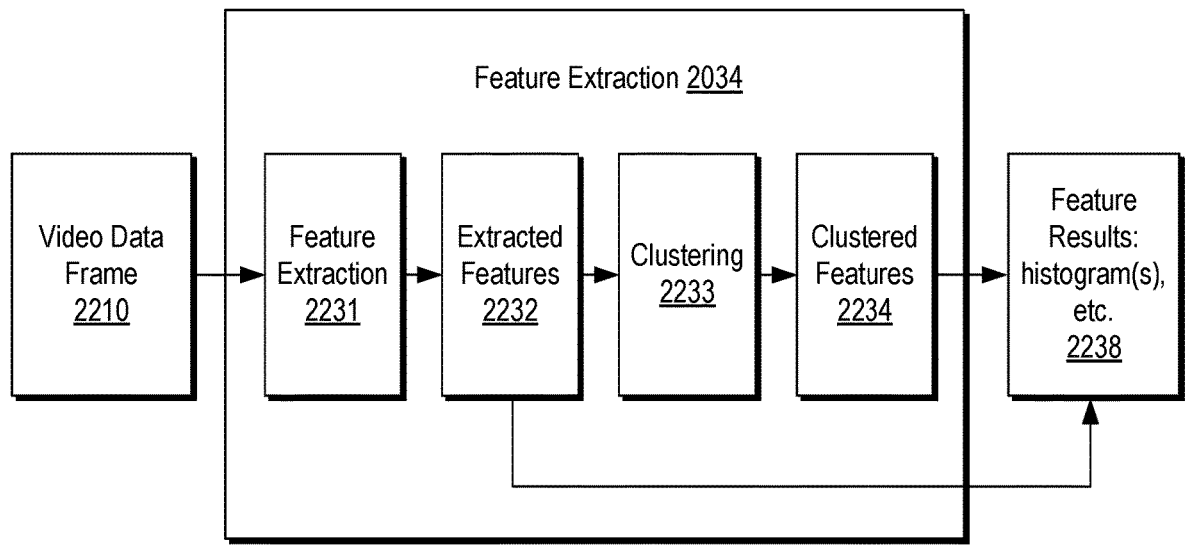
FIG. 22 illustrates an example of a feature extraction component.

In FIG. 22, feature extraction is described, which may, for example, involve a "Bag of Visual Words" (BOVW) approach. As an example, a method can include performing feature extraction to get "keypoints" (e.g., using DoG detector to get "keypoints"), which may then be depicted using the PCA-SIFT descriptor (e.g., a feature vector). As an example, features may be reduced to "key features" using clustering. For example, a PCA-SIFT approach may provide clusters from which "key features" can be discerned.

Figure 23:
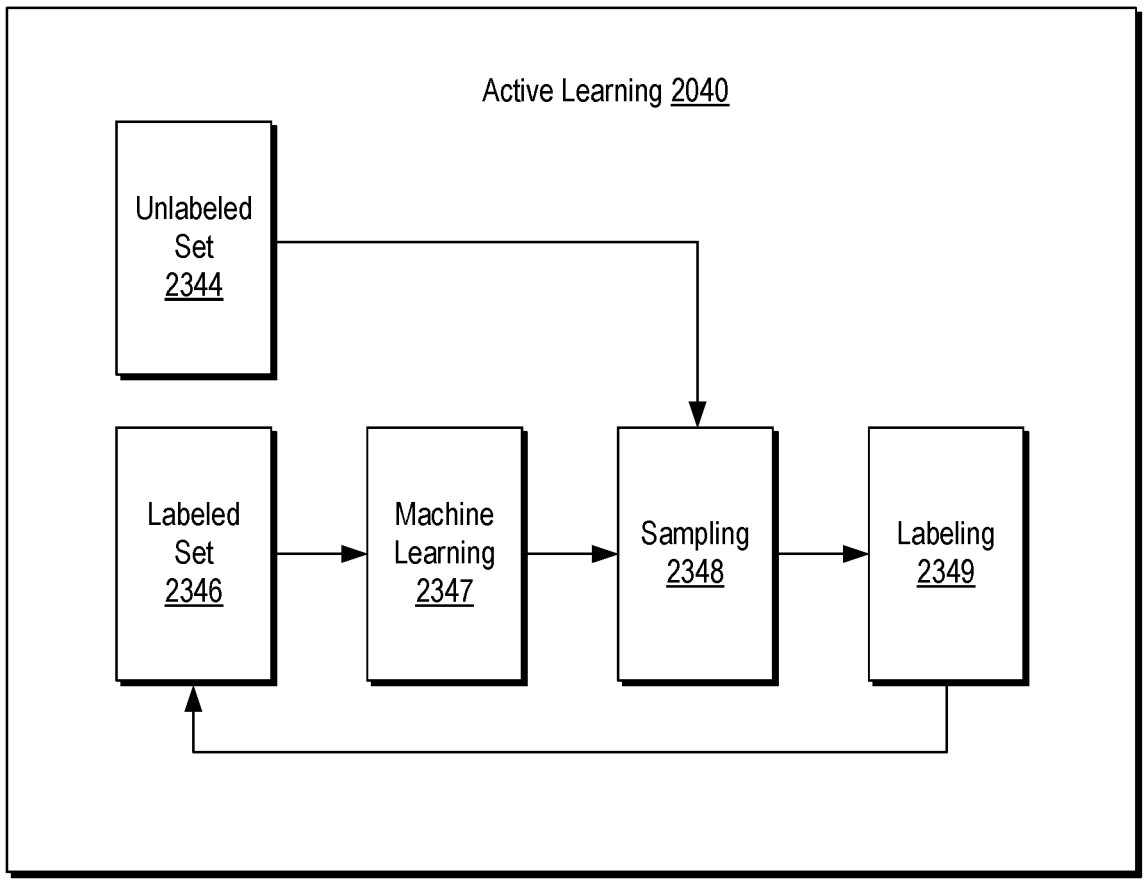
FIG. 23 illustrates an example of an active learning component.

In FIG. 23, active learning is described, which can include sampling of selected frames (e.g., as output in FIG. 21 and as having corresponding feature results as in FIG. 22). As explained, active learning can be performed using a trained machine learning model that can be further trained iteratively by processing selected frames and then labeling at least a portion of those selected frames based on probabilistic output of the trained machine learning model as to inferences made on the selected frames.

Figure 26:
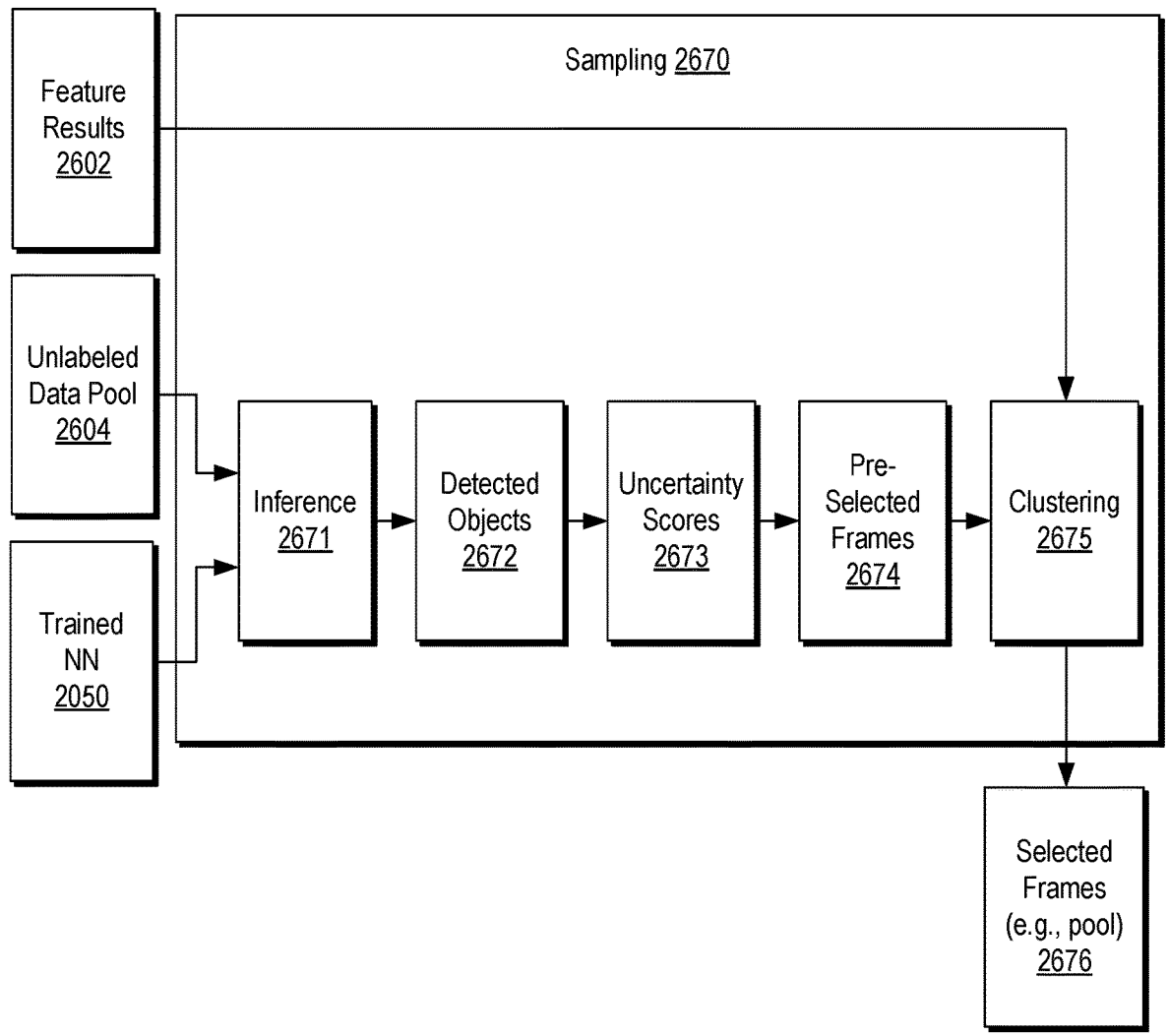
FIG. 26 illustrates an example of a sampling component.

In FIG. 26, sampling is described, which can be the type of sampling as in the example of FIG. 23. For example, sampling can involve receipt of selected frames (e.g., as in FIG. 21) and corresponding feature results (e.g., as in FIG. 22), where a trained neural network can make inferences to detect one or more objects in each of the selected frames. In such an example, sampling can include determining an uncertainty score for each of the selected frames using a probabilistic approach, which may include receiving probabilistic information from the trained neural network inferences. Given uncertainty scores for each of the selected frames, sampling can include ranking the uncertainty scores and then selecting a number of the selected frames that can be less than the total number of selected frames using the ranked uncertainty scores, for example, such that more uncertain inferences and their corresponding selected frames are chosen over less uncertain inferences and their corresponding selected frames. As explained, uncertain inferences may be indications that point to frames that, if labeled, can improve training of a machine learning model. In such an example, the results of the uncertainty rank-based sampling can be processed using clustering. For example, the sampled or pre-selected frames with more inference uncertainty can be clustered into a number of clusters where the number of clusters can be less than the number of pre-selected frames. As the feature results have already been determined for each of the selected frames going into the sampling process, those feature results may be utilized to select a reduced number of frames, which can be equal to or less than the number of clusters. For example, using the feature results, a sampling process may determine which of the pre-selected frames are closest to each centroid of each cluster where one of the pre-selected frames is selected as being the closest for each cluster. The result number of pre-selected frames may be referred to as selected frames of a sampling process that can be part of an active learning process.

Figure 27:
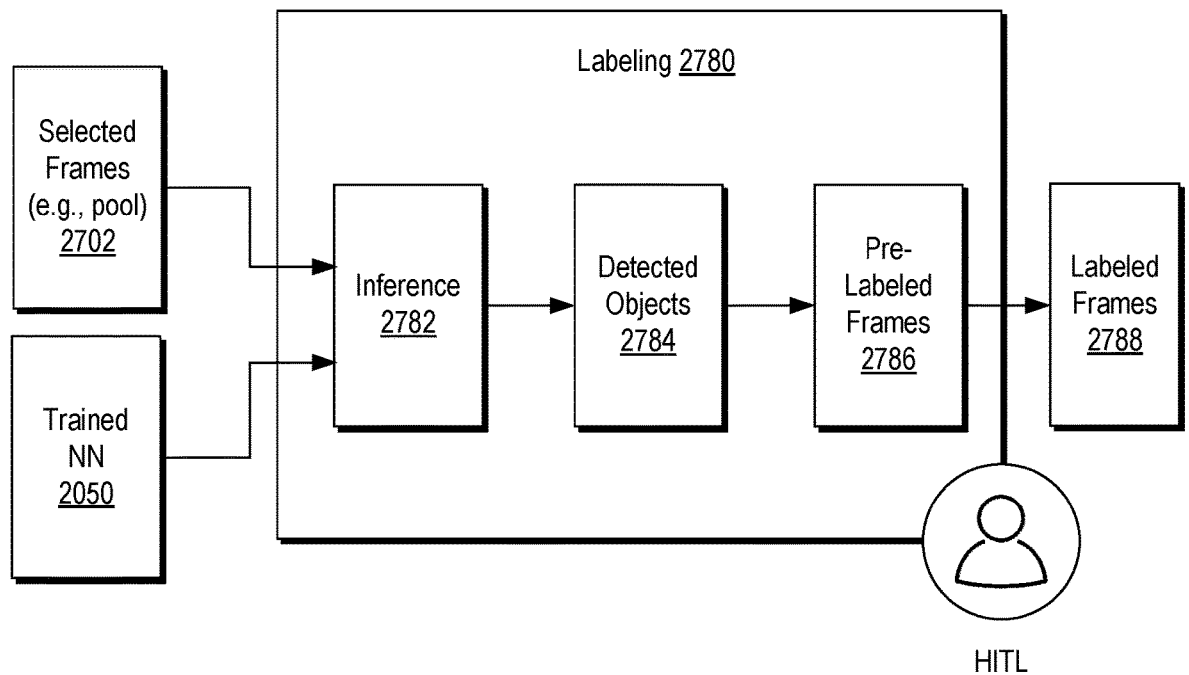
FIG. 27 illustrates an example of a labeling component.

In FIG. 27, labeling is described where, for example, the selected frames of the sampling process (e.g., K frames from a K-means clustering, etc.), can be fed into a trained machine learning model (e.g., an inspection learner, which may be an object detector) to detect features therein, where one or more of such features may be an object or objects. As an example, such an approach can include pre-labeling the frames using output of the trained machine learning model, which may be considered auto-labeling or machine labeling. As an example, a human annotator may receive via a machine (e.g., a computer, etc.) the pre-labeled frames to facilitate confirmation of such labels and/or labeling of those frames. Once labeled, frames may be utilized for further training of the trained machine learning model, which can generate a final trained machine learning model suitable for deployment in one or more inspection tasks (e.g., consider embedding in a machine vision instrument, a system, etc.). As an example, a method may be interactive in that one or more actions are performed during frame acquisition, during frame transmission and receipt, etc. As an example, depending on system architecture, inspection task(s), etc., in an on-going method, a trained machine learning model may be re-trained and/or further trained.

As an example, a framework may operate in a manner where the number of frames to be sampled is an input parameter thus the clustering happens before as a pre-processing action. For example, in an offline context, video may be pre-recorded and dumped in a database, which may be definitive and finite (e.g., new videos not expected). In such an example, the video can be processed in whole (e.g., consider various individual video files that can be processed in whole, etc.). In such an example, unsupervised clustering may be performed to keep track of the centroids of clusters. In such an example, these may be input to an active learning process (e.g., as unlabeled data, etc.). As another example, in an online context, if the video is streaming (e.g., receiving a stream of video), then clustering may be performed as a pre-processing action (e.g., not after inference) where there would be pre-processing performed more than once (e.g., each time a new video or video segment comes in). As an example, rather than performing a clustering operation on a total number of frames of video(s), the clustering operation can be performed on the new frames coming in (e.g., split at a certain frequency as described above such as, for example, 1 frame for each 5 second), which may utilize centroids of the other clusters to optimize pre-processing time. As an example, clustering may be performed a single time, prior to inference, to optimize time. Such an approach may aim to reduce the number of unlabeled frames to run inference where running inferences on a greater number of frames takes more time. Thus, a method can include performing a pre-processing stage to capture a total number of cluster centroids (e.g., most representative images of a cluster) and then run inference on these and keep the top K (e.g., an input parameter) for sampling at a given iteration.

FIG. 21 shows an example of the process block 2020. As shown, the process block 2020 can receive video per a video block 2110, perform sampling per a sampling block 2121, provide an extracted frame per an extracted frame block 2122, perform selection per a selection block 2123, provide a selected frame per a selected frame block 2124 and output one or more selected frames to a selected frames block 2126, which may be a data pool. As shown, a loop can exist between the blocks 2121, 2122 and 2123, which may operate in a synchronous and/or asynchronous manner with respect to video of the video block 2110. For example, the process block 2020 may be linked to a machine vision instrument and/or embedded within a machine vision instrument such that a pool of selected frames can be generated.

As explained, the process block 2020 can provide for selecting frames from video (e.g., RGB, HSV, sonic, thermal, depth, multi-spectral, etc.) that can be representative of semantic content of the video and, for example, maintain a temporal order. In the example of FIG. 21, the sampling block 2121 can extract frames from a video feed, for example, at a given frame rate and/or optionally according to frame type (e.g., I-frame, etc.), while a selection block 2123 can decide whether a given extracted frame is appropriate for selection as a selected frame. As explained, such an approach can be a tiered approach where a first process is followed by a second process, where both processes aim to reduce resource demand and/or otherwise optimize resource utilization, for example, as to a human annotator. Additionally, such an approach can provide for improved learning to generate a trained machine learning tool.

As an example, a sampling component of a framework can receive a video file, a live video stream, etc. (e.g., video feed) for processing, which may be according to a certain frame rate to yield frames. In such an example, a frame rate may be an I-frame rate or other rate that may depend at least in part on a codec that processes image data, where such a rate may be dynamic and/or static. For example, a codec can include determining whether or not a frame is to be an I-frame and where it is, a sampling component may utilize designated I-frames. Such an approach can leverage a compression technology that may assess some amount of uniqueness, similarity, diversity in an image as relevant to compression. As an example, the H.264 codec can include one or more processes for I-frame prediction.

As an example, a codec may include a Group Of Pictures (GOP) structure such as IBBPBBP where the I-frame is used to predict the first P-frame and these two frames are also used to predict the first and the second B-frames; the second P-frame is predicted also using the first I-frame; and both P-frames join together to predict the third and fourth B-frame. In such an example, there are two types of inter frames: P-frames and B-frames. These two kinds of frames and the I-frames (intra-coded pictures) can join in a GOP (Group of Pictures).

As an example, a codec and/or other pre-processor may utilize one or more of a temporal approach and a spatial approach to I-frame prediction. For example, a motion vector may be utilized temporally that uses a block motion vector from a List 1 frame, located at the same position to deduce a motion vector where a List 1 block uses a List 0 block as reference. As to spatial, consider an approach that predicts the movement from neighbor macroblocks in a frame where a possible criterion could be to copy the motion vector from a neighboring block. Such a mode may be used in uniform zones of a picture where there is not much movement.

As to video captured by a vehicle that can be moving, there may be minimal motion in a scene but rather motion caused by movement of the vehicle. As an example, where a vehicle is following a path that is expected to follow a pipeline, whether buried, partially buried, exposed, etc., I-frame determination may be based on changes that can occur in transitioning from buried to not buried, straight to curved, etc. As explained, a processing component of a framework may leverage a codec (e.g., compression technology) utilized to compress video.

As to a selection component, global features may be computed for a frame that may be an extracted frame that is to be assessed for selection. For example, consider an approach that utilizes one or more of RGB color histograms, HSV histograms, gradients, etc., and that compares to the one or more global features from a prior frame and from a prior selected frame, for example, according to a comparison metric that can reflect similarity. Such an approach can generate a similarity score. As an example, a similarity score can then be compared to a threshold and depending on the result, the frame will be labeled as a selected frame or rejected frame. In such an example, where the frame is deemed to be a selected frame, it can then be added to a selected frame dataset (e.g., a selected frame pool). As to comparisons, one or more types of data structures may be utilized, which may, for example, be compared using one or more types of techniques (e.g., plotting, clustering, fitting, etc.).

As explained with respect to the process block 2020 of FIG. 20, a loop back can occur to the sampling block 2121 until, for example, there are no frames remaining in the video feed. As explained, video processing can achieve real-time frame selection using one or more types of feature analyses (e.g., histograms, codec frame prediction, etc.).

FIG. 22 shows an example of the feature extraction block 2034 of the framework 2000 of FIG. 20. As shown, it can receive a video data frame per a video data frame block 2210, which can be a selected frame as output by the process block 2020. As shown, a feature extraction block 2231 can extract one or more features, an extracted feature(s) block 2232 can include one or more extracted features that may be subjected to clustering using a clustering block 2233 that can output one or more clustered features per a clustered features block 2234. As shown, the feature extraction block 2034 can output feature results per a feature results block 2238, which may be or include, for example, one or more histograms, etc. As an example, feature results may be in the form of a vector where each of the video data frames is processed to have a corresponding vector (e.g., a feature vector).

As an example, the feature extraction block 2034 can take as an input selected frames as per the selected frames block 2126 of the process 2020 of FIG. 21 and output their corresponding feature results per the block 2238. As an example, the block 2231 can provide for extracting features from each selected frame using a feature extractor algorithm (e.g. SURF, SIFT, PCA-SIFT, ORB, etc.) yielding local feature descriptors that may be vectors of a predefined size describing each feature. As an example, a clustering algorithm (e.g., K-means, etc.) can be implemented by the clustering block 2233 for clustering these features into different clusters. In such an example, a centroid of each cluster may constitute a feature and each feature belonging to the same cluster as the one of the features will be associated to that feature. The feature results block 2238 may include calculating for each image a result such as a feature histogram, which may be represented as a data structure (e.g., a feature vector, etc.). As mentioned, a keypoint approach may be utilized where one or more results can be in the form of a BOVW data structure (e.g., a BOVW histogram, etc.).

FIG. 23 shows an example of the active learning block 2040 of the framework 2000 of FIG. 20. As shown, the active learning block 2040 can include inputs for an unlabeled set 2344 and a labeled set 2346 where the labeled set 2346 can be utilized for machine learning per a machine learning block 2347 where training can occur of a machine learning model of the machine learning block 2347 where a trained machine learning model can be generated that can receive images (e.g., selected frames) of the unlabeled set 2344 (see, e.g., FIG. 21) and where output therefrom can be utilized in sampling per a sampling block 2348, which can provide for a reduction in data of the unlabeled set 2344 for purposes of labeling. As shown in the example of FIG. 23, labeling can be performed using sampled output from the sampling block 2348, which can be a reduced set of the unlabeled set 2344. As shown, a loop can exist that feeds output of the labeling block 2349 to the labeled set 2346 where, for example, further machine learning may be performed per the machine learning block 2347.

In the example of FIG. 23, the sampling block 2348 can differ from the sampling block 2121 of the process block 2020 of FIG. 21. As explained, the sampling block 2121 operates with respect to video data (e.g., extraction of video frames, etc.), which may be live video data that are raw, compressed, etc., as part of the selection process of the selection block 2123 that can be utilized to generate the selected frames of the selected frames block 2126 (e.g., a pool of selected frames from the process block 2020). In the example of FIG. 23, the unlabeled set 2344 can be the selected frames of the selected frames block 2126; noting that feature results can exist for the selected frames per the feature extraction block 2034 of FIG. 22.

As shown, active learning can utilize a machine learning component, a sampling component and a labeling component. In such an example, active learning can aim to maximize performance of a trained machine learning tool (e.g., a trained neural network) with a limited number of images (e.g., frames). As explained, one or more processes may act to reduce a number of images (e.g., frames) to a reduced number of images (e.g., frames) for purposes of labeling and further training, which can generate a deployable trained machine learning tool.

Figure 24:
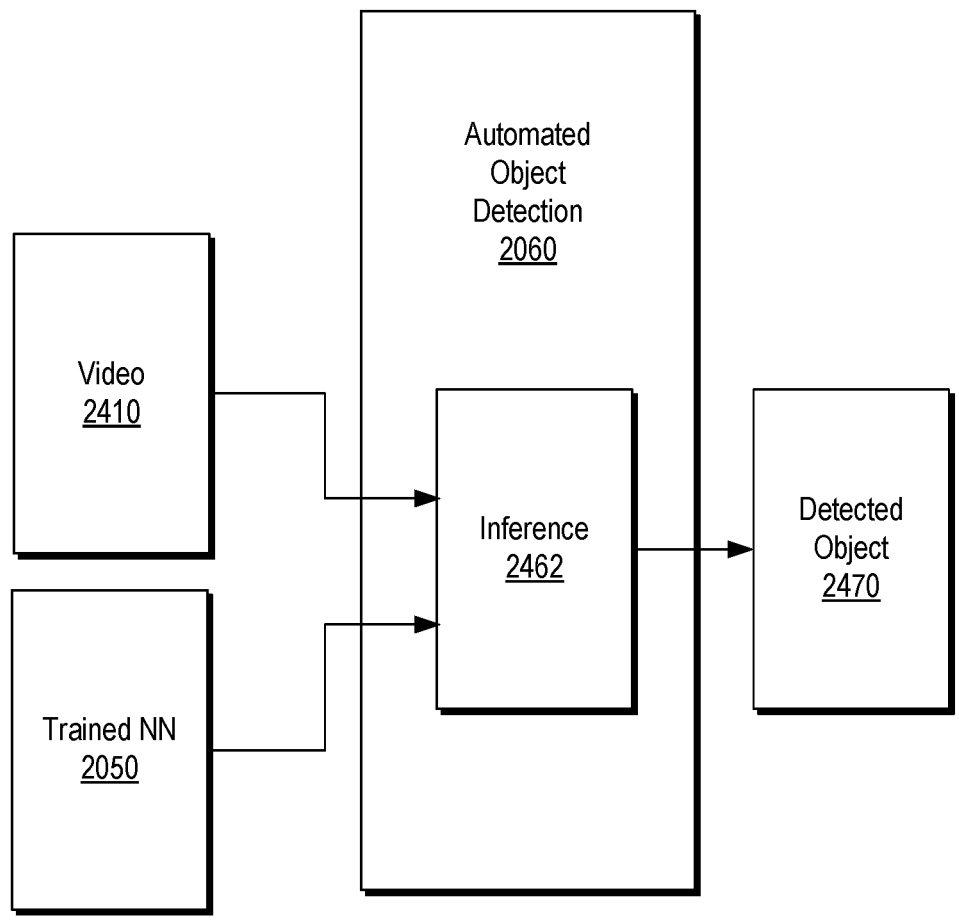
FIG. 24 illustrates an example of an automated object detection component.

FIG. 24 shows an example of the automated object detection block 2060. As shown, a video block 2410 provides for video and the trained neural network block 2050 provides a trained neural network that can generate inferences using the video of video block 2410 where the inferences can be germane to object presence such that an output can be a detected object per a detected object block 2470. In such an example, the trained neural network can be trained via active learning (see, e.g., the active learning block 2040 of the framework 2000 of FIG. 20).

As an example, a machine learning block can include a neural network (e.g., a machine learning model) that can be trained on a training set composed of labeled images where its performance can then be evaluated on a dataset of test images according to a certain metric (e.g., mean average precision, F1-score, precision, recall, etc.). In such an example, the labeled images may be output from a labeling process such as, for example, a labeling process of the active learning block 2040 (see, e.g., the labeling block 2349).

As explained with respect to the framework 2000 of FIG. 20, the active learning block 2040 can be utilized to generate a trained neural network as a machine learning tool per the trained neural network block 2050 that may be utilized in automated object detection per the automated object detection block 2060. As explained, the active learning block 2040 can include the labeling block 2349 for labeling frames where the machine learning block 2347 can utilize such labeled frames where sampling of the sampling block 2348 may be informed by output of the machine learning block 2347, which may provide for further labeling by the labeling block 2349.

As an example, a method can include active learning from video that may be video processed into set of frames to which active learning can be applied for training a machine learning model that can be utilized in handling data (e.g., determining what data are to be labeled, etc.). As an example, a method can include active learning from video processed into set of frames smartly (e.g., using feature extraction, clustering, etc.) to which active learning can be applied for training a machine learning model that can be utilized in handling data (e.g., determining what data are to be labeled, etc.).

Figure 25:
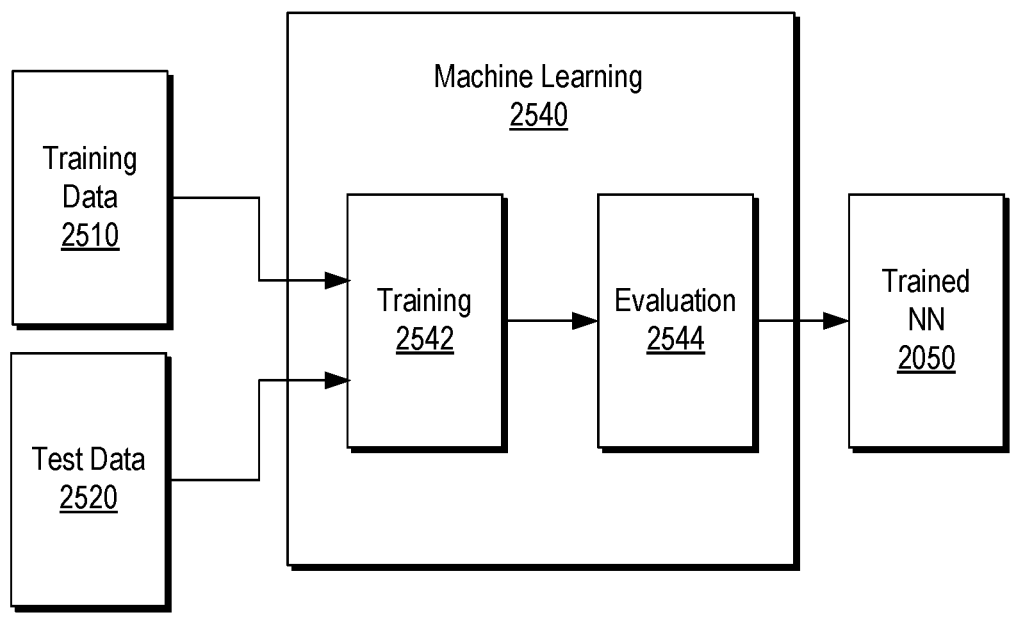
FIG. 25 illustrates an example of a machine learning component.

FIGS. 25, 26 and 27 show examples of active learning components of the active learning block 2040 of FIG. 20 and FIG. 23. Specifically, FIG. 25 shows an example of the machine learning block 2347 as a machine learning block 2540, FIG. 26 shows an example of the sampling block 2348 as a sampling block 2670, and FIG. 27 shows an example of the labeling block 2349 as a labeling block 2780.

FIG. 25 shows an example of a machine learning block 2540 suitable for use in active learning where the machine learning block 2540 includes receiving training data per a training data block 2510 and test data per a test data block 2520. As explained, such data can include labeled data, which may be labeled according to one or more labeling processes. As shown, a training block 2542 can include training of a machine learning model (e.g., a neural network, etc.) where, for example, one or more network weights (e.g., network data structure weights, etc.) may be adjusted based at least in part on data. As shown, an evaluation block 2544 can evaluate training of the machine learning model (see, e.g., the trained neural network block 2050), for example, using at least a portion of the test data of the test data block 2520 (e.g., ground truth data, etc.). Where an evaluation is acceptable per the evaluation block 2544, the machine learning block 2540 can output a trained machine learning model per the trained neural network block 2050, which can be a trained machine learning tool that may be suitable for deployment in one or more contexts (e.g., systems, units, instruments, etc.). As explained with respect to the active learning block 2040, such a trained machine learning tool may be utilized for purposes of sampling per the sampling block 2348. As an example, the machine learning block 2540 may be utilized as an initial machine learning block, an intermediate machine learning block, a final machine learning block, a re-training machine learning block, etc.

FIG. 26 shows an example of a sampling block 2670 suitable for use in active learning where the sampling block 2670 can receive input from a feature results block 2602, an unlabeled data pool block 2604 (see, e.g., the selected frames block 2126 of FIG. 21, etc.) and the trained machine neural network block 2050 (e.g., a trained machine learning tool). As shown, the trained neural network of the trained neural network block 2050 can operate on an unlabeled data pool frame from the unlabeled data pool of the unlabeled data pool block 2604 to make an inference per an inference block 2671, which can be a basis for object detection per a detected objects block 2672. Given one or more detected objects, one or more uncertainty scores may be computed using an uncertainty scores block 2673. In such an example, pre-selected frames per a pre-selected frames block 2674 may be utilized in a clustering process per a clustering block 2675, which can operate using feature results information from the feature results block 2602. As shown, output of the sampling block 2670 can be selected frames per a selected frames block 2676.

In the example of FIG. 26, the feature results block 2602 can provide feature results as indicated in FIG. 20 (see also, e.g., the feature results block 2238 of FIG. 22) by the selected video data feature results block 2038. In such a manner, such feature results can inform active learning for purposes of clustering per the clustering block 2675, which, in turn, can provide for selection of frames per the selected frames block 2676, which may be referred to as sampled frames as sampled by the sampling block 2670 of the active learning block 2040 (see, e.g., FIG. 23) of the framework 2000 of FIG. 20. As explained with respect to the active learning block 2040 of FIG. 23, the labeling block 2349 can provide for labeling, for example, labeling of selected frames of the selected frames block 2676, which, as mentioned, may be referred to as sampled frames. In turn, labeled frames may then be utilized for training of a neural network model, which may be further training of an already trained neural network model (e.g., an initial, an intermediate, a final, etc.). The sampling block 2670 can be an active part of an active learning process that aims to actively select a batch of frames (e.g., images, etc.) to be labeled in a labeling process, which may be a HITL process.

As explained, sampling can receive input from an unlabeled pool of images made up of acquired frames that are not yet labeled. As an example, a sampling component can output a set of K images where K is an acquisition size, which may be either constant or dynamic in order to handle large datasets. A previously trained neural network can be used to make inferences on the unlabeled dataset to help produce a set of images and their associated detected objects.

As an example, an uncertainty score can be a score associated with each image of an unlabeled pool of images, the calculation of which can be based on output class probabilities of a trained neural network. In such an example, the uncertainty score can be for example a maximum entropy value (e.g., "max entropy"), where max entropy of an image x is the function defined as follows:

$$H_\theta(x) = \max_k \sum_{c \in classes} P(\hat{y}_k = c \mid x, \theta) \log(P(\hat{y}_k = c \mid x, \theta))$$

where k is an index that can take a value between 1 and the number of detected bounding boxes for image x and $P(\hat{y}_k=c|x, \theta)$ represents the probability that the detected class of bounding box k is c.

As an example, frames (e.g., images, etc.) can be ranked in descending order according to their uncertainty score. In such an example, a number of the frames with the highest uncertainty scores can be pre-selected (denoted hereafter as pre-selected frames or pre-selected images).

As frames are taken from videos, at that point some pre-selected frames may look quite similar and thus it can be desirable to add a diversity component. A diversity component can aim to reduce potential quasi duplicates. As an example, pre-selected frames can be clustered in K clusters using a clustering algorithm (e.g., K-means, etc.) according to their feature histograms. For each cluster, the frame which feature histogram is closest to the centroid of the cluster can be selected and moved to a pool of selected frames (see, e.g., the selected frames block 2676). Such an approach can yield K selected frames. As an example, a sampling strategy may also include combining diversity scores and uncertainty scores where a neural network or neural networks can be utilized.

FIG. 27 shows an example of a labeling block 2780 suitable for use in active learning where the labeling block 2780 can receive as input selected frames from a selected frames block 2702 (see, e.g., the selected frames block 2676 of FIG. 26) and can receive input from a trained machine learning tool per a trained neural network block 2050. As shown, an inference block 2782 can make inferences as to detected objects where output can be one or more detected objects per a detected objects block 2784. As shown, pre-labeled frames may be output from the detected objects block 2784 per a pre-labeled frames block 2786 (e.g., one by one, in parallel, etc.), which may be considered to be a type of auto-labeling. As shown, pre-labeled frames of the pre-labeled frames block 2786 may be provided to an oracle, for example, a human annotator (e.g., consider an HITL approach), to generate labeled frames per the labeled frames block 2788.

As shown in the example of FIG. 27, through use of a trained neural network, inferences may be made as to selected frames for purposes of object detection that can be utilized for pre-labeling frames, which may thereby expedite labeling by a human annotator. Such an approach to active learning can provide for more optimal use of resources such as a human annotator. As explained, once an oracle labels frames to provide a ground truth, such labeled frames can then be utilized for training a machine learning tool or retraining a machine learning tool, which can include further training of an already trained machine learning tool.

As an example, sampled frames at each iteration of active learning can be labeled (e.g., auto-labeled, which may be referred to as pre-labeled) using a prior iteration of a trained machine learning model. As explained, active learning can help to optimize use of one or more resources, which may be constrained or otherwise limited.

In the example framework 2000 of FIG. 20, active learning can include sampling frames where such sampling of frames occurs because a trained neural network (e.g., trained machine learning model) is not sufficiently confident as to processing of those frames (e.g., according to one or more metrics, etc.) yet that trained neural network can be the same trained neural network that can be utilized for purposes of auto labeling (see, e.g., pre-labeled frames block 2786 of FIG. 27). In such an approach, the trained neural network may have picked the frames because their individual scores of "confidence" (e.g., one or more metrics, etc.) on them is not acceptably good, yet, for example, within a frame some features (e.g., objects, etc.) may still be quite well detected (e.g., detected with a sufficiently high object detection confidence on localization and class). As an example, where a frame includes a mix of one or more unacceptably detected features and one or more acceptably detected features, the one or more acceptably detected features, which may be one or more objects or at least a portion thereof, may be auto-labeled, while the one or more unacceptably detected features (e.g., which may include non-detected features, etc.) may be destined for labeling by an oracle (e.g., a human annotator).

As explained, auto-labeling may be performed for one or more features in a frame where a decision to auto-label or not may depend on one or more metrics (e.g., a confidence score, etc.). If a trained neural network acceptably labeled features to be desirably labeled in frames of a video, that may operate as a stopping criterion to halt active learning and to export the trained neural network (e.g., as a final trained neural network). In other words, if auto-labeling is acceptable for frames of video, then there may be no demand for an oracle (e.g., a human annotator). As that condition is generally not met for some number of iterations, there is a demand for an oracle and the framework 2000 of FIG. 20 may help to optimize oracle utilization in an intelligent manner that may get the most out of the oracle in terms of training an acceptable neural network (e.g., an inspection learner, which can be an object detector, which may be a feature detector, etc.).

As explained, after a number of iterations, it may be expected that an auto-labeler (e.g., a trained machine learning model) is on par with an oracle for one or more desired inspection tasks. As to the number of iterations, it may be indicated by, for example, how many frames are deemed selectable by a sampling process (see, e.g., the sampling block 2670 of FIG. 26). For example, if an initial operational parameter is to have a sampling process provide 50 frames (e.g. in a batch, etc.) using uncertainty scores above a threshold, where 50 frames are no longer available above the threshold, the trained auto-labeler (e.g., trained machine learning model) may be deemed acceptable, which may be a condition that calls for termination of active learning.

As an example, a labeling component can take as an input selected frames as output by a sampling component. As explained, a human labeler can review frames that are sent to labeling. For example, consider a human that draws rectangular bounding boxes and assigns them class labels that correspond to the objects they represent (e.g., consider class labels derived from features such as keypoint-based features, etc.). For such a task, a human labeler may be assisted by a prior iteration trained neural network, for example, according to an assisted labeling process. As an example, pre-labeled frames from an automated labeling process may be of acceptable quality such that an oracle may review and accept without making one or more adjustments (e.g., to a bounding box, etc.). As explained, where a pre-labeled frame includes one or more features (e.g., objects, etc.) that are not labeled in combination with one or more features (e.g., objects, etc.) that are labeled, the oracle may review the pre-labeled frame and label it accordingly (e.g., annotate it accordingly).

As explained, an active learning process can operate in a probabilistic manner where one or more of uncertainty, confidence, etc., are utilized, which may be metrics output by and/or derived from operation of a trained machine learning tool that can be an inspection learner (e.g., an object detector, etc.).

Assisted labeling can include using a previously trained neural network to infer objects on a dataset sent to a labeler (e.g., an oracle). For each frame, one or more bounding boxes for which a confidence score (e.g., the highest-class probability output for the bounding box) is below a certain threshold can be filtered out (e.g., regions without auto-labels demarcated as regions without bounding boxes). In such an example, other detected bounding boxes can then be pre-labeled with the appropriate label corresponding to the most confident class. Such an approach can provide for a substantial reduction in labeling time through auto-labeling.

As an example, a human labeler may label frames with the help of one or more bounding boxes inferred by a trained neural network, which may be for high confidence with labels, low confidence without labels, one or more confidence ranges with suggested labels, etc. In such an example, a human labeler may discern regions that are to be labeled while being informed of regions that are adequately labeled.

As mentioned, active learning can continue until a stopping criterion is met or stopping criteria are met (e.g. labeling budget used up, performance metric stagnates, etc.).

Figure 28:
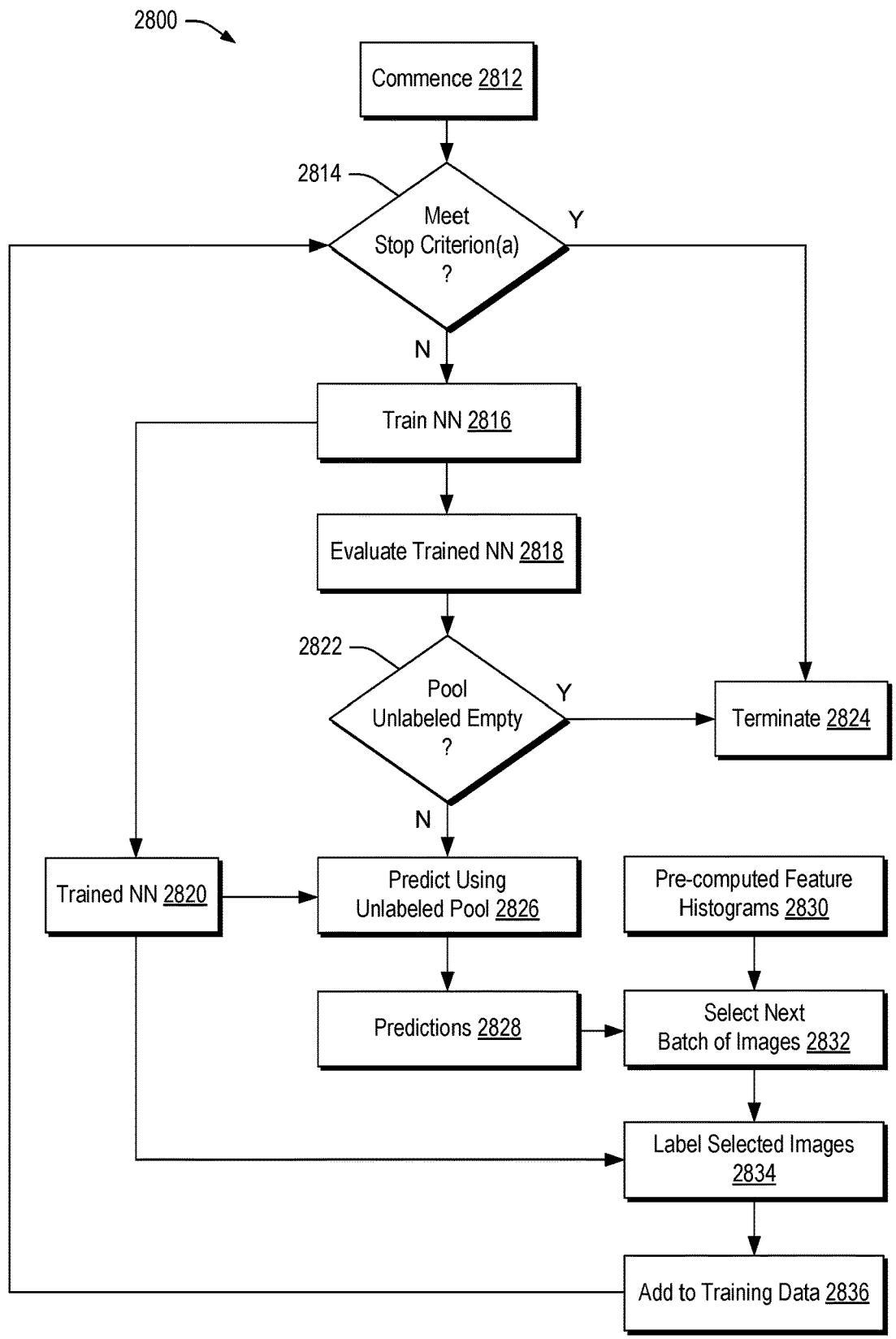
FIG. 28 illustrates an example of a method.

FIG. 28 shows an example of a method 2800 that includes a commencement block 2812 for commencing the method 2800, a decision block 2814 for deciding whether one or more stop criteria have been met, a train block 2816 for training a neural network, an evaluation block 2818 for evaluating a trained neural network, a decision block 2822 for deciding whether a pool of unlabeled data is empty, a prediction block 2826 for predicting using data from an unlabeled pool to output predictions per a predictions block 2828. As shown, if the decision block 2814 decides that the one or more stop criteria are met, the method 2800 can continue to a termination block 2824; otherwise, the method 2800 can continue to the train block 2816. As shown, the train block 2816 can generate a trained neural network per a trained neural network block 2820, which may be utilized for one or more purposes, including, for example, making predictions by the prediction block 2826 and, for example, labeling one or more selected images per a label block 2834, which may be considered to provide for pre-labeled images (e.g., pre-labeled frames). As explained, pre-labeled images can include images that are entirely pre-labeled or that may be partially pre-labeled (e.g., where one or more objects therein can benefit from human labeling).

In the example of FIG. 28, the method 2800 can include receiving pre-computed feature histograms per a pre-computed feature histograms block 2830 (e.g., or one or more other types of data structures as to feature results). Such information can be received by a selection block 2832 that also receives the predictions of the predictions block 2828. As explained, selection may be through a sampling process such as, for example, the sampling process described with respect to the sampling block 2670 of FIG. 26, where the feature results block 2602 and pre-selected frames per the pre-selected frames block 2674 are subjected to clustering per the clustering block 2675 to thereby generate selected frames of the selected frames block 2676, which, in the example of FIG. 28 can be a selected next batch of images per the selection block 2832. Given a selected next batch of images (e.g., frames), the method 2800 can proceed to the label block 2834, which may utilize the trained neural network of the trained neural network block 2820, for example, for purposes of pre-labeling, which can provide indications as to regions labeled and regions to be labeled (e.g., by a human annotator, etc.). As shown, output of the label block 2834 can be added to training data per an addition block 2836 (e.g., appropriately labeled images). As shown, the decision block 2814 may operate based at least in part on information associated with the addition block 2836, for example, whether sufficient training data exists as a "batch" suitable for a labeling process that may involve a human annotator or human annotators. As explained, where a trained neural network operates acceptably, auto-labeling may be suitably achieved, which may be an indication that active learning can be terminated, for example, per the termination block 2824.

As explained, active learning may be complemented by a snapshot ensembles component that may adapt one or more components as follows. For example, as to a machine learning component, a learning rate used for training can be a cyclical learning rate, which may be composed of N cosine-like learning rate schedules. In such an example, at the end of each cycle, a copy of the current neural network can be saved as a snapshot. As to a selection component, as an example, each of N snapshots can be used to infer detected objects on an unlabeled pool of images. In such an example, each image of the unlabeled pool of images can be associated with N temporary uncertainty scores corresponding to the uncertainty scores of each snapshot for a current image. Such temporary uncertainty scores can then be weighted and summed to determine an uncertainty score of that image.

As to an automated object detection component, with respect to the method 2800 of FIG. 28, once the one or more stopping criteria is or are met, the last trained neural network from the active learning module process can be used to make inferences on an unseen video feed that can be a live video stream, video files or on an image. In such an example, the result of the inference can be the same video feed or image complemented with potential object detections in the form of bounding boxes that can overlay the video feed or image given as input. As an example, consider the automated object detection component block 2060 of FIG. 24, which may utilize the trained neural network of the trained neural network block 2050, which may be from an iteration of the method 2800 of FIG. 28, for example, where a stopping criterion or stopping criteria are met, where the method 2800 may optionally proceed to the termination block 2824; noting that a dynamic continuous and/or periodic approach may be utilized where the method 2800 may be operated according to one or more triggers, which may result in an update to and deployment of a new trained neural network for purposes of performing one or more inspection tasks.

As explained, the framework 2000 of FIG. 20 can be utilized to perform an end-to-end active learning workflow that can start with raw video and an untrained or pre-trained neural network. The combination of active learning strategies with frame selection can provide for accurate object detection, within a limited budget, on unseen video feeds or images.

As an example, a method can include receiving labeled images; acquiring unlabeled images; performing active learning by training an inspection learner using at least a portion of the labeled images to generate a trained inspection learner that outputs information responsive to receipt of one of the unlabeled images by the trained inspection learner; based at least in part on the information, making a decision to call for labeling of the one of the unlabeled images; receiving a label for the one of the unlabeled images; and further training the inspection learner using the label. In such an example, the information can include uncertainty information as to one or more features in the one of the unlabeled images. For example, where uncertainty is higher, the one of the unlabeled images may be of more value to label, where, once labeled, it can be utilized for further training of the inspection learner to improve its ability to detect the one or more features. As an example, uncertainty information can be probabilistic information, which may be generated through operation of a trained inspection learner.

As an example, a method can include training a density learner that generates a density metric responsive to receipt of an image where such a method can include making a decision to label one of a set of unlabeled images using at least the density metric. As an example, a method can include receiving a trained density learner that generates a density metric responsive to receipt of an image where such a method can include making a decision to label one of a set of unlabeled images using at least the density metric.

As an example, a method can include training a typicality learner that generates a typicality metric responsive to receipt of an image where such a method can include making a decision to label one of a set of unlabeled images using at least the typicality metric.

As an example, a method can include training an inspection learner through a training process that includes utilizing a density metric and a typicality metric. For example, consider an active learning process as a training process.

As an example, a label of an image can be a machine generated label. For example, a trained inspection learner may receive an image that is unlabeled and detect one or more features in the image where such one or more features can be labeled. In the context of a subsea inspection task, consider a label as to a type of equipment, a label as to a status of a type of equipment, etc.

As an example, a label can be a machine generated label that depends on receipt of a signal from a human input device (HID) (e.g., a mouse, a touchscreen, a stylus, a trackball, a microphone, etc.). For example, consider a workstation computing system that includes a display where a graphical user interface (GUI) can be rendered to the display with an image that may include one or more labels and/or one or more other types of indicia. In such an example, one or more features in the image may be unlabeled and identified by a human through visual inspection (e.g., optionally aided by one or more image processing techniques). In such an example, one identified, the human may utilize a HID to assign a label or labels to the one or more features. Such a process can be referred to as human labeling or human annotation where a human is in the loop (HITL). The workstation computing system may be instructed to save the label or labels with the image such that the image can be a labeled image suitable for use in training (e.g., further training of an inspection learner).

As an example, a method can include, after further training of an inspection learner using a label, generating a deployable trained inspection learner. In such an example, the method may include deploying the trained inspection learner to a machine vision system. In such an example, the machine vision system may include at least one subsea image acquisition unit.

As an example, a method can include computing a relevance score, a density score, a typicality score and an uncertainty score using output of a density learner, a typicality learner and the inspection learner and, based at least in part on one or more of the scores, calling for analysis of one of a set of labeled images or analysis of one of a set of unlabeled images (see, e.g., FIG. 8, FIG. 11, etc.). In such an example, the analysis of one of the set of unlabeled images can call for labeling of the one of the set of unlabeled images; whereas, the analysis of one of the set of labeled images can call for healing of the one of the set of unlabeled images.

As an example, an inspection learner can include an object detector that includes at least one neural network. As an example, an object detector may be a feature detector where an object may be defined by one or more features. As an example, an inspection learner can be or can include a feature detector that can detect one or more features in data, where such data may be an image, a frame, etc.

As an example, an inspection learner can include an ensemble of object detectors where information from the inspection learner includes maximum entropy information as to relevance of one of a set of unlabeled images.

As an example, a method can include selecting one of a set of unlabeled images, extracting at least one feature from the selected one of the set of unlabeled images, and generating feature results for the one of the set of unlabeled images. In such an example, the method can include selecting at least one other unlabeled image using information from an inspection learner (e.g., a trained machine learning model) and the feature results (see, e.g., the method 2800 of FIG. 28). As an example, a method can include selecting most informative images using at least uncertainty information and diversity information. For example, a high level of uncertainty may mean that an image is likely to be informative when one or more features therein are labeled (e.g., for purposes of training an inspection learner). As to diversity, most informative image may be an image that is sufficiently diverse compared to other images. For example, an image that is similar to other images may not add substantial information if labeled and utilized for training an inspection learner; whereas, a diverse image, if labeled, may provide a substantial information that can increase a level of diversity of a pool of labeled training images.

As an example, a system can include a processor; memory accessible to the processor; instructions stored in the memory and executable by the processor to instruct the system to: receive labeled images; acquire unlabeled images; perform active learning by training an inspection learner using at least a portion of the labeled images to generate a trained inspection learner that outputs information responsive to receipt of one of the unlabeled images by the trained inspection learner; based at least in part on the information, make a decision to call for labeling of the one of the unlabeled images; receive a label for the one of the unlabeled images; and further train the inspection learner using the label.

As an example, one or more computer-readable storage media can include computer-executable instructions executable to instruct a computing system to: receive labeled images; acquire unlabeled images; perform active learning by training an inspection learner using at least a portion of the labeled images to generate a trained inspection learner that outputs information responsive to receipt of one of the unlabeled images by the trained inspection learner; based at least in part on the information, make a decision to call for labeling of the one of the unlabeled images; receive a label for the one of the unlabeled images; and further train the inspection learner using the label.

Figure 29:
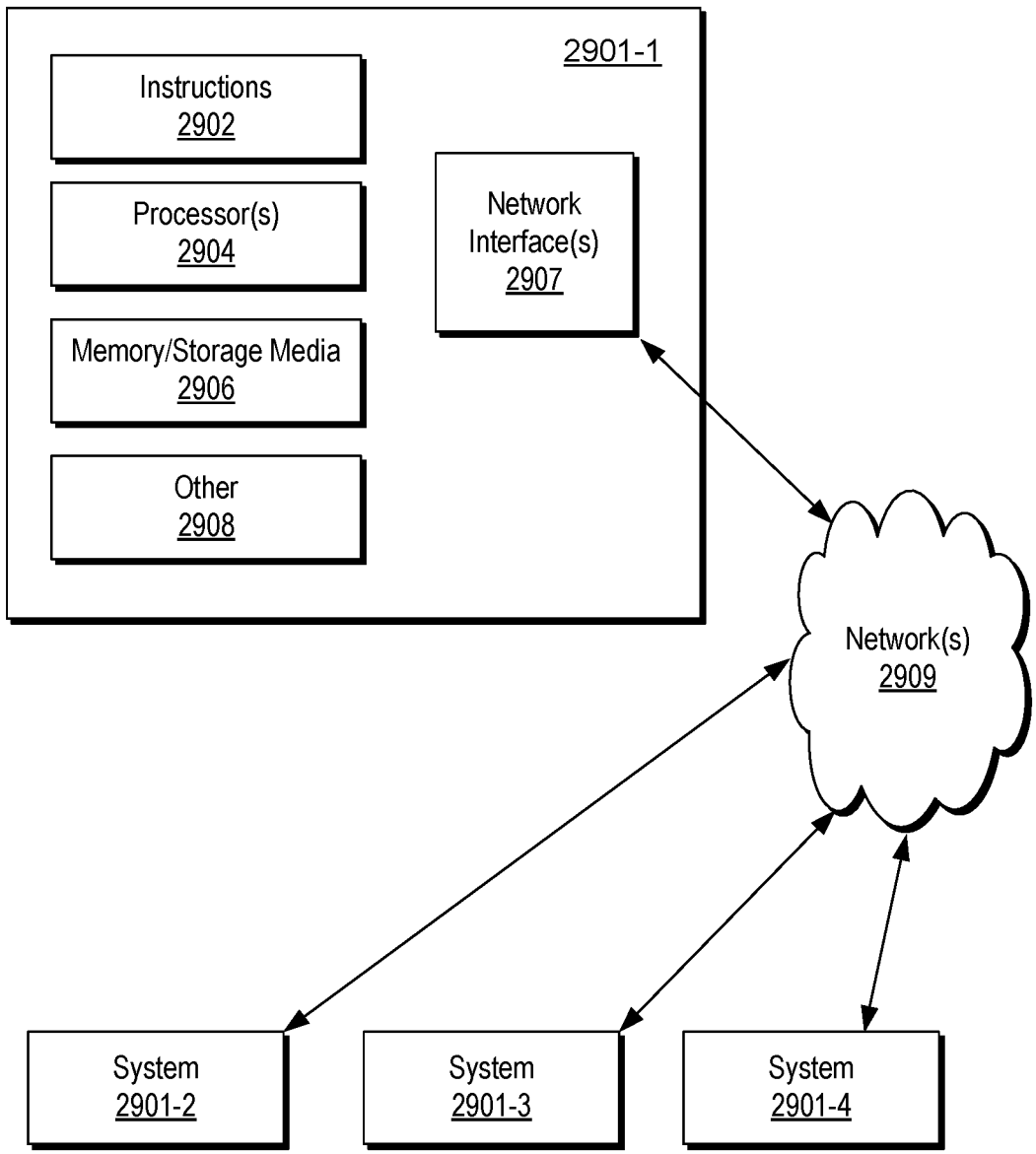
FIG. 29 illustrates examples of computing and networking equipment.

In some embodiments, a method or methods may be executed by a computing system. FIG. 29 shows an example of a system 2900 that can include one or more computing systems 2901-1, 2901-2, 2901-3 and 2901-4, which may be operatively coupled via one or more networks 2909, which may include wired and/or wireless networks.

As an example, a system can include an individual computer system or an arrangement of distributed computer systems. In the example of FIG. 29, the computer system 2901-1 can include one or more sets of instructions 2902, which may be or include processor-executable instructions, for example, executable to perform various tasks (e.g., receiving information, requesting information, processing information, simulation, outputting information, etc.).

As an example, a set of instructions may be executed independently, or in coordination with, one or more processors 2904, which is (or are) operatively coupled to one or more storage media 2906 (e.g., via wire, wirelessly, etc.). As an example, one or more of the one or more processors 2904 can be operatively coupled to at least one of one or more network interface 2907. In such an example, the computer system 2901-1 can transmit and/or receive information, for example, via the one or more networks 2909 (e.g., consider one or more of the Internet, a private network, a cellular network, a satellite network, etc.).

As an example, the computer system 2901-1 may receive from and/or transmit information to one or more other devices, which may be or include, for example, one or more of the computer systems 2901-2, etc. A device may be located in a physical location that differs from that of the computer system 2901-1. As an example, a location may be, for example, a processing facility location, a data center location (e.g., server farm, etc.), a rig location, a wellsite location, a downhole location, a subsea location, etc.

As an example, a processor may be or include a microprocessor, microcontroller, processor component or subsystem, programmable integrated circuit, programmable gate array, or another control or computing device.

As an example, the storage media 2906 may be implemented as one or more computer-readable or machine-readable storage media. As an example, storage may be distributed within and/or across multiple internal and/or external enclosures of a computing system and/or additional computing systems.

As an example, a storage medium or storage media may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLUERAY disks, or other types of optical storage, or other types of storage devices.

As an example, a storage medium or media may be located in a machine running machine-readable instructions, or located at a remote site from which machine-readable instructions may be downloaded over a network for execution.

As an example, various components of a system such as, for example, a computer system, may be implemented in hardware, software, or a combination of both hardware and software (e.g., including firmware), including one or more signal processing and/or application specific integrated circuits.

As an example, a system may include a processing apparatus that may be or include a general-purpose processors or application specific chips (e.g., or chipsets), such as ASICs, FPGAs, PLDs, or other appropriate devices.

Figure 30:
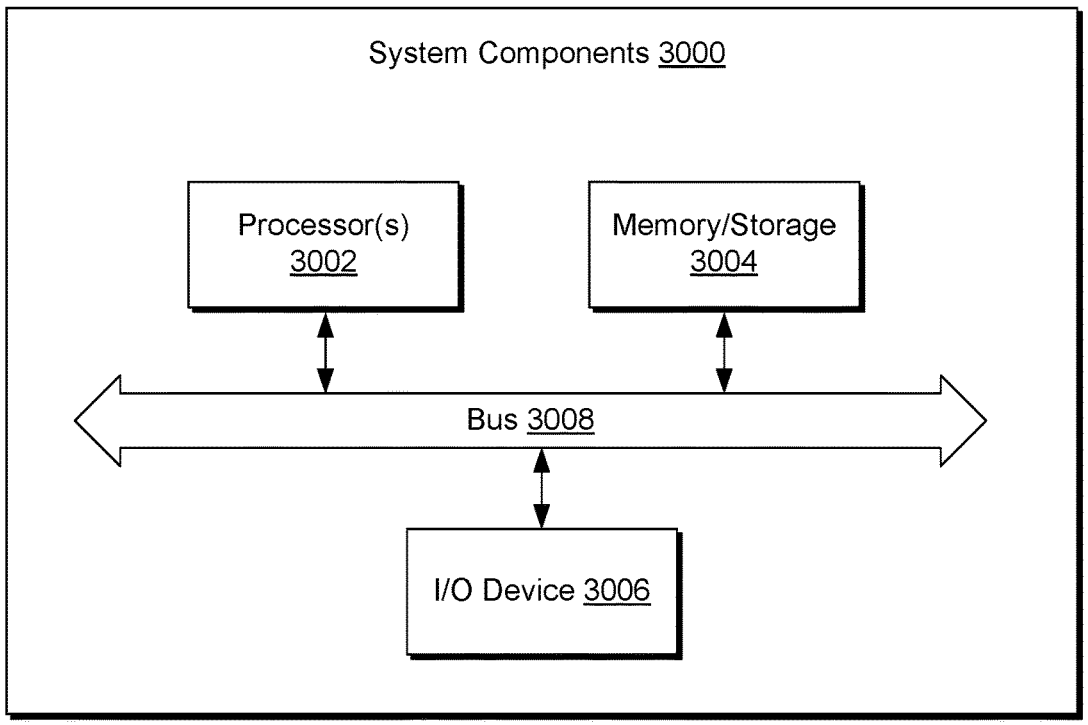
FIG. 30 illustrates example components of a system and a networked system.
Figure 30:
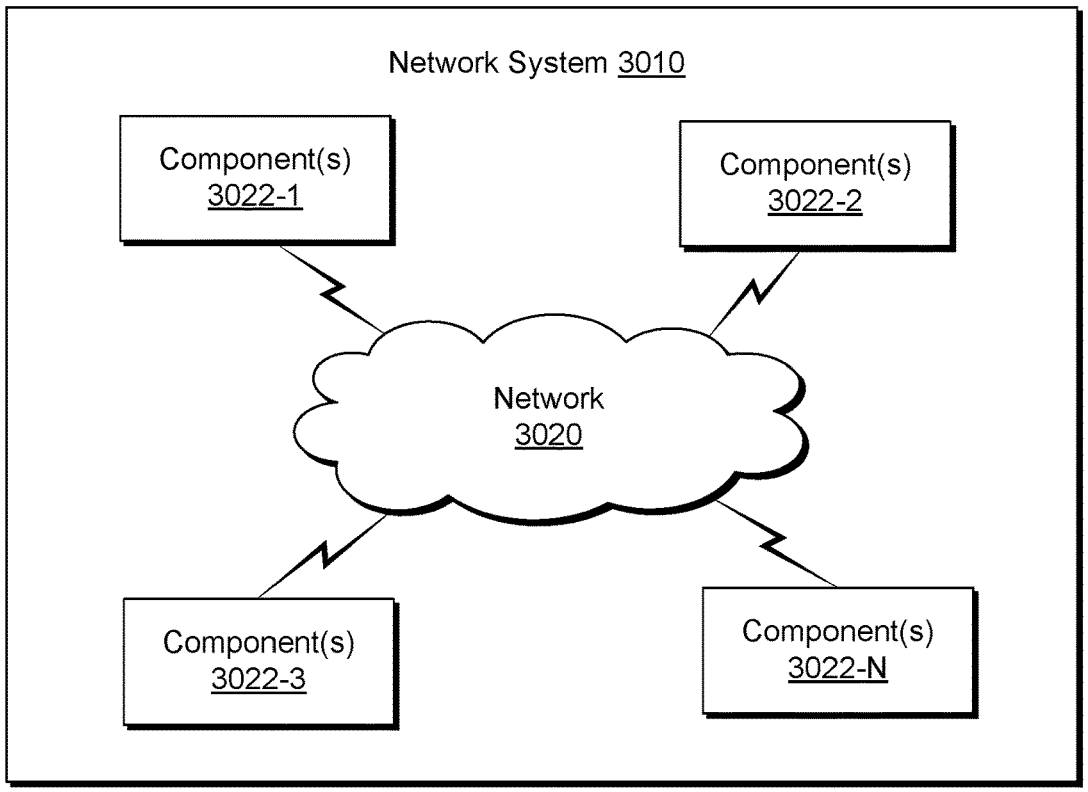

FIG. 30 shows components of a computing system 3000 and a networked system 3010 that includes one or more networks 3020. The system 3000 includes one or more processors 3002, memory and/or storage components 3004, one or more input and/or output devices 3006 and a bus 3008. According to an embodiment, instructions may be stored in one or more computer-readable media (e.g., memory/storage components 3004). Such instructions may be read by one or more processors (e.g., the processor(s) 3002) via a communication bus (e.g., the bus 3008), which may be wired or wireless. The one or more processors may execute such instructions to implement (wholly or in part) one or more attributes (e.g., as part of a method). A user may view output from and interact with a process via an I/O device (e.g., the device 3006). According to an embodiment, a computer-readable medium may be a storage component such as a physical memory storage device, for example, a chip, a chip on a package, a memory card, etc.

According to an embodiment, components may be distributed, such as in the network system 3010. The network system 3010 includes components 3022-1, 3022-2, 3022-3, . . . 3022-N. For example, the components 3022-1 may include the processor(s) 3002 while the component(s) 3022-3 may include memory accessible by the processor(s) 3002. Further, the component(s) 3022-2 may include an I/O device for display and optionally interaction with a method. The network may be or include the Internet, an intranet, a cellular network, a satellite network, etc.

As an example, a device may be a mobile device that includes one or more network interfaces for communication of information. For example, a mobile device may include a wireless network interface (e.g., operable via IEEE 802.11, ETSI GSM, BLUETOOTH, satellite, etc.). As an example, a mobile device may include components such as a main processor, memory, a display, display graphics circuitry (e.g., optionally including touch and gesture circuitry), a SIM slot, audio/video circuitry, motion processing circuitry (e.g., accelerometer, gyroscope), wireless LAN circuitry, smart card circuitry, transmitter circuitry, GPS circuitry, and a battery. As an example, a mobile device may be configured as a cell phone, a tablet, etc. As an example, a method may be implemented (e.g., wholly or in part) using a mobile device. As an example, a system may include one or more mobile devices.

As an example, a system may be a distributed environment, for example, a so-called "cloud" environment where various devices, components, etc. interact for purposes of data storage, communications, computing, etc. As an example, a device or a system may include one or more components for communication of information via one or more of the Internet (e.g., where communication occurs via one or more Internet protocols), a cellular network, a satellite network, etc. As an example, a method may be implemented in a distributed environment (e.g., wholly or in part as a cloud-based service).

As an example, information may be input from a display (e.g., consider a touchscreen), output to a display or both. As an example, information may be output to a projector, a laser device, a printer, etc. such that the information may be viewed. As an example, information may be output stereographically or holographically.

Although only a few examples have been described in detail above, those skilled in the art will readily appreciate that many modifications are possible in the examples. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words "means for" together with an associated function.

What is claimed is:

1. A method comprising:
   receiving labeled images;
   acquiring unlabeled images;
   performing active learning by training an inspection learner using at least a portion of the labeled images to generate a trained inspection learner that, responsive to receipt of one of the unlabeled images by the trained inspection learner, outputs uncertainty information as to one or more features in the one of the unlabeled images;

generating, by a density learner, responsive to receipt of the one of the unlabeled images, a density metric as to the one or more features in the one of the unlabeled images, wherein generating the density metric comprises computing a mean similarity of an unlabeled image to other images;

training a typicality learner that generates a typicality metric responsive to receipt of an image;

computing a relevance score, a density score using the density metric, a typicality score using the typicality metric, and an uncertainty score using the uncertainty information;

based at least in part on at least one of the relevance score, the density score, the typicality score, or the uncertainty score, calling for analysis of one of the labeled images or for analysis of the one of the unlabeled images;

making a decision to call for labeling of the one of the unlabeled images based at least in part on the uncertainty information, the typicality metric, and the density metric;

receiving a label for the one of the unlabeled images; and further training the inspection learner using the label.

2. The method of claim 1, further comprising training the density learner that generates the density metric.

3. The method of claim 2, further comprising receiving the density learner trained to generate the density metric.

4. The method of claim 1, wherein the label comprises a machine generated label.

5. The method of claim 1, wherein the label comprises a machine generated label that depends on receipt of a signal from a human input device.

6. The method of claim 1, further comprising, after further training the inspection learner using the label, generating a deployable trained inspection learner.

7. The method of claim 6, further comprising deploying the deployable trained inspection learner to a machine vision system.

8. The method of claim 7, wherein the machine vision system comprises at least one subsea image acquisition unit.

9. The method of claim 1, wherein the analysis of the one of the unlabeled images comprises the labeling of the one of the unlabeled images.

10. The method of claim 1, wherein the analysis of the one of the labeled images comprises healing of the one of the unlabeled images.

11. The method of claim 1, wherein the inspection learner comprises an object detector that comprises at least one neural network.

12. The method of claim 1, wherein the inspection learner comprises an ensemble of object detectors, and wherein the trained inspection learner outputs maximum entropy information as to relevance of the one of the unlabeled images.

13. The method of claim 1, further comprising:
extracting at least one feature from the one of the unlabeled images; and
generating feature results for the one of the unlabeled images.

14. The method of claim 13, further comprising:
selecting at least one other unlabeled image using information, output from the inspection learner, and the feature results.

15. A system comprising:
a processor;
memory accessible to the processor;
instructions stored in the memory and executable by the processor to instruct the system to:
receive labeled images;
acquire unlabeled images;
perform active learning by training an inspection learner using at least a portion of the labeled images to generate a trained inspection learner that, responsive to receipt of one of the unlabeled images by the trained inspection learner, outputs uncertainty information as to one or more features in the one of the unlabeled images;
generate, by a density learner, responsive to receipt of the one of the unlabeled images, a density metric as to the one or more features in the one of the unlabeled images, wherein generating the density metric comprises computing a mean similarity of an unlabeled image to other images;
train a typicality learner that generates a typicality metric responsive to receipt of an image;
compute a relevance score, a density score using the density metric, a typicality score using the typicality metric, and an uncertainty score using the uncertainty information;
based at least in part on at least one of the relevance score, the density score, the typicality score, or the uncertainty score, call for analysis of one of the labeled images or for analysis of the one of the unlabeled images;
make a decision to call for labeling of the one of the unlabeled images based at least in part on the uncertainty information, the typicality metric, and the density metric;
receive a label for the one of the unlabeled images; and further train the inspection learner using the label.

16. One or more computer-readable storage media comprising computer-executable instructions executable to instruct a computing system to:
receive labeled images;
acquire unlabeled images;
perform active learning by training an inspection learner using at least a portion of the labeled images to generate a trained inspection learner that, responsive to receipt of one of the unlabeled images by the trained inspection learner, outputs uncertainty information as to one or more features in the one of the unlabeled images;
generate, by a density learner, responsive to receipt of the one of the unlabeled images, a density metric as to the one or more features in the one of the unlabeled images, wherein generating the density metric comprises computing a mean similarity of an unlabeled image to other images;
train a typicality learner that generates a typicality metric responsive to receipt of an image;
compute a relevance score, a density score using the density metric, a typicality score using the typicality metric, and an uncertainty score using the uncertainty information;
based at least in part on at least one of the relevance score, the density score, the typicality score, or the uncertainty score, call for analysis of one of the labeled images or for analysis of the one of the unlabeled images;

based at least in part on the uncertainty information, the typicality metric, and the density metric, make a decision to call for labeling of the one of the unlabeled images;

receive a label for the one of the unlabeled images; and further train the inspection learner using the label.

17. The system of claim 15, wherein the instructions are executable by the processor to further instruct the system to train the density learner that generates the density metric.

18. The system of claim 17, wherein the instructions are executable by the processor to further instruct the system to receive the density learner trained to generate the density metric.

19. The system of claim 15, wherein the analysis of the one of the unlabeled images comprises the labeling of the one of the unlabeled images.

20. The system of claim 15, wherein the analysis of the one of the labeled images comprises healing of the one of the unlabeled images.

21. The one or more computer-readable storage media of claim 16, further comprising computer-executable instructions executable to instruct the computing system to train the density learner that generates the density metric.

22. The one or more computer-readable storage media of claim 21, further comprising computer-executable instructions executable to instruct the computing system to receive the density learner trained to generate the density metric.

* * * * *